(12) United States Patent
Peterson

(10) Patent No.: US 7,388,306 B2
(45) Date of Patent: Jun. 17, 2008

(54) APPLIANCE CONTROL SYSTEM WITH POWER CONTROLLER

(75) Inventor: Gregory A. Peterson, South Barrington, IL (US)

(73) Assignee: Emerson Electric, Co., St. Louis, MO (US)

( * ) Notice: Subject to any disclaimer, the term of this patent is extended or adjusted under 35 U.S.C. 154(b) by 1031 days.

(21) Appl. No.: 10/196,812

(22) Filed: Jul. 17, 2002

(65) Prior Publication Data

US 2003/0025395 A1 Feb. 6, 2003

Related U.S. Application Data

(60) Provisional application No. 60/310,695, filed on Aug. 6, 2001.

(51) Int. Cl.
*H05K 7/14* (2006.01)
(52) U.S. Cl. ...................................... 307/149
(58) Field of Classification Search ................ 363/126, 363/70; 307/80, 109, 110, 149
See application file for complete search history.

(56) References Cited

U.S. PATENT DOCUMENTS

| | | | | |
|---|---|---|---|---|
| 4,014,178 A * | 3/1977 | Kells | .............................. | 62/3.6 |
| 5,012,121 A * | 4/1991 | Hammond et al. | ............. | 307/64 |
| 5,163,356 A * | 11/1992 | Chigira | ......................... | 99/282 |
| 5,270,913 A * | 12/1993 | Limpaecher | ................. | 363/140 |
| 5,735,007 A * | 4/1998 | Choi | .............................. | 8/159 |
| 5,812,679 A * | 9/1998 | Killion et al. | ................ | 381/316 |
| 5,836,669 A * | 11/1998 | Hed | ............................... | 362/92 |
| 5,852,333 A * | 12/1998 | Strojny et al. | .................. | 307/87 |
| 6,014,325 A * | 1/2000 | Pecore | ....................... | 363/126 |
| 6,085,017 A | 7/2000 | Rilly | | |
| 6,191,504 B1 * | 2/2001 | Kawata | ....................... | 307/125 |
| 6,489,725 B1 * | 12/2002 | Suzuki et al. | ................ | 315/159 |
| 6,597,144 B2 * | 7/2003 | Pearson et al. | .............. | 318/599 |
| 6,731,524 B2 * | 5/2004 | Elek et al. | ...................... | 363/70 |

FOREIGN PATENT DOCUMENTS

DE 199 16 020 10/1999

* cited by examiner

*Primary Examiner*—Robert L. Deberadinis
(74) *Attorney, Agent, or Firm*—Maginot, Moore & Beck

(57) ABSTRACT

A transformerless power controller provides low standby power (milliwatts) for standby circuitry/logic of an appliance when the appliance is not in use. The power controller also provides gradations of power for the appliance based on need of the appliance and/or appliance component(s). In one form, a signal from a processor of the appliance provides control of the power controller. Particularly, a control signal from the processor operates a switch for the gradations of available power. The control signal may further provide timing for application of the power to the appliance and/or appliance component(s).

16 Claims, 38 Drawing Sheets

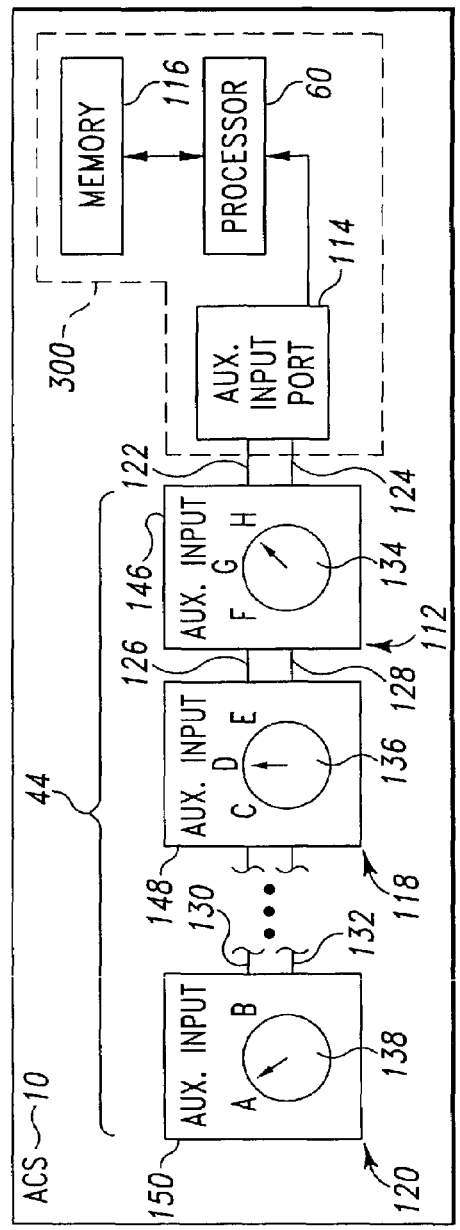
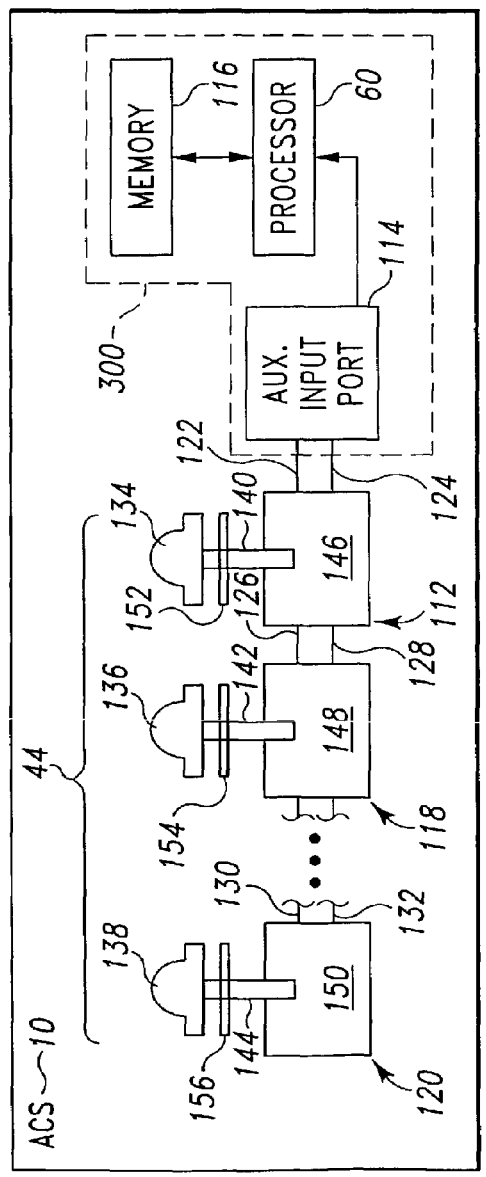

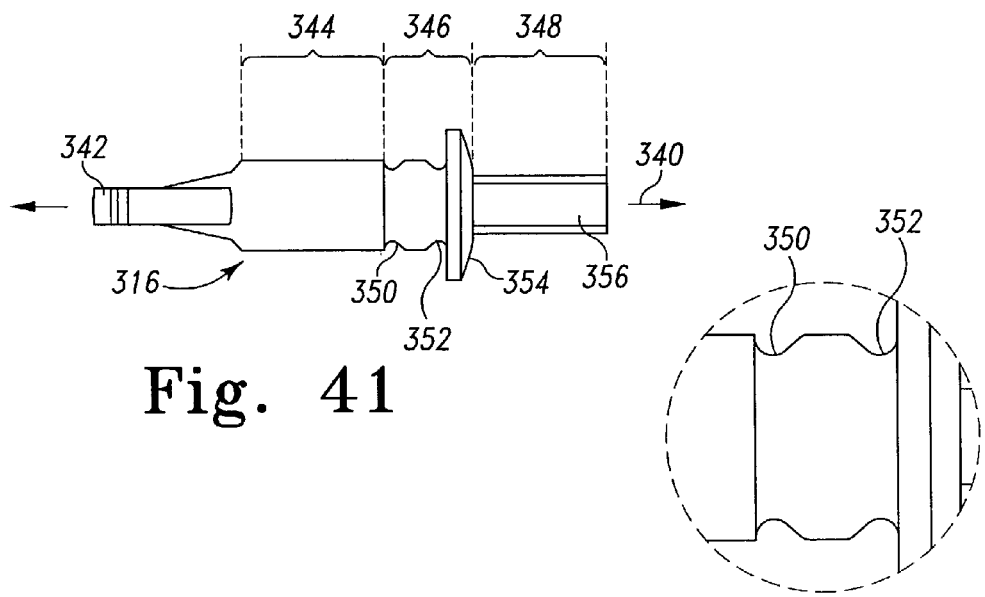
Fig. 41
Fig. 43
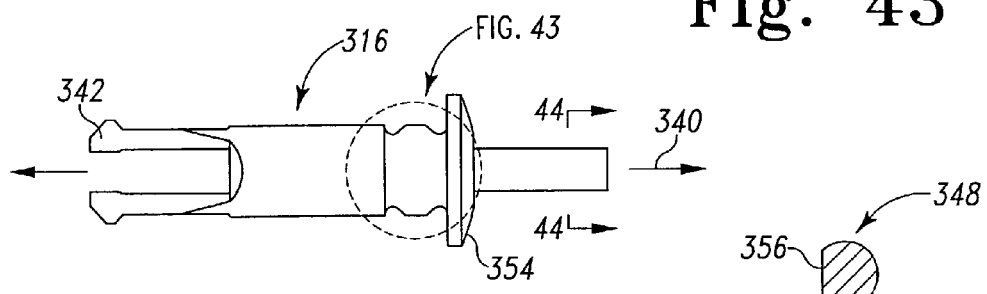
Fig. 42
Fig. 44
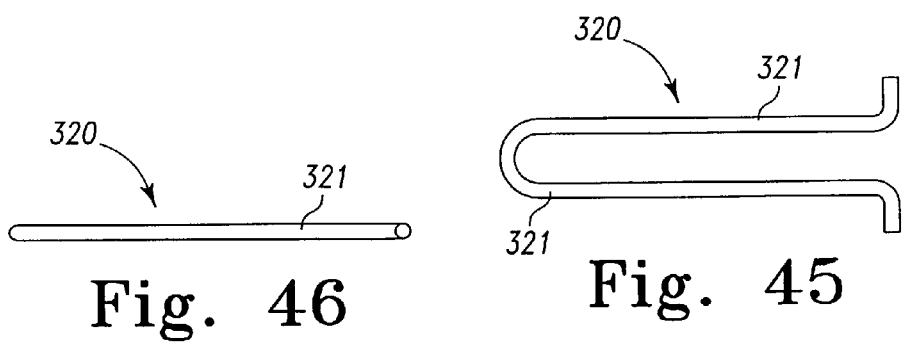
Fig. 46
Fig. 45

APPLIANCE CONTROL SYSTEM WITH POWER CONTROLLER

This application claims the benefit of and/or priority to U.S. provisional patent application Ser. No. 60/310,695 filed Aug. 6, 2001 entitled "Appliance Control System."

CROSS-REFERENCE TO RELATED APPLICATIONS

Cross-reference is made to U.S. patent application entitled "Appliance Control System With Hyperspin Mode" by Peterson, Ser. No. 10/197,177; U.S. patent application entitled "Appliance Control System With Auxiliary Inputs" by Peterson and Stultz, Ser. No. 10/197,113; U.S. patent application entitled "Appliance Control System With Cycle Selection Detection" by Peterson and Stultz, Ser. No. 10/197,178; U.S. patent application entitled "Appliance Control System With LED Operation Indicators" by Peterson and Stultz, Ser. No. 10/197,062; U.S. patent application entitled "Appliance Control System With Network Accessible Programmable Memory" by Peterson, Ser. No. 10/197,201; U.S. patent application entitled "Appliance Control System With Knob Control Assembly" by Peterson and Stultz, Ser. No. 10/196,831; and U.S. patent application entitled "Appliance Control System With Solid State Appliance Controller" by Peterson, Ser. No. 10/197,082; all of which are commonly assigned and filed on even date herewith.

FIELD OF THE INVENTION

The present invention relates generally to appliances, and more particularly, to a control system for an appliance.

BACKGROUND

Appliances of today have a variety of components that cooperate to provide functionality for the appliance. Such variety of components encompasses both user-actuated components and appliance-actuated components. Particularly, this includes controls, controllers, processors, motors, solenoids/solenoid valves, timers, and the like, electronic circuitry/logic including memory and program instructions.

Most, if not all, of the variety of components such as those listed above utilize electricity to operate. Of these, most of the various appliance components are electronically controlled. Some components such as motors and/or solenoids require a fair amount of power to operate while electronic circuitry requires little power to operate. Additionally, the various components are not always on at the same time and thus do not always need power. At least some of the electronics and/or electronic circuitry/logic controlling the various components of the appliance, however, require some power even when the appliance is off. This is known as a standby mode.

Standby mode allows the appliance to determine if a user has actuated a particular component of the appliance while the appliance is not in use. As well, standby mode allows some power to be provided to certain components and/or electronic circuitry/logic as necessary. The standby mode/circuitry also provides the necessary power to the requisite components when user-initiation of a mode has been determined.

Standby circuitry typically utilizes transformers in some manner to provide the standby power and/or the power necessary to the appropriate component(s) when use is determined. Heretofore, the amount of power required by current appliance standby circuitry is rather high. It is desirable to reduce the amount of standby power being used by the appliance for several reasons. One reason is to reduce a user's electricity bill. Another reason is to reduce internal problems associated with the amount of power used by current standby circuitry/logic.

What is therefore needed is low power standby circuitry/logic for an appliance.

SUMMARY OF THE INVENTION

A transformerless power controller provides low standby power (milliwatts) for standby circuitry/logic of an appliance when the appliance is not in use. The power controller also provides gradations of power for the appliance based on need of the appliance and/or appliance component(s).

In one form, the subject invention provides a power controller for an appliance. The power controller includes a control signal input operative to receive a control signal, a line power input operative to receive line power, a first transformerless power circuit operative to produce a first power from the line power, a second transformerless power circuit operative to produce a second power from the line power, a first circuit operative to supply the first power to first power components, and switching circuitry operative to supply the second power to second power components upon receipt of a control signal.

In another form, the subject invention provides a method of operating an appliance. The method includes the steps of (a) producing low power via a first transformerless power circuit from an input line power, (b) producing operating power via a second transformerless power circuit from the input line power, (c) supplying the low power to low power components of the appliance, and (d) supplying the operating power to operating power components of the appliance via a switching circuit in response to the switching circuit receiving a control signal.

In yet another form, the subject invention provides a power controller for an appliance. The power controller includes a first transformerless power circuit operative to derive low power from an input line power and supply the low power to low power components of the appliance, a second transformerless power circuit operative to derive operating power from the input line power, a switching circuit in communication with the second transformerless power circuit and operative to supply the operating power to operating power components of the appliance in response to a control signal, and a control signal generator in communication with the switching circuit and operative to generate a control signal in response to a run mode signal.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 7 is a block representation of the appliance control system showing a plurality of auxiliary inputs;

FIG. 8 is a further representation of the appliance control system of FIG. 7;

FIG. 41 is a first side elevational view of the control shaft of the main controller module of FIG. 25;

FIG. 42 is a second side elevational view of the control shaft of the main controller module of FIG. 25;

FIG. 43 is an enlarged view of the part of FIG. 42 that is encircled and labeled FIG. 43;

FIG. 44 is a cross sectional view of the reduced diameter portion of the control shaft of the main controller module of FIG. 25 taken along the line 44-44 of FIG. 42;

FIG. 45 is a first side elevational view of the first spring of the main controller module of FIG. 25;

FIG. 46 is a second side elevational view of the first spring of the main controller module of FIG. 25;

Corresponding reference characters indicate corresponding parts throughout the several views.

DETAILED DESCRIPTION

Figure 1:
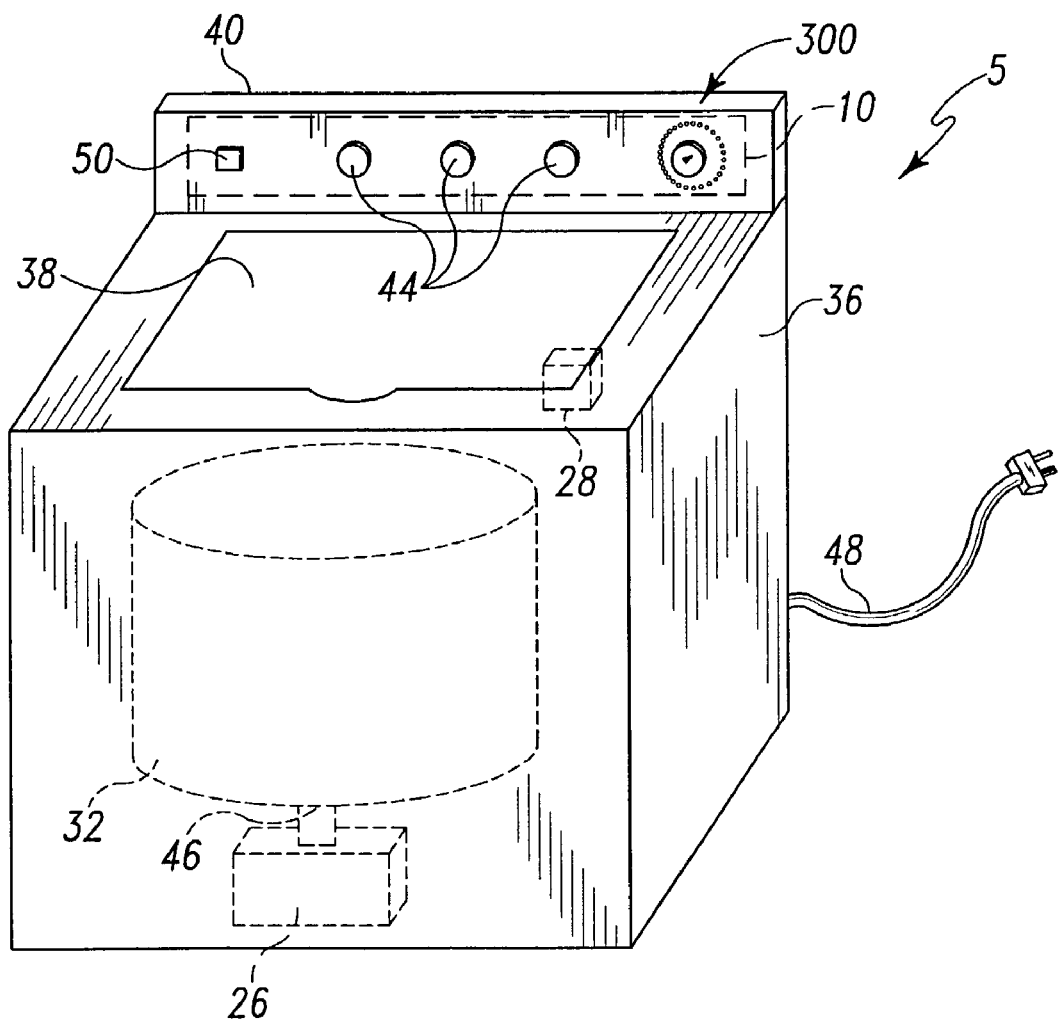
FIG. 1 is a perspective view of a washing machine embodying the various aspects of the various inventions shown and described herein.

Referring to FIG. 1, there is depicted a washing machine, generally designated 5, representing one form of a laundry appliance. The washing machine 5 has a frame 36 that houses a receptacle or tub 32 that is configured to receive laundry therein for washing. The tub 32 is accessed via a pivoting door or lid 38 in the frame 36. The tub 32 is mounted in the frame 36 so as to revolve or spin, typically (and as shown) around a vertical axis 46. The tub 32 is in communication with a motor 26 that is likewise mounted in the frame 36, and which is operative to spin the tub 32 in a controlled manner as described below.

The washing machine 5 also has a control panel frame 40 that houses an appliance control system 10. External to the control panel frame 40 and part of the appliance control system 10 is a main controller module 300 and a plurality of auxiliary inputs 44 (typically in the form of knob, switches, or the like). The controller module 300 provides operating mode/cycle indication and/or control of the operating mode/cycle for/of the washing machine 5. Power for the washing machine 5 is provided via a power cord 48 that is configured to be plugged into an appropriate source of electricity, typically a 120 volt AC source or a 240 volt AC source (not shown). The general operation of the washing machine 5, with respect to the loading, washing, and unloading of laundry, is typical of washing machines.

The appliance control system 10 also includes a communication port 50 that allows the washing machine 5 to be coupled to or in communication with an external device, network, or the like. The communication port 50 may take the form of an RS-232 port, a telephone-type port, or the like. Particularly, the communication port 50 allows the washing machine 5 to be in communication with a test/diagnostic device, a public and/or private network such as the Internet, another laundry appliance, or other device.

Figure 2:
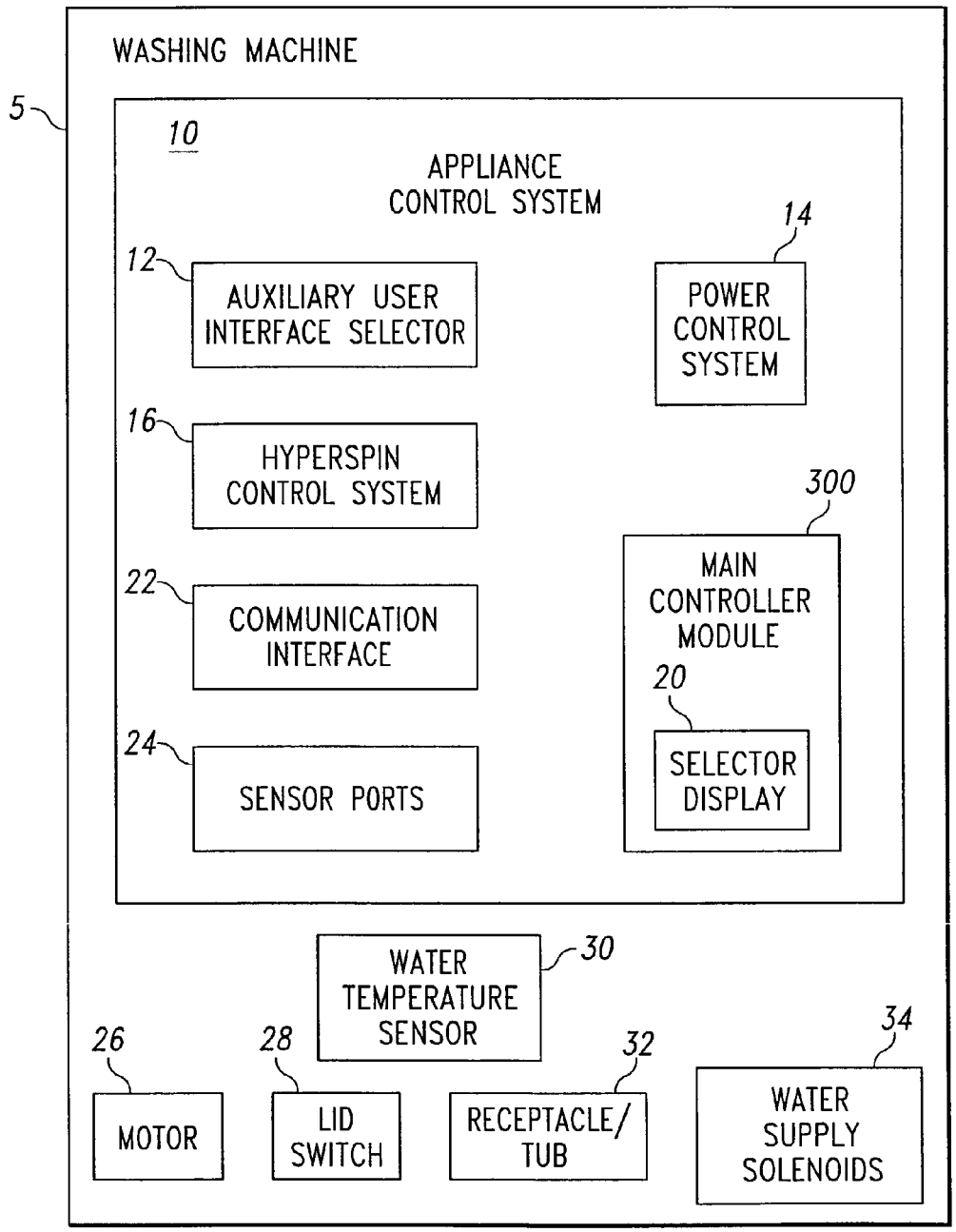
FIG. 2 is a block diagram of the washing machine of FIG. 1.

Referring to FIG. 2 there is depicted a block diagram of the washing machine 5. The washing machine 5 includes the appliance control system (ACS) 10, the motor 26, the door or lid switch 28, a water temperature sensor 30, the receptacle or tub 32, and water supply solenoid valves 34. The ACS 10 is operative to control various aspects/features/functions of the washing machine 5 as explained in greater detail below, and to indicate the various cycles of the washing machine 5. The ACS 10 includes various sections, modules, portions, or the like the nature and manner of operation of which will be described below. As indicated above, the motor 26 is operative to rotate the tub 32 during the various cycles or modes of the washing machine 5. The tub 32 is adapted to hold an amount of laundry and water for washing. The lid switch 28 is operative to interrupt or stop the motor 26 or cause the washing machine 5 to not continue its operating cycle when the lid 38 is opened during operation. The lis switch 28 also prevents the start of a cycle if the lid 38 is initially open. Therefore, the lid 38 must be closed in order for the washing machine 5 to begin an operating cycle. The water temperature sensor 30 is operative to provide water temperature data to the ACS 10 regarding temperature of the water going into the tub 32 or already in the tub 32 in order to provide the proper/appropriate washing water temperature. The water supply solenoids/valves 34 are operative to control the flow of hot and/or cold water into the tub 32.

The ACS 10 includes an auxiliary user interface selector 12 for the washing machine. The auxiliary user interface selector 12 is adapted/configured via appropriate circuitry, logic, and/or components to allow a user to select various washing machine parameters. Particularly, the auxiliary user interface selector 12 is operative to allow the user to select various washing machine parameters or operating cycle options (options) of various washing machine cycles or modes. A power control system 14 is provided in the ACS 10 that is operative, configured, and/or adapted via appropriate circuitry, logic, and/or components to provide power to the various components of the washing machine 5. More particularly, the power control system 14 is operative to provide a standby or low power and/or an operating power to the various components of the washing machine 5.

The ACS 10 also has a hyperspin control system 16 that is operative, configured, and/or adapted via appropriate circuitry, logic and/or components to provide a hyperspin feature or function. The hyperspin feature/function permits the tub 32 to spin or rotate at a speed that is greater than a normal tub rotation speed, typically during a drying cycle of the washing machine 5. The ACS 10 further has a main controller module 300 that is operative, configured, and/or adapted to allow the user to select various operating modes, cycles or the like of the washing machine 5. The main controller module 300 includes a selector display 20. The selector display 20 is operative, configured, and/or adapted via appropriate circuitry, logic, and/or components to provide information regarding the user selection. The selector display 20 is also operative to indicate or show the progression of the user selection as the washing machine performs the user selection. The selector display 20 includes a plurality of light emitting devices 307 as will be discussed below The ACS 10 further includes a communication interface 22. The communication interface 22 is operative, configured, and/or adapted via appropriate circuitry, logic, and/or components to allow the washing machine 5 to interface with external components, circuitry, logic, networks, or the like. As well, the communication interface 22 allows remote access to various features, functions, or the like of the washing machine 5. Lastly, the ACS 10 includes sensor ports 24 that are adapted to allow connection with various sensors and/or data inputs of the washing machine 5.

Power Supply

Figure 3:
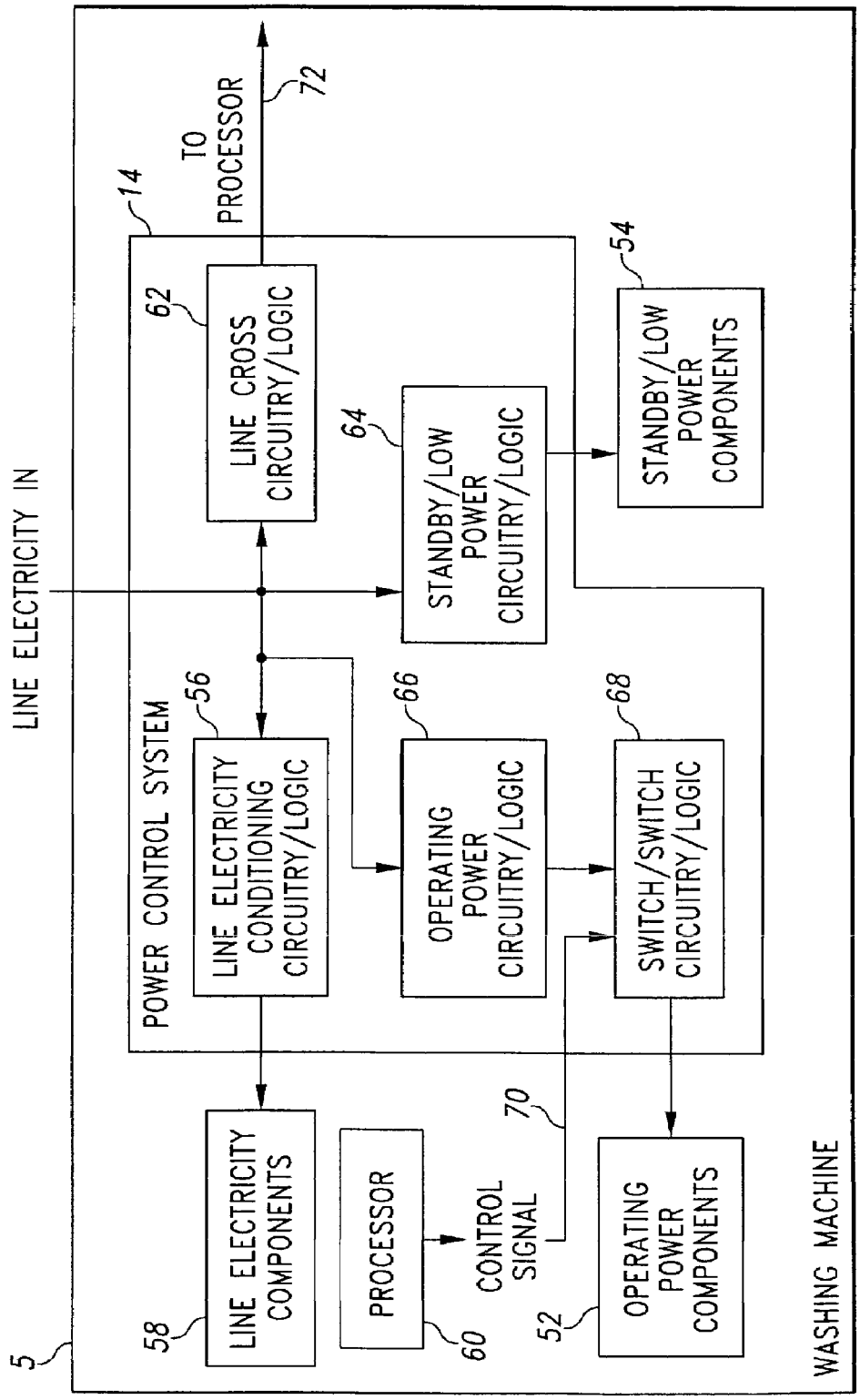
FIG. 3 is a block diagram of an exemplary power supply for the washing machine of FIG. 1.

Referring to FIG. 3 there is depicted a block diagram representation of the power control system 14 and other components and/or circuitry/logic of the washing machine 5. The washing machine 5 receives line electricity from a source of electricity that is typically a 120 volt AC or 240 volt AC electricity source (not shown) designated line electricity in. The AC electricity supplied to the washing machine 5 from line electricity in will hereinafter be termed line electricity, regardless of its source and voltage. The line electricity is received by the washing machine 5 via the power cord 48 (see FIG. 1).

The line electricity is supplied via the power control system 14 to line electricity conditioning circuitry/logic 56 that is operative via appropriate circuitry, logic, and/or components to provide the line electricity to line electricity components 58 of the washing machine 5. The line electricity components 58 include the motor 26 (direct use), the lid switch 28 (as pass-through) and any other washing machine component that directly or indirectly utilizes the line electricity to operate.

The power control system 14 is operative via appropriate circuitry, logic, and/or components to power or run operating power components 52 and standby low power components 54 of the washing machine 5. The operating power components 52 include relays, transistors, triacs, silicon controlled rectifiers (SCRs), and the like. The standby low power components 54 include integrated circuits (ICs), auxiliary input units, clocks, and the like.

The power control system 14 includes operating power circuitry/logic 66 that is operative to produce, generate, or derive operating power (electricity) from the line electricity for powering the operating power components 52. As well, the power control system 14 includes standby low power circuitry/logic 64 that is operative to produce, generate, or derive standby and/or low power (electricity) from the line electricity for powering the standby and/or low power components 54.

The operating power circuitry/logic 66 provides operating power to the operating power components 52 when the washing machine 5 is in use. The standby low power circuitry/logic 64 provides standby power to the standby power components 54 when the washing machine 5 is not in use but still plugged into the line electricity as well as to low power components 54 when the washing machine is in use. It should be noted that the power control system 14 does not utilize a transformer to generate and/or derive the operating power or the standby low power for the washing machine 5. This is accomplished by utilizing electronic component signal conditioning.

The standby low power provides electricity in a small or low amount in the neighborhood of less than one watt, but which may be generated in any amount necessary for a standby state and a low power state of the washing machine 5. In one embodiment, the generated standby low power electricity is approximately five (5) volts at a particular current that yields standby power in the milliwatts. In an embodiment of a washing machine ACS, whose circuitry/logic is described in detail below, the standby low power produced by the standby power circuitry/logic 64 is around 500 milliwatts. It should be understood that the standby low power produced by the standby low power circuitry/logic 64 is determined by the standby operating conditions, parameters, or the like of the particular standby low power components 54 of the washing machine 5.

The operating power provides electricity in an amount necessary to operate, actuate, or use the various operating power components 52. Thus, the operating power generated by the operating power circuitry/logic 66 is in accordance with design characteristics of the washing machine 5. However, in one embodiment, the operating power circuitry/logic 66 is operative to produce twenty-four (24) volts of operating electricity.

The power control system 14 also includes line cross circuitry/logic 62 that is operative, configured, and/or adapted to generate, produce, or derive a line cross signal from the line electricity. The line cross signal is represented by the arrow 72 and is provided to a processor 60 of the washing machine 5. The processor 60 may be a processing unit, microprocessor, processing means, or the like. The processor 60 utilizes the line cross signal for timing purposes.

The power control system 14 is operative in one of two modes or states of operation. One state or mode of operation may be termed an idle or standby mode, while the other state or mode of operation may be termed a run or operating mode. In the idle mode of operation, the standby power circuitry/logic 64 provides standby power to the standby power components 54, while the operating power circuitry/logic 66 is prevented from supplying operating power to the operating power components. In the run mode of operation, the operating power circuitry/logic 66 provides operating power to the operating power components. At the same time (while in the run mode of operation) the standby low power circuitry/logic 64 provides standby power to the standby low power components. This is because the standby low power components 54 are a necessary part of the operation of the washing machine 5. For this reason, the standby power may also be termed low power while the standby power components may be termed low power components. The standby power circuitry/logic 64 may thus be considered as supplying standby power to standby components when the washing machine 5 is plugged in but not operating, and as supplying low power to low power components when the washing machine is operating. The standby components may not necessarily be the same as the low power components.

When the washing machine 5 is receiving the line electricity, and not in use (the idle or standby mode), the washing machine 5 is operative to generate standby power via the standby power circuitry/logic 64 for the standby power components 54. When a user turns actuates the washing machine 5, without regard to the particular operating mode (the run mode), the washing machine 5 needs operating power as generated by the operating power circuitry/logic 66. The particular components of the operating power components 52 that require operating power is dependent upon the operating mode of the washing machine 5.

The power control system 14 regulates the application of the operating power to the operating power components 52 via switch/switching circuitry/logic 68. In accordance with an aspect of the present invention, the switch/switching circuitry/logic 68 (hereinafter switching circuitry 68 for short) is operative to switch in or apply the operating power from the operating power circuitry/logic 66 to the operating power components 52 when appropriate or necessary for the operation of the washing machine 5, or control of the application of the operating power from the operating power circuitry/logic 66 to and for the appropriate operating power components 52. This may include intermittently applying the operating power to the operating power components 52.

The switching circuitry 68 is regulated or controlled by a control signal that is provided to the switching circuitry 68 by a processor 60 via a control line 70. The control signal actuates the switching circuitry 68, causing the operating power circuitry/logic 66 generating the operating power for the operating power components 52 to be supplied or applied to the operating power components 52. In accordance with one embodiment, the operating power for the electronic components is twenty-four (24) volts, but may be any operating voltage that is appropriate. The control signal is provided to the switching circuitry 68 when the washing machine 5 is actuated into a run or operating mode. This is typically accomplished through user actuation of a control knob/on/off switch of the washing machine 5. Particularly, the washing machine 5 is actuated into a washing cycle or operation via a user actuating a control input of the washing machine 5. In one form, the control signal is pulsed.

Figure 4:
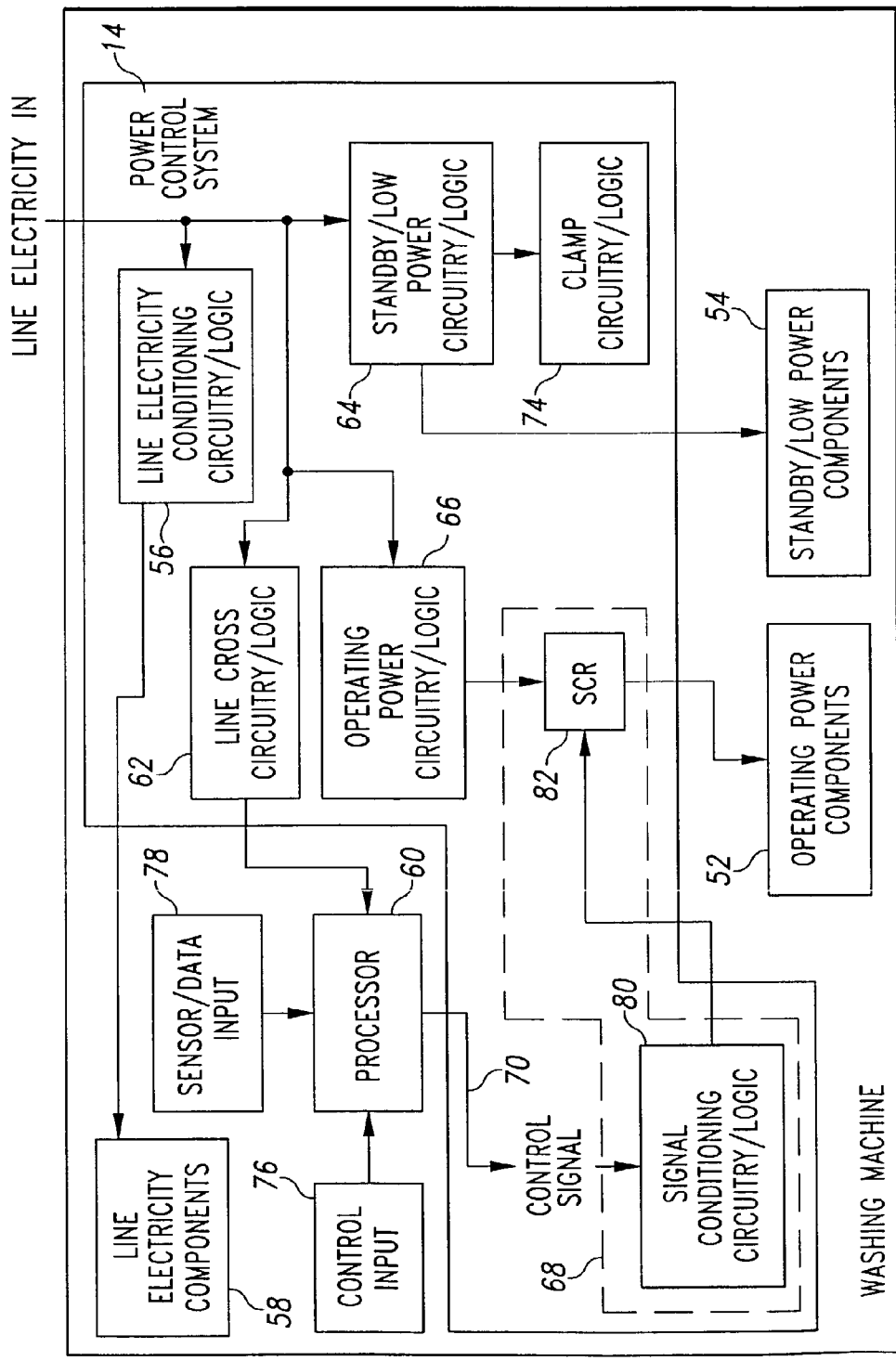
FIG. 4 is another block diagram of the exemplary power supply.

Referring now to FIG. 4, there is depicted a more detailed block diagram of the washing machine 5 and, more particularly, of the power control system 14. The washing machine 5 includes various sensors and data inputs generally designated 78 that provide sensor signals and data input to the processor 60. The processor 60 utilizes these sensor signals and data inputs for various purposes and signal generation as discussed herein. The washing machine 5 also includes a control input 76 that represents user-actuated inputs. Signals from the control input 76 are forwarded to the processor 76. The sensor/data input 78 and/or the control input 76 provides data to the processor 60 that the processor 60 may use to generate the control signal for the power control system 14.

In addition to the various components, features and/or functions described in conjunction with FIG. 3, the power control system 14 includes clamp circuitry/logic 74 that is provided in conjunction with the standby/low power circuitry/logic 64. The clamp circuitry/logic 74 is operative to set and the power level of the standby/low power circuitry/logic 64 or prevent over power of the standby/low power circuitry/logic 64.

It should be appreciated that various components of the washing machine 5, such as the motor 26, utilize the line electricity (typically 120 volts or 240 volts) for operation. This is not the same as the operating power generated by the operating power circuitry/logic. The washing machine 5 utilizes the operating power for actuation of the various relays, solenoids, and the like. These relays, solenoids, and the like, actuate the motor, water valves, and other like components of the washing machine 5 of which some then utilize the line electricity for operation. Additionally, the line electricity is utilized in conjunction with various switches, such as safety switches (e.g. the lid switch 28), that provide a signal to the processor 60 regarding the state of the particular switch. Where necessary, these switches and the like are explained in detail herein.

As indicated above, the operating power from the operating power circuitry/logic 66 is applied or supplied to the operating power components 52 through the switching circuitry 68, with the switching circuitry 68 controlled by a control signal or control signals from the processor 60. In one form, the switching circuitry 68 includes signal conditioning circuitry/logic 80 that receives the control signal via the control signal line 70 from the processor 60. The switching circuitry/logic 68 also includes a silicon controlled rectifier (SCR) 82 (or any other similar operating/functioning device) that is in communication with the signal conditioning circuitry/logic 80 and with the operating power circuitry/logic 66. The SCR 82 is thus operative to switch in or allow the operating power from the operating power circuitry/logic 66 to be applied or supplied to the various operating power components 52 (run mode) upon being triggered (receiving) the conditioned control signal from the signal conditioning circuitry/logic 80. The processor 60 produces a control signal that is provided to the signal conditioning circuitry/logic 80 and then to the SCR 82 when it is appropriate for the operating power to be supplied to the operating power components. Particularly, the processor 60 provides the control signal when the user actuates the washing machine 5 into a run mode (selects a run mode cycle or the like of the washing machine 5). The SCR 82 thus switches in or allows the switching in of the operating power into the circuitry/logic of the washing machine 5.

Because the operating power is needed when the appliance is started (i.e. the run mode), a start/stop signal, represented by the start/stop block 158, is provided to the controller 158 for use in producing the control signal and providing the control signal to the SCR 172. The start/stop signal is preferably provided through the operational mode indicator/cycle indicator of the laundry appliance. As well, other components of the laundry appliance, represented by the component input block 156, may provide a signal or signals for use in producing the control signal.

In one form, the processor 60 continues to provide a control signal to the signal conditioning circuitry/logic 80 during any run mode cycle of the washing machine 5 or while operating power is required. The signal conditioning circuitry/logic 80 thus continues to provide the control signal to the SCR 82 in like manner and the SCR 82, in turn, stays on to keep the operating power from the operating power circuitry/logic 66 to the operating power components 52.

Alternatively, in another form, the processor 60 provides a control signal to the signal conditioning circuitry/logic 80 that stops the application of a conditioned control signal from the signal conditioning circuitry/logic 80 to the SCR 82. The SCR 82 is thus responsive to the "off" control signal to shut off the application of the operating power from the operating power circuitry/logic 66 to the operating power components 52.

Figure 5:
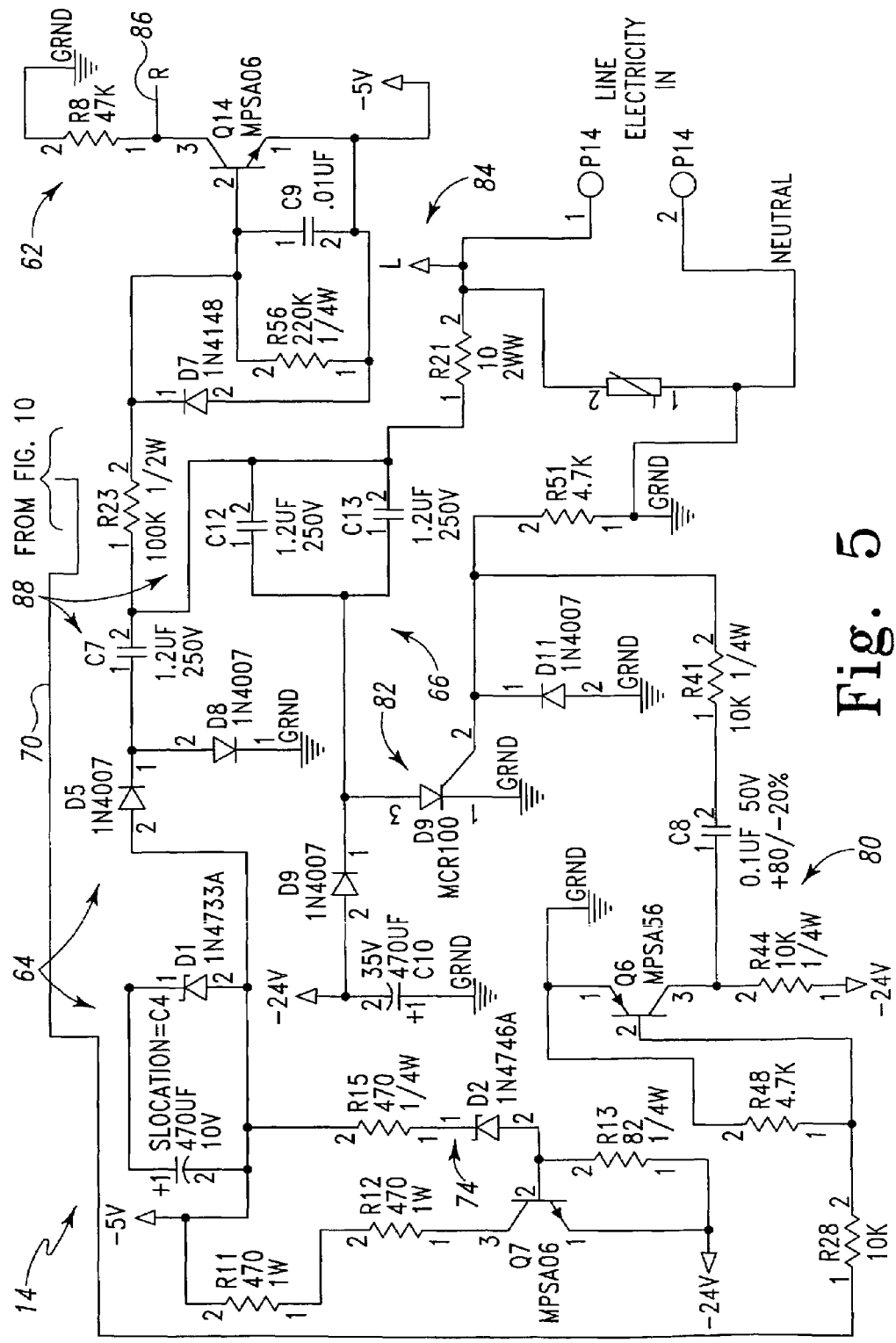
FIG. 5 is an electrical schematic of the exemplary power supply.

Referring now to FIG. 5, there is shown a specific exemplary embodiment of a power control system 14 in accordance with the present principles. The power control system 14 of FIG. 5 is shown in electrical schematic form. The power control system of FIG. 5 operates and/or functions in the manner set forth above.

The power control system 14 receives incoming electricity from a Line In electricity source. Particularly, line electricity (hot) from an electricity source (e.g. a wall plug) is provided at P14, terminal 1, wherein it is provided to other components via the terminal 84 ("L"). Neutral is coupled at P14, terminal 2, where neutral is equated with ground. A variable resistor VR1 of sufficient resistance and voltage rating is provided between the line electricity and the neutral for short circuit protection.

The line cross circuitry/logic 62 is coupled to the line electricity for providing a line cross signal R on line 86. Line 86 is in communication with the processor 60 (not shown in FIG. 5). The line cross circuitry/logic 62 includes a transistor Q14 that is biased by the line electricity such that the collector (terminal 3) provides the line cross signal. As mentioned above, the line cross signal R is utilized by the processor 60 to indicate phase of the line electricity. The line cross signal is also utilized by the processor for clocking purposes. In particular, the transistor Q14 (an NPN transistor) is alternatively switched on and off by the alternating current of the line electricity to provide the line cross signal R at line 86.

The power control system 14 includes a bank of capacitors 88 that are in communication with and charged by the line electricity. In accordance with an aspect of the present invention, only one of the capacitors, C7, however, is normally dischargeable after charging, since the terminal (terminal 1) that is opposite the terminal (terminal 2) that is in communication with the line in electricity, completes a circuit. Particularly, the capacitor C7 is dischargeable through the diode D5 and a five (5) volt power supply circuitry/logic formed, in part, by the diode D1 and the capacitor C4. This forms the standby/low power circuitry/logic 64. The standby/low power circuitry/logic 64 may include more than one capacitor (C7) if desired or necessary.

The standby or low power circuitry/logic 64 is thus always operative when the washing machine 5 is plugged into the line electricity. Clamping circuitry 74 is provided in communication with the standby/low power circuitry/logic 64 to keep the standby/low power circuitry/logic (the five volt power circuitry/logic) at a constant voltage level.

While the other capacitors C12 and C13 of the capacitor bank 88 normally charge, they are not normally able to discharge, and thus form a normally open circuit. The SCR 82, however, is provided that is operative to provide a discharge path for the capacitors C12 and C13 upon the application of a control signal to the SCR 82. The control signal is provided via control line 70 from the processor 60 to the control signal conditioning circuitry/logic 80. The control signal is then applied to the gate (terminal 2) of a transistor Q6 (a PNP transistor) of the control signal conditioning circuitry/logic 80 wherein a control signal is taken from the collector (terminal 3) and applied to the control input (terminal 2) of the SCR 82.

When the SCR 82 is turned on (allowed to conduct) by the application of the control signal from the transistor Q6, a discharge path is created for the capacitors C12 and C13. The capacitors C12 and C13 discharge through the diode D9 that, together with capacitor C10, provides a rectified (DC) operating voltage of twenty-four (24) volts. This, in part, constitutes the operating power circuitry/logic 66. Thus, only when a control signal is applied to the circuitry/logic, does the operating power become applied/supplied to the proper components of the washing machine 5.

It should be appreciated that operating power circuitry/logic 66 may include any number of capacitors as desired or necessary. Further, it should be appreciated that the various values of resistors and capacitors of the power control system 14 are subject to modification as desired.

Figure 6:
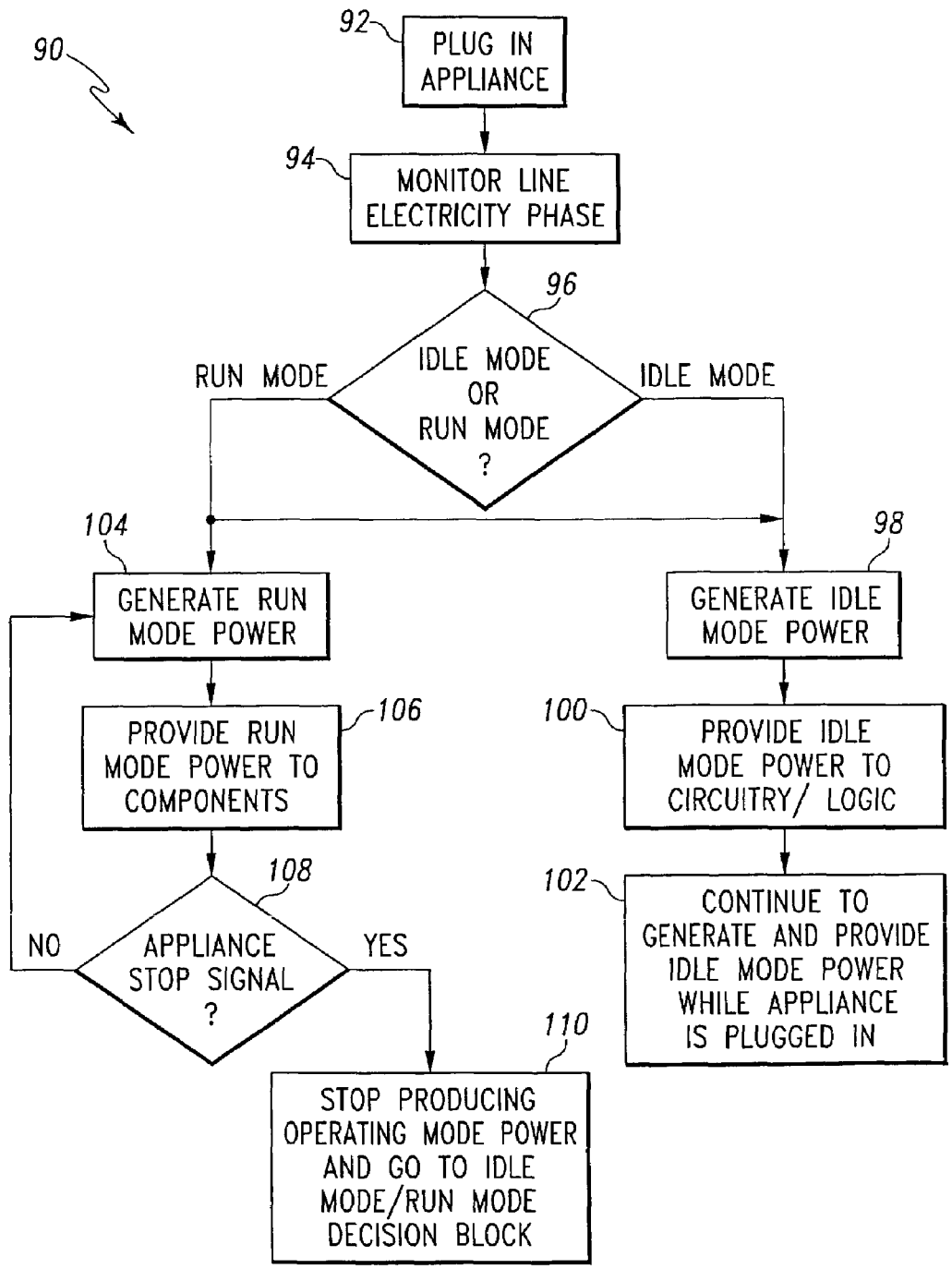
FIG. 6 is a flowchart of an exemplary manner of operation of the exemplary power supply.

With reference to FIG. 6, an exemplary manner of operation of the present power control system will be described in conjunction with the flowchart thereof, the flowchart generally designated 90. Initially, the washing machine is plugged into a source of suitable electricity (line electricity), step 92. This is typically a wall outlet (not shown) of a home, business, or the like such as is known that supplies 120 or 240 volt AC power. When the power control system is receiving line electricity, the phase of the line electricity is monitored, step 94. The power control system monitors the phase of the line electricity for clocking purposes of and the like.

The washing machine monitors and/or determines if the washing machine is to be or is in an idle mode or a run mode, step 96. If in the idle mode, the power control system generates idle mode (low) power, step 98. The idle mode power is provided to the idle mode (low/standby) power circuitry/logic, step 100. The power control system continues to generate and provide idle mode power as long as the washing machine is plugged in, step 102.

In step 96, if the washing machine is or is to be in a run mode, the power control system generates run mode (operating) power, step 104, and generates idle mode (operating) power 98 (and additionally performs steps 100 and 102). In step 106, the generated run mode power is provided to the run power components. The power control system determines whether a stop signal has been produced or not, step 108. If a stop signal has been produced, then run mode power is ceased, and the power control system/washing machine returns to the idle/run mode decision step (step 96), step 110. If a stop signal has not been produced, then run mode power is generated (back to step 104) until a stop signal is produced.

With respect to the operation of the power supply, idle mode power is preferably always generated when the washing machine is plugged in. This allows the integrated circuits and the like to be powered up for clocking and other purposes. Not all of the integrated circuits may necessarily be provided idle mode (standby or low) power. Further, run mode (operational) power is typically provided only when the washing machine is turned on by the user (a run mode or cycle is chosen).

Auxiliary Inputs

As seen in FIG. 1 the appliance control system (ACS) 10 of the washing machine 5 has a plurality of auxiliary input units 44. Each auxiliary input unit 44 is operative to allow the selection or adjusting of various parameters of and/or related to the washing machine 5. In particular, the auxiliary input units 44 allow a user to select various options or parameters for the operating mode of the washing machine (the operating mode being separately selected by the user via the main controller module 300 of the ACS 10. The options may be water temperature, rinse options, load size, speed, fabric type, or the like depending on the particular make and/or model of the washing machine.

Referring now to FIGS. 7 and 8, there is shown a representation of the plurality of auxiliary inputs or input units, generally designated 44 of the ACS 10. In accordance with an aspect of the present invention, the plurality of auxiliary input units 44 are connected in series, with a first auxiliary input unit 112 coupled to and in communication with an auxiliary input port 114 of the ACS 10. Since the auxiliary input units 44 are typically mounted on the control panel 40 (see FIG. 1) the auxiliary input units 44 are remote from the majority of the electronic circuitry/logic of the ACS 10. The majority of the electronic circuitry/logic of the ACS 10 is thus provided on one or just several PC boards. Providing a port on one of the PC boards, provides a convenient way to coupled the auxiliary input units 44 to the remainder of the electronic circuitry/logic of the ACS 10.

An output of the first auxiliary input unit 112 is coupled to the auxiliary input port 114 and thus in communication with the processor 60 via two wires or conductors 122 and 124. An output of a second auxiliary input unit 118 is coupled to and in communication with an input of the first auxiliary input unit 112 via two wires 126 and 128. Any intermediate or middle auxiliary input units (not shown but represented by "•••" in FIGS. 7 and 8) are likewise coupled to and in communication with a previously adjacent auxiliary input unit. The last auxiliary input unit 120 is coupled to and in communication with the intermediary auxiliary input units via two wires 130 and 132. The series connection of auxiliary input units 44 form a daisy-chain and, more particularly, a two-wire daisy-chain or serial connection. Any amount of auxiliary input units 44 is thus daisy-chainable.

Each auxiliary input unit 112, 118, and 120 has a respective knob, dial, or the like 134, 136, and 138. The knobs 134, 136, and 138 allow for the user-selection of the various adjusting parameters of the appliance. The knobs may be discrete, position type switches or may be variable position controls. In either case each knob 134, 136, and 138 allows a user to select a position that corresponds to a particular option of two or more possible options. Typically one auxiliary input unit is dedicated to a particular option such as water temperature. As an example and referring to FIG. 7, the auxiliary input unit 120 has two user-selectable options, positions, or settings labeled A and B. The indicator (arrow) on the knob 138 points to selection A. In accordance with an aspect of the present invention, position A has a unique parameter value associated therewith, while position B also has a unique parameter value associated therewith. The unique parameter value of the position or setting of the knob 138 (or the auxiliary input unit 120) is provided as a parameter value signal to the adjacent auxiliary input unit, here the auxiliary input unit 118). The auxiliary input unit 118 has three user-selectable options, positions, or settings labeled C, D, and E. Each position C, D, and E has a unique parameter value associated therewith. In accordance with an aspect of the present invention, the unique parameter value of the position or setting of the knob 136 (or the auxiliary input unit 118) is combined with the unique parameter value of the auxiliary input unit 120 and provided as a combined parameter value signal to the adjacent auxiliary input unit closest to the auxiliary input port 114, here the auxiliary input unit 112). The auxiliary input unit 112 has three user-selectable options, positions, or settings labeled F, G, and H. Each position F, G, and H has a unique parameter value associated therewith. In accordance with an aspect of the present invention, the unique parameter value of the position or setting of the knob 134 (or the auxiliary input unit 112) is combined with the combined unique parameter value of the auxiliary input units 120 and 118 and provided as an aggregate parameter value signal to the auxiliary input port 114, and thus the processor 60. The processor 60, under control of program instructions contained in the memory 116 analyzes the aggregate parameter value signal to determine the particular option selected for each auxiliary input unit. The unique aggregate parameter value is thus used to determine the parameter value for each auxiliary input unit 44. Once the particular parameter value is known for each auxiliary input unit 44, the particular option or setting for each auxiliary input unit is known.

Referring particularly to FIG. 8, the plurality of auxiliary input units 44 are shown in side view. Each knob 134, 136, and 138 is connected to a respective shaft 140, 142, and 144 that is retained in a respective body 146, 148, and 150. Each knob and shaft combination, 134/146, 136/148, and 138/150 is rotatable relative to its respective body 146, 148, and 150. Additionally each knob/shaft combination, 134/146, 136/148, and 138/150 includes a respective detent plate 152, 154, and 156. Each detent plate 152, 154, and 156 is fixed relative to its respective knob/shaft combination, 134/146, 136/148, and 138/150. Each knob 134, 136, and 138 includes a plurality of grooves or notches on an underside thereof such that the knob and detent plate combinations 134/152, 136/154, and 138/156, co-act with one another during rotation of the knob/shaft combination, 134/146, 136/148, and 138/150. This provides a tactile feedback for a user during rotation thereof.

Figure 10:
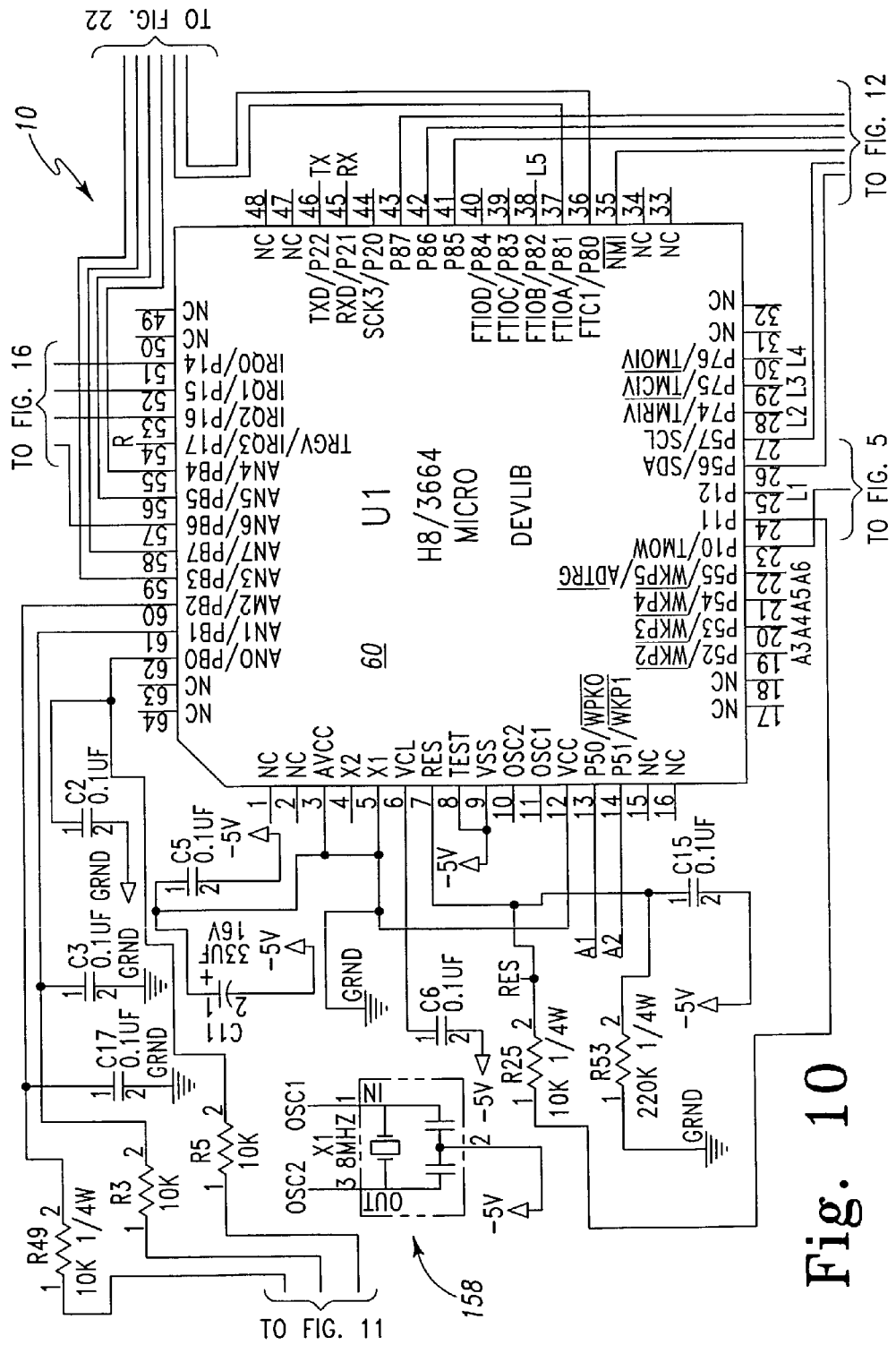
FIG. 10 is a partial electrical schematic of the appliance control system in accordance with the principles presented herein.
Figure 11:
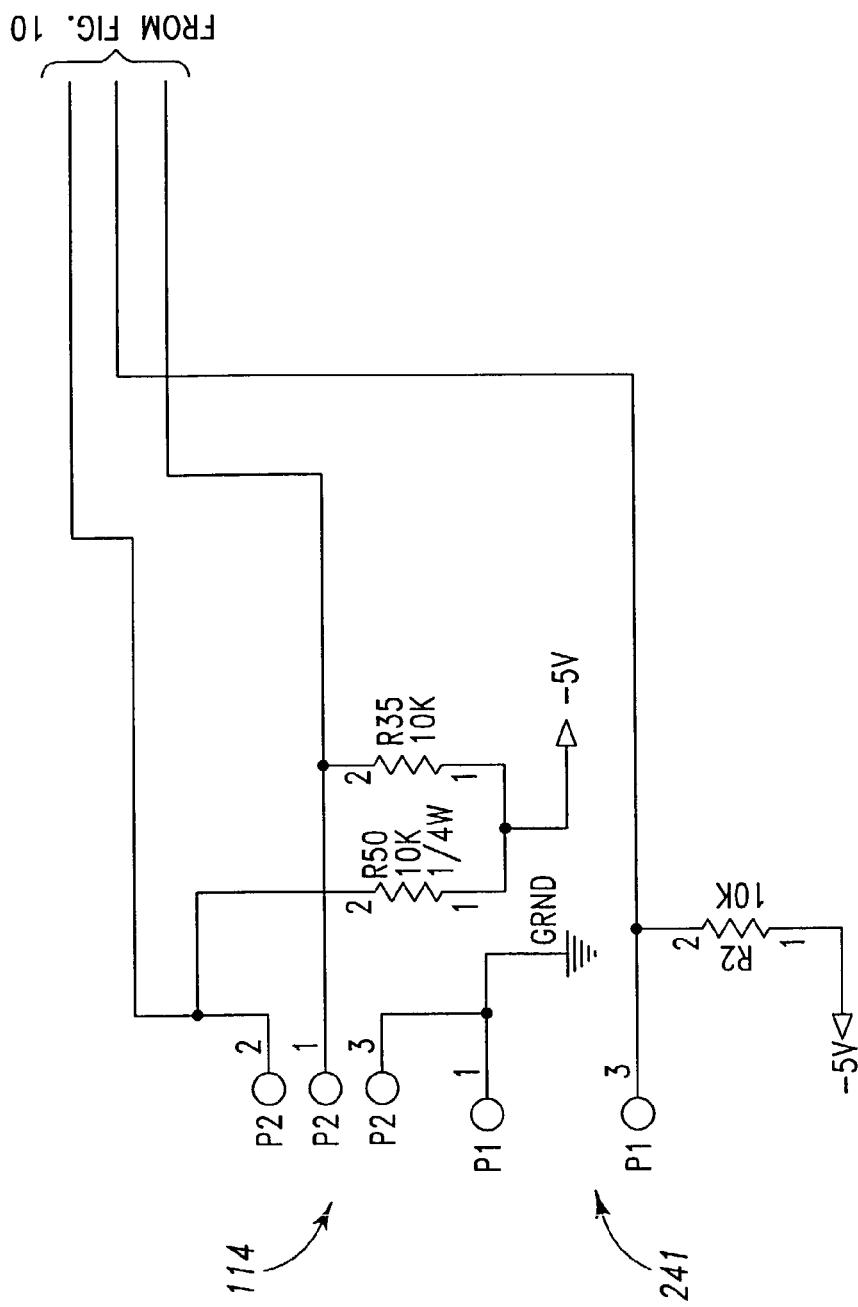
FIG. 11 is a partial electrical schematic of the appliance control system.
Figure 12:
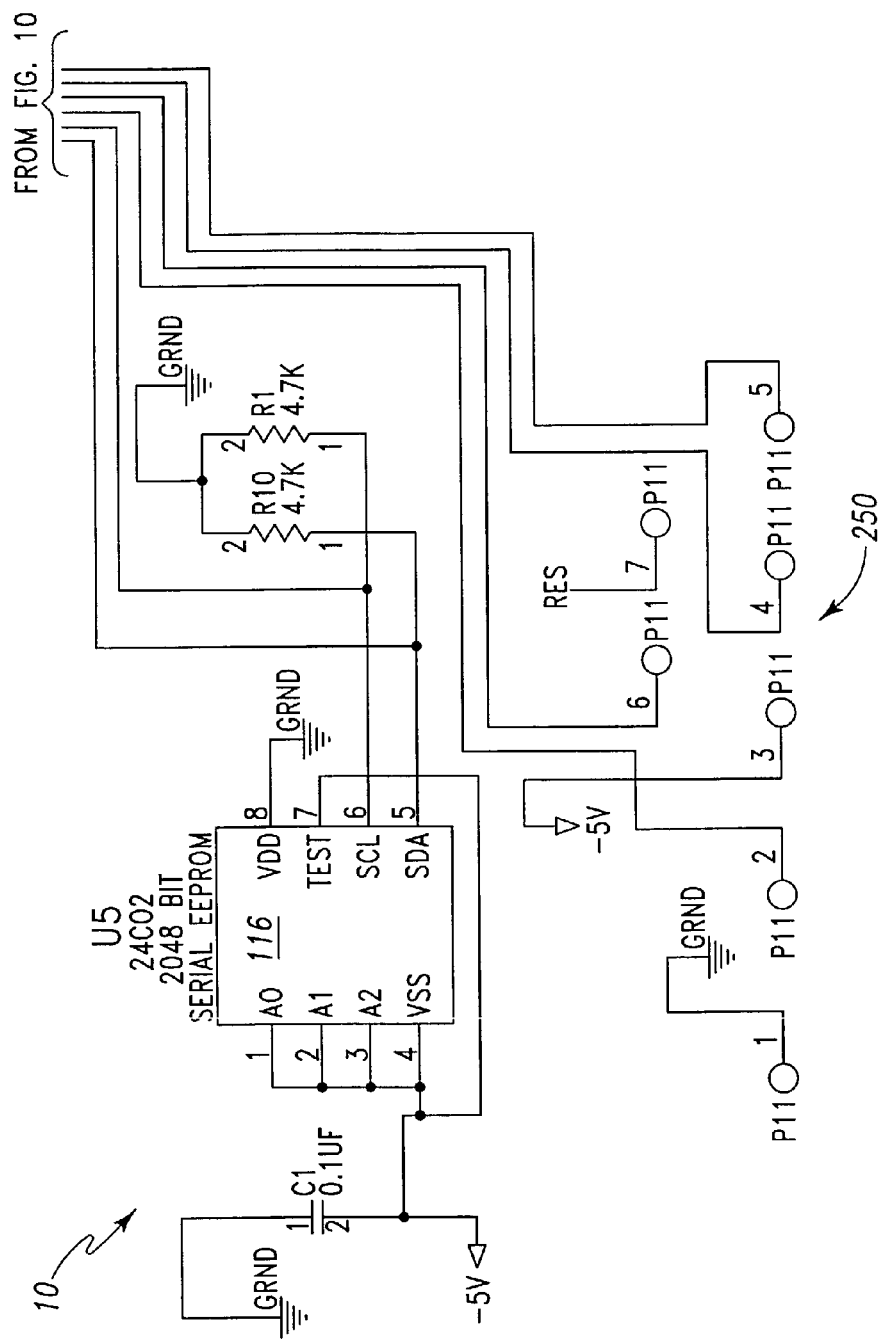
FIG. 12 is a partial electrical schematic of the appliance control system.

In FIGS. 10-12, there is depicted electrical schematics of an embodiment of a portion of the ACS 10. In FIG. 10, the processor 60 of the ACS 10 is shown as a Hitachi HB/3664 microcontroller (labeled U1), but which can be any suitable processor or processor unit. The various electrical components and connections to the processor 60 are shown. For instance, a clocking circuit 158 is depicted that provides clock signals for the processor 60, wherein the OSC 1 of the clock circuitry 158 is coupled to pin 11 (OSC1) and the OSC 2 of the clock circuitry 158 is coupled to pin 10 (OSC2).

In FIG. 11, the auxiliary input port 114 is formed of a first channel input labeled P2, terminal 1, and a second channel input labeled P2, terminal 2. The first and second channels receive as inputs the two wires (122 and 124) of the first auxiliary input unit 112. Preferably, the first and second input terminals are in the form of a receptacle that is adapted/configured to receive a mating plug as a termination of the two wires 122 and 124. A third terminal, labeled P2, terminal 3, may be provided as part of the receptacle and is coupled to electrical ground. In this case, a third wire may be provided from each auxiliary input unit, or as one conductor of a two conductor wire from the auxiliary input unit. The first and second channels, P2 terminal 1 and P2 terminal 2 are coupled to or in communication with the processor 60 in order to provide the aggregate parameter value signal to the processor 60 from the auxiliary input units 44.

In FIG. 12, the memory 116 that stores the program instructions for the ACS 10 and the washing machine 5 in general, includes a serial data line input/output, labeled SDA (pin 5) for communication with the processor 60 and a serial clock line input, labeled SCL (pin 6) for receipt of clocking signals from the processor 60. In this manner, the program instructions may be transferred to the processor 60, while the memory 116 may also be written to by the processor 60. In accordance with an aspect of the present invention that is described in greater detail below, the memory 116 is operative to be erased and to store new program instructions, particularly via a communications port. The memory 116 thus provides the program instructions to the processor 60 for resolving the parameter value signal into a command signal for application of the appropriate features in accordance with the user-selected adjusting parameters.

Each auxiliary input unit 112, 118, and 120 provides a signal regarding the angular or rotational position of the respective knob and shaft 134/140, 136/142, and 138/144 relative to its respective body 146, 148, and 150 that is communicated to the processor 60 via the auxiliary input port 114. The rotational or angular position of each knob/shaft 134/140, 136/142, and 138/144 relative to its respective body 146, 148, and 150 of the respective auxiliary input unit 112, 118, and 120 determines a particular parameter or option selection of various parameter or option selections for the particular auxiliary input unit. Such also produces a unique aggregate parameter value signal. The processor 60, under control of programming instructions retained or stored in the memory 116, is operative to determine each auxiliary parameter selection based on the particular parameter value signal generated or produced by the rotational or angular position of the knob/shaft 134/140, 136/142, and 138/144 relative to its respective body 146, 148, and 150. The processor 60 then uses this information to perform the particular function according to the selection.

Figure 9:
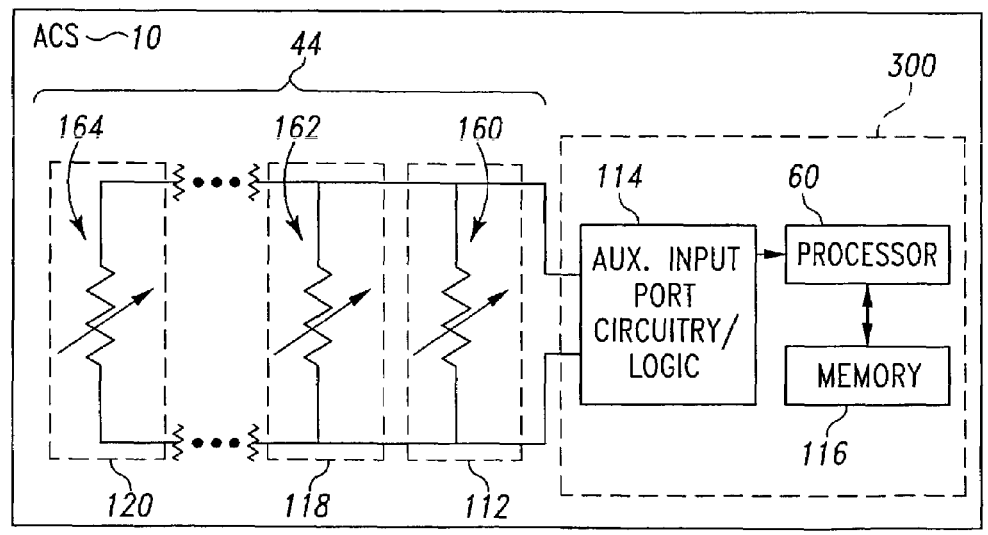
FIG. 9 is a simplified electrical schematic of the representation of FIGS. 7 and 8.

Referring to FIG. 9, an embodiment or implementation of auxiliary input units 44 in accordance with the above is shown. In one form, each auxiliary input unit 112, 118, and 120 may be or form a variable resistor (respectively variable resistors 160, 162, and 164) wherein resistance is the parameter value. The auxiliary input units 112, 118, and 120 may thus be low power potentiometers. It should be appreciated, however, that the type of device that yields a parameter value in the same or similar manner as that described above may be used. In the case of the variable resistors 160, 162, and 164, the angular or rotational position of a knob/shaft 134/140, 136/142, and 138/144 produces a different resistance value for the respective auxiliary input unit. The auxiliary input units 44 cooperate with each other to produce a unique aggregate resistance value or signal for the particular arrangement of user knobs of the auxiliary input units 44. This unique resistance signal is received by the processor 60 thereby providing user selection information relating to the various auxiliary input units 44 to the processor 60. The processor 60 utilizes the program instructions in the memory 116 to determine the setting for each auxiliary input unit based on the aggregate resistance signal, wherein the setting defines the selected option. The range of resistance values of the variable resistors or potentiometers are selected appropriately such that calculations may be performed on the aggregate resistance signal to yield the rotational or angular positions of the knobs/shafts which determined the user selection of adjusting parameters for the appliance.

Figure 13:
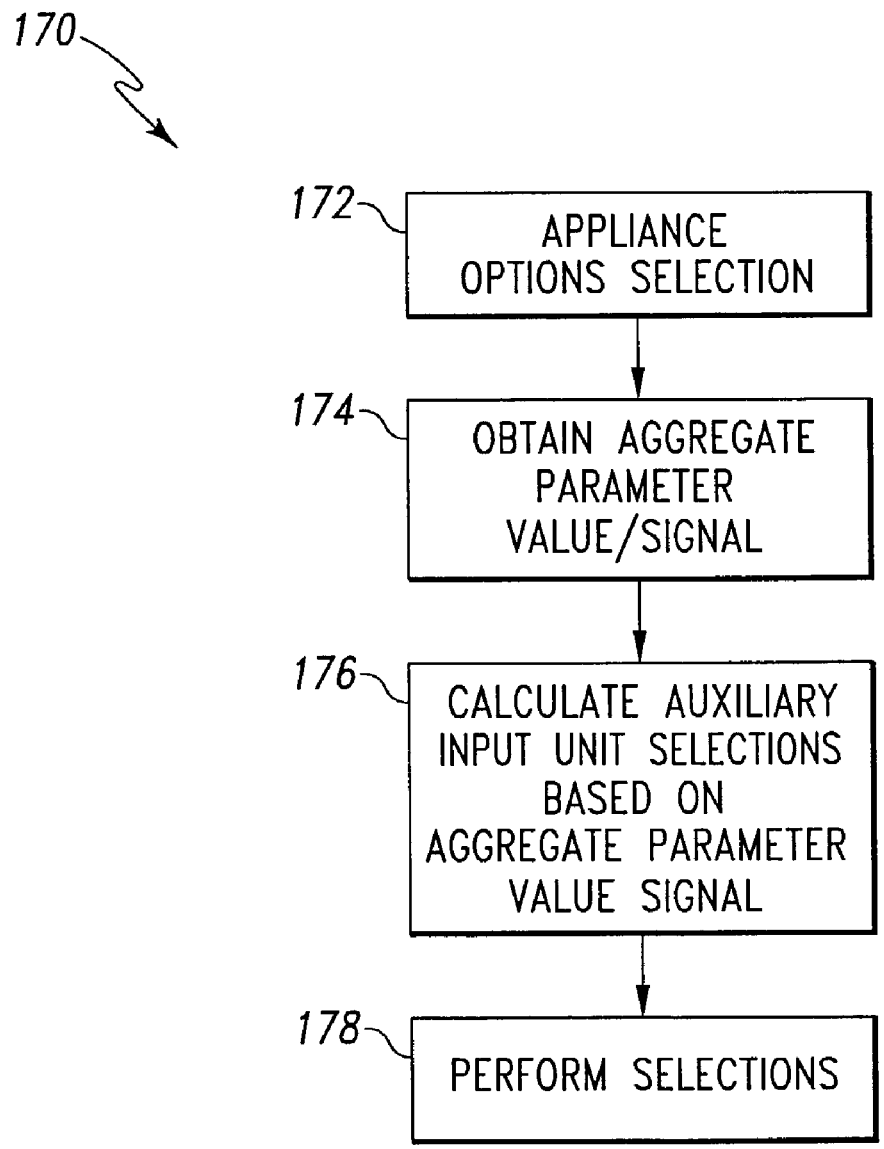
FIG. 13 is a flowchart of an exemplary manner of operation of the auxiliary inputs of the present invention.

With reference to FIG. 13, there is depicted a flowchart, generally designated 170, of an exemplary manner of operation or use of the auxiliary input units 44. In step 172, there is selection of appliance options or settings for a particular mode or cycle of operation by a user. This is accomplished by rotating the knob, dial, switch, or the like of each auxiliary input unit to a particular position corresponding to a desired option or setting. Depending on the appliance, the auxiliary input units correspond to different options. Once the various option settings have been selected via the auxiliary input unit(s), each auxiliary input unit produces a parameter value. The parameter values of all of the auxiliary input units are combined such that an aggregate and unique combination of parameter values are produced by the auxiliary input units. In step 174, the processor or controller obtains this aggregate parameter value or signal. The processor may obtain the aggregate parameter value when it is appropriate. A typical appropriate time is when the washing machine (appliance) is turned on or after the washing machine is turned on and during a time when the parameters would affect appliance operation or function.

In step 176, the processor then calculates the position of the various auxiliary input units based on the aggregate parameter value/signal. Since the washing machine knows the number of auxiliary input units and the range of parameter values each auxiliary input unit can assume, the aggregate parameter value/signal correlates to knob (rotation or angular) position of the auxiliary input units that corresponds to the selected options. Thereafter, in step 178, the washing machine performs the option selections at the appropriate time.

Hyperspin Mode

In accordance with another aspect of the present invention, the washing machine 5 (see FIG. 1) is operative to provide a hyperspin mode of operation during a drying cycle or mode of the washing machine 5 when appropriate. Particularly, the motor 26 of the washing machine 5 is operative in two speeds, namely, a normal or first speed and a hyper or second speed. Since the motor 26 is coupled to the receptacle 32 such that the motor 26 rotates or spins the receptacle 32, the motor 26 is operative to rotate or spin the receptacle up to the limit of the first speed and up to the limit of the second speed. It should be appreciated that the term "up to" is used to denote that even though the motor 26 is operative to rotate at two speeds in accordance with the application of a known, steady power, various factors may prevent the receptacle 32 from being rotated at the same or maximum first or second speeds of the motor 26. These various factors may be measured as parameters of the receptacle 32 during either at rest and/or during rotation thereof.

The first speed corresponds to a traditional spin dry cycle mode of the washing machine 5, while the second speed corresponds to the present hyperspin mode wherein the receptacle 32 is spun at a speed that is greater than the first speed. A typical first speed is around 600 RPMs To prevent damage to the washing machine 5 as a result of spinning heavier, unbalanced loads at the second speed, a processor or controller detects various parameters of receptacle 26 and/or the washing machine 5 while the receptacle 32 is spun at the first speed. If the detected parameters are at or within acceptable parameter levels or ranges, the processor 60 operates to cause the motor 26 to rotate the receptacle 32 at the second speed (higher or hyper speed) thereby resulting in removal of more water from the contents of the laundry in the receptacle 32 than at the first speed (traditional speed). An eximplary second or hyper speed is around 800-850 RPMs, but may be only around 700 RPMs depending on the washing machine type.

Figure 14:
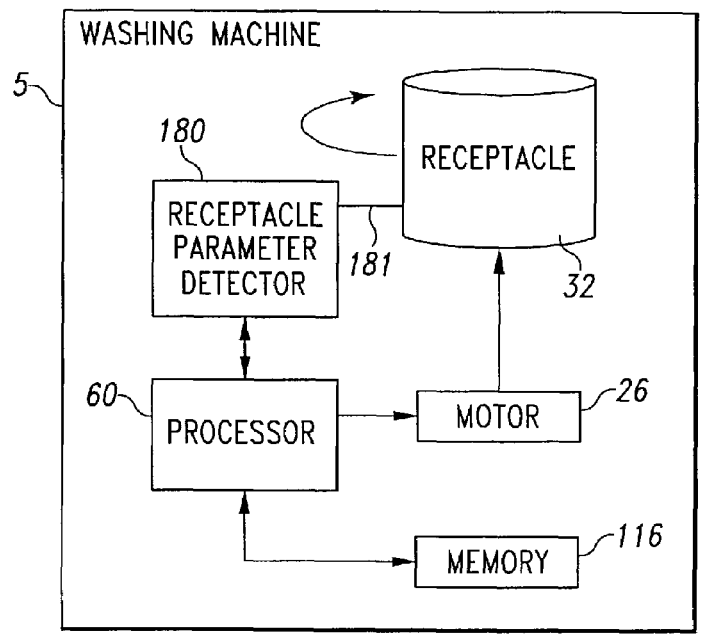
FIG. 14 is a block diagram representation of a hyperspin feature in accordance with an aspect of the present invention.

Referring to FIG. 14, there is depicted a block diagram of the washing machine 5 that is operative to provide the present hyperspin feature/function in accordance with the present principles. The washing machine 5 is shown with the receptacle 32 for receiving laundry to wash. The receptacle 32 is adapted to rotate or spin up to a maximum first speed and up to a maximum second speed, with the second speed being greater than the first speed. The receptacle 32 is coupled to the motor 26 that is operative to spin the receptacle at a first and second speed.

It should be appreciated that the hyperspin aspect of the present invention relates to the drying cycle or mode of the washing machine 5. The receptacle 32 is typically agitated during washing modes or cycles such that the receptacle 32 rotates in one direction then another (clockwise and counterclockwise) in short, successive cycles. When the washing machine 5, however, is in a drying mode or cycle (i.e. the washing machine is trying to remove as much excess water from the laundry), the receptacle 32 is spun by the motor 26 in a single rotational direction (clockwise or counterclockwise). The motor 26 rotates the receptacle 32 at the first speed during the normal or typical drying mode or cycle. It will be assumed that the washing machine 5 is in the drying mode or cycle for purposes of the present hyperspin discussion.

The motor 26 is under control of the processor 60. The processor 60 utilizes program instructions stored in the memory 116 to perform the present hyperspin feature. The washing machine 5 further includes a receptacle parameter detector 180. The receptacle parameter detector 180 is coupled to or in communication with the receptacle 32, represented by the line 181, and/or the washing machine 5 itself (in which case the receptacle parameter detector functions as a washing machine detector. The receptacle parameter detector 180 is operative to receive or sense parameter data regarding the receptacle 32 and/or the washing machine 5 in general, generate a signal or signals representative of the sensed and/or detected parameter data, and forward the sensed and/or detected receptacle parameter data signal(s) to the processor 60. The receptacle parameter detector 180 provides receptacle parameter data signals to the processor 180 during operation of the washing machine 5 but may also provide correlating data when the washing machine 5 is not in use or during operational cycles other than the drying cycle. The processor 60 utilizes the receptacle parameter data signals to determine an operating state of the washing machine 5 in general and/or of the receptacle 32. The receptacle parameter detector data signals present values or levels of parameter data either on a discrete basis and/or on a continuous basis.

The motor 26 is operative during the drying cycle to rotate at the first speed to rotate the receptacle 32 up to the particular first speed. During this time, the processor 60 receives receptacle parameter data signals from the parameter detector 180. If the parameter data signals are less than a predetermined threshold value or level or within a predetermined threshold range, the motor 26 is caused to run at a second or hyper speed that is greater than the first speed. As an example of the above, the second or hyper speed of the receptacle 32 is 25% greater that he first speed of the receptacle 32. Thus, the receptacle 32 is caused to rotate up to the second or hyper speed. The parameter data signals are monitored to determine if the parameter exceeds the predetermined threshold level or is outside the threshold range in order to cause the motor 26 to return to the first speed and thus rotate the receptacle 32 down to the first speed as a maximum. This may be repeated as appropriate during the drying cycle of the washing machine 5.

Figure 15:
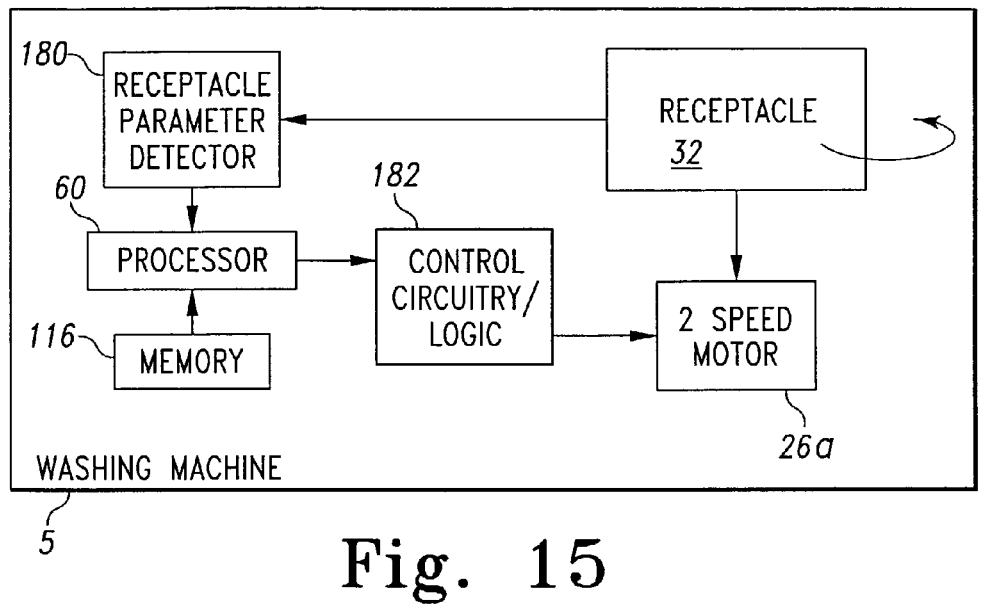
FIG. 15 is another block diagram representation of the hyperspin feature.

In FIG. 15, there is depicted a more detailed block diagram of the washing machine 5 in accordance with the principles presented herein. In FIG. 15, the washing machine 5 includes control circuitry/logic 182 that is in communication with the processor 60 and a two-speed motor 26a that is in communication with the control circuitry/logic 182. The two-speed motor 26a is operative to rotate at two distinct speeds corresponding to the first speed and the second, hyper speed. In turn, the receptacle 32 is rotatable by the two-speed motor 26a up to the maximum rotation velocity of the first and second speeds. The maximum rotation speeds of the receptacle 32 are limited by the maximum rotation speeds of the motor 26a and various parameters or conditions of the receptacle such as load amount and load balance. The motor 26a receives signals from the control circuitry/logic 182 that receives control signals from the processor 60, specifically to actuate the motor 26a accordingly to put the motor 26a into the first or second speeds, or energize appropriate windings of the motor 26a that are responsible for the two speeds. Again, the memory 116 stores program instructions that are provided to the processor 276 as appropriate. The washing machine 5 includes the receptacle parameter detector 180 that is in communication with the receptacle 32 and/or the washing machine 5. The receptacle parameter detector 180 is operative to obtain data regarding various conditions or parameters of the receptacle 32 and/or the washing machine 32, most particularly during the drying cycle of the washing machine 5. The condition/parameter data is forwarded to the processor 60 that is operative via program instructions stored in the memory 116 to analyze the condition/parameter data and provide outputs to various other components and/or circuitry/logic as appropriate. This is to determine whether receptacle conditions are favorable to spin the receptacle 32 at the hyperspin speed.

Figure 16:
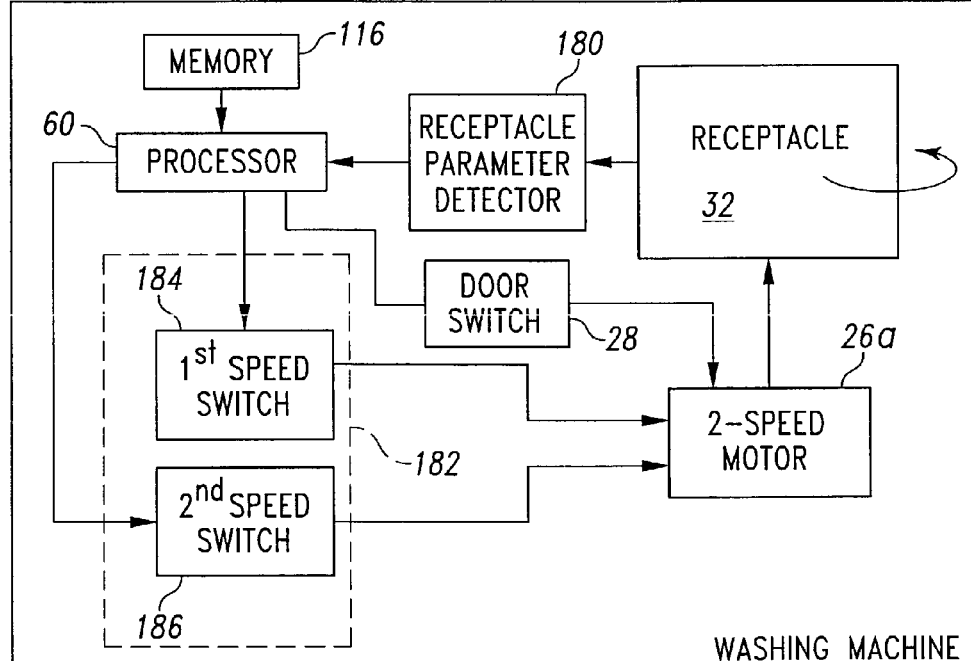
FIG. 16 is another block representation of the hyperspin feature.

Referring to FIG. 16, there is depicted a more detailed block diagram of the washing machine 5 and, in particular, the control circuitry/logic 182. The control circuitry/logic 182 includes a first speed switch or switching circuitry/logic 184 and a second speed switch or switching circuitry/logic 186 each of which is under control of the processor 60. The first speed switch 184 is operative to cause the two-speed motor 26a to operate in or at the first speed. The second speed switch 186 is operative to cause the two-speed motor 26a to operate in or at the second speed, wherein the second speed is greater than the first speed. Particularly, the second speed is the hyperspin speed for the receptacle 32. The washing machine 5 also includes the door switch 28 that is operative to cut power to or turn off the motor 26a when the lid or door of the washing machine is opened or open.

The door switch 28 is in communication with the lid 34 of the washing machine 5 (see FIG. 1) such that the lid 34 must be closed before the motor 26a will operate. When the lid 34 is closed the switch allows the motor 26a to operate. When the lid 34 is open the switch prevents the motor 26a from operating. It does not matter whether the switch 34 is normally open or closed. In this manner, the door switch 34 provides a safety mechanism. Additionally, the state of the door switch 34 is monitored by the processor 60 such that other functions and/or features of the washing machine 5 may be at least temporarily halted when the lid 34 is open, and then possibly restarted when the lid 34 is closed.

The receptacle parameter detector 180 may take several forms depending on the parameter or condition that is to be monitored. In one form, vibration or wobble of the receptacle 32 may be monitored. In another form, the rotation speed or velocity of the receptacle 32 may be monitored. Load amount (weight) and/or load distribution may also be taken into account. Of course, other parameters or conditions of the receptacle 32 may be detected, monitored, or measured. It should be appreciated that the parameter detector 180 represents one or more of the various forms of detecting, monitoring, and/or measuring conditions and/or parameters of the receptacle 32 and/or the washing machine 5. Likewise, it should be appreciate that the term parameter also encompasses a condition, state, mode, characteristic, manner, or the like.

The receptacle 32 (and/or washing machine 5) is monitored via one or more of the above forms in order to detect imbalance during the drying cycle (rotation), particularly or initially at the first speed. Imbalance of the receptacle 32 relative to a central vertical axis of the receptacle 32 as a result of an imperfect laundry load distribution within the receptacle 32, can cause undue stresses and strains on the system. Since the drying cycle spins the receptacle 32 at a fairly high rate or revolutions per minute, the monitoring of the receptacle is appropriate before an even higher rate of speed (hyperspin) is attempted or attained. If the receptacle is rotating within an acceptable parameter threshold range or at or below a parameter threshold value, the hyperspin mode will be attained, else the motor will remain at the first speed. As well, continuous monitoring is appropriate at the first speed if hyperspin fails to determine if hyperspin can later be achieved within the remaining drying time and after the hyperspin mode is achieved in order to detect is an off balance condition develops. If an off balance condition develops during the hyperspin mode, the motor will be put back to the first speed. The imbalance or off balance condition, if any, of the receptacle 32 during rotation should therefore be monitored to avoid mechanical problems.

Vibration may be monitored utilizing a vibration sensor or sensors strategically placed on and/or around the receptacle 32. The processor 60 monitors vibration data from the vibration sensors. Particularly, the processor 60 under the control of program instructions stored in the memory 116, monitors the vibration data during the normal drying operation. If the vibration data indicates that the vibration is at or below a threshold vibration value or level, or within a threshold range, the processor 60 will send an actuation signal to the second speed switch 186. The actuation signal will cause the second speed switch 186 to put the two-speed motor 26a into the second speed (hyperspin) such that the receptacle 32 will be rotated up to the second speed. The processor 60 continues to monitor the vibration data from the vibration sensor(s) during the hyperspin mode.

The vibration data from the vibration sensor(s) indicates generally the load/balance state of the receptacle 32. In particular, if the laundry within the receptacle 32 is well balanced during the first speed, there will be little to no vibration produced during the first speed spin of the receptacle 32. If, however, the laundry within the receptacle 32 is not well balanced during the first speed spin of the receptacle 32, there will be vibration of a greater degree than with a more balanced load. The degree or level of vibration must be acceptable (i.e. at or below a threshold vibration level, or within a threshold vibration level range) before the processor 60 actuates the second speed switch 186 that causes the motor 26a to spin the receptacle 32 at the hyperspin speed (alternatively, if the level of vibration is unacceptable, the processor 60 will not actuate the second speed switch 186 that makes the motor 26a to enter the hyperspin mode).

Rotation speed or velocity of the receptacle 32 may also be monitored, detected, or measure either from the receptacle itself, a rotation shaft of the receptacle 32 or otherwise. This may be accomplished via a hall effect sensor and a magnet, a light beam transmitter/detector, a shaft encoder, or the like. In the case of receptacle rotation speed detection, in the ideal situation or case, the receptacle 32 can only rotate at the maximum speed of the motor. A deviation of speed in the downward direction (less than the maximum) rotation speed indicates a load imbalance. Typically, however, the receptacle will not ideally achieve the maximum rotational speed or velocity of the motor either at the first or second speed. It will be somewhat less even with a "perfectly" balanced laundry load. In other words, rotation speed of the receptacle will typically be somewhat slower than the maximum of the ideal motor speed. Thus, the rotational velocity of the receptacle 32 will be monitored, detected, or measured to determine if the rotational speed or velocity of the receptacle is above a threshold rotation speed value or within an acceptable rotation speed range. If the rotational speed of the receptacle 32 is above the threshold speed value or within the acceptable threshold speed range, the processor 60 will cause the second speed switch 186 to actuate causing the motor 26a to go into the hyperspin mode (second speed). As well, the parameter detector 180 will provide continuous monitoring, detecting, and/or measuring of the rotational speed to determine if all is well or if the motor should be taken back to the first speed.

Figure 17:
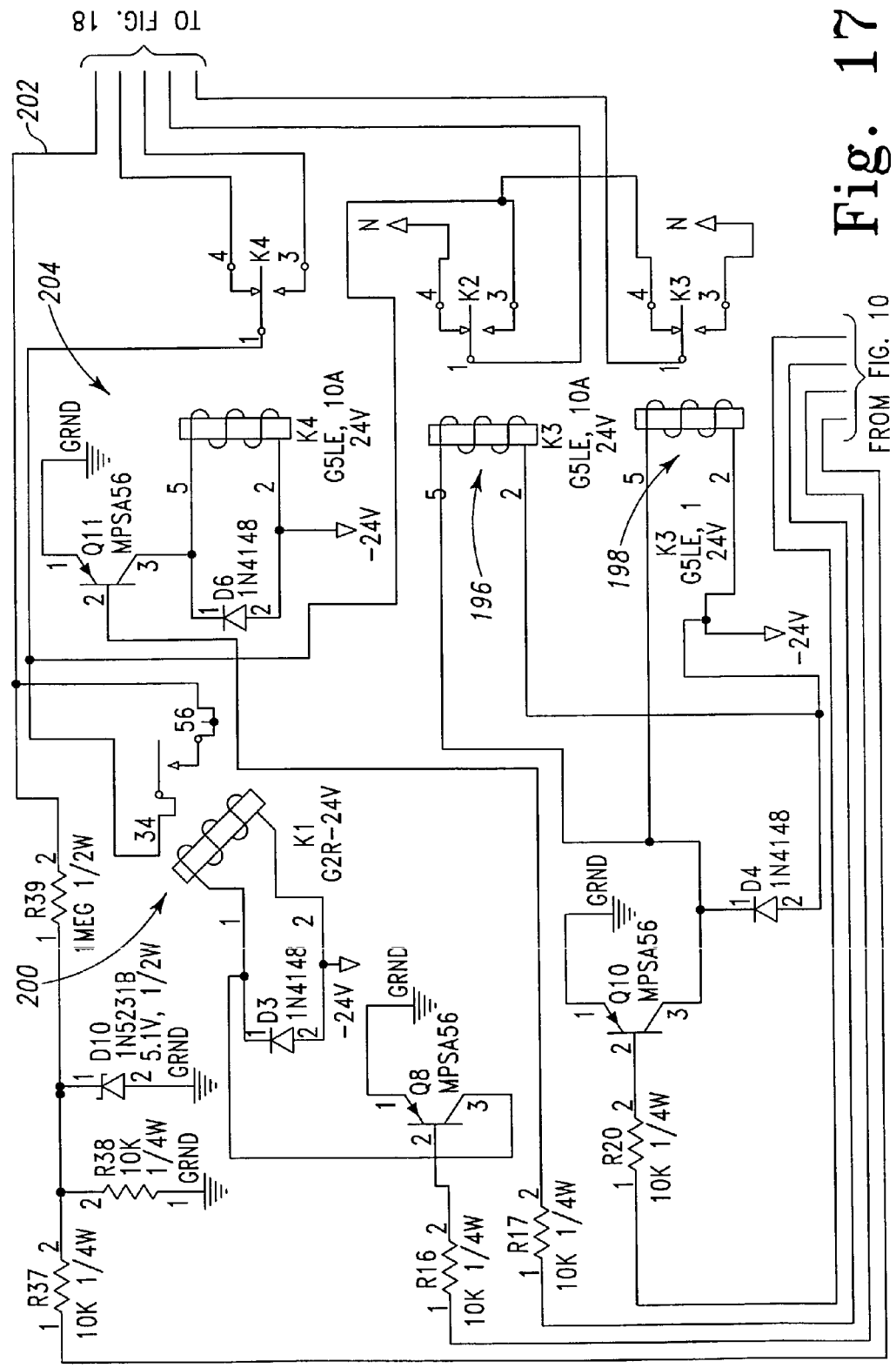
FIG. 17 is a partial electrical schematic of the hyperspin portion of the appliance control system.
Figure 18:
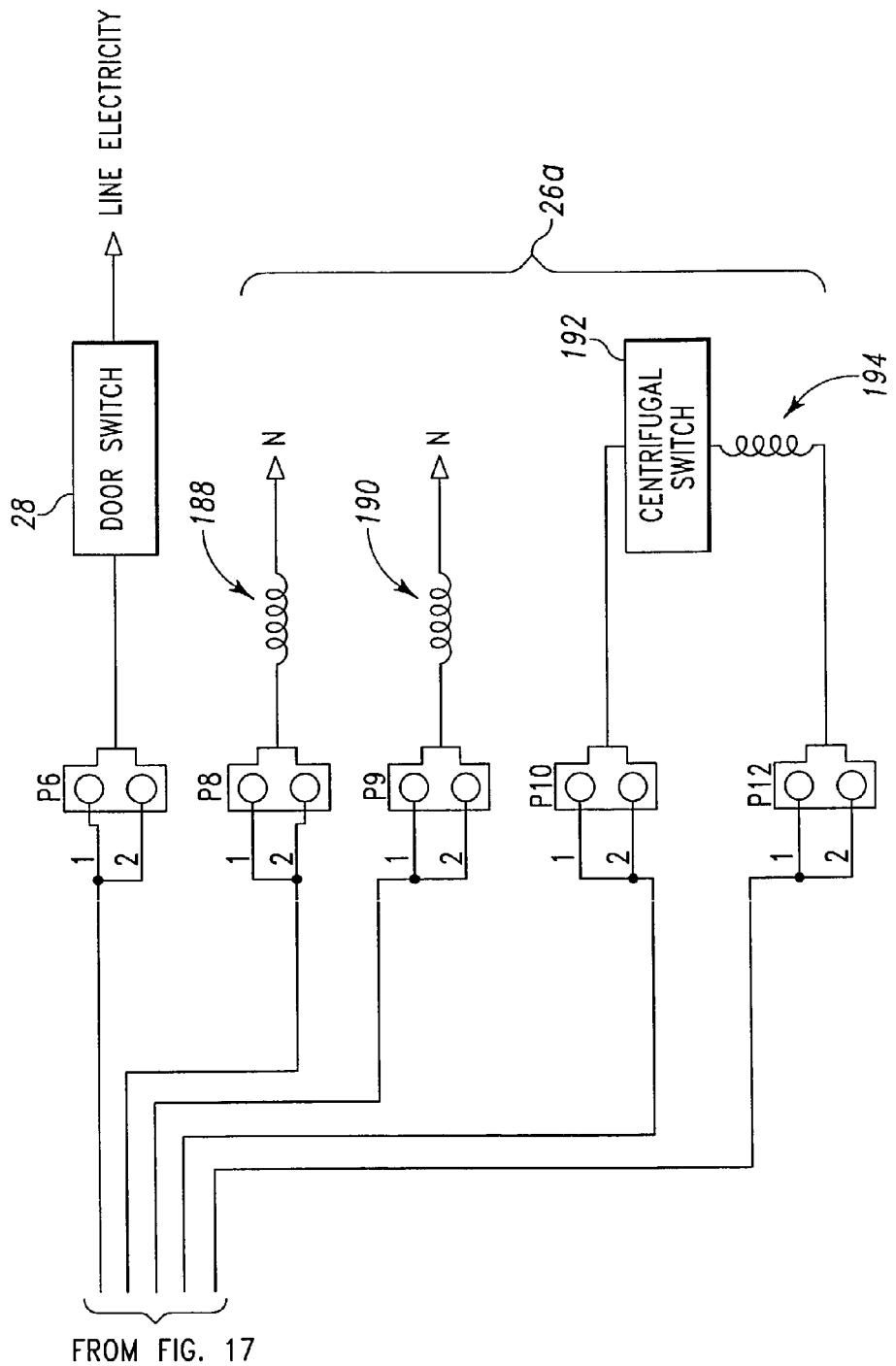
FIG. 18 is a partial electrical schematic of the motor portion.

As an example of using rotational speed of the receptacle as the parameter data a first speed may be approximately 600 RPMs, while a second speed may be 800 RPMs. A threshold level at which the second speed is started may be no less than 80% of the first speed (i.e. the receptacle 32 must rotate between 80%-100% of the first speed). If the receptacle 32 is rotating at less that 80%, hyperspin will not be used. Likewise, when the washing machine 5 is in the hyperspin mode (in second speed) the rotation velocity of the receptacle may not be less than 80% of the second speed in order to maintain the hyperspin mode. A receptacle speed less than 80% of the second speed would cause the washing machine to go back into the first speed In FIGS. 17 and 18 there is depicted an electrical schematic of a portion of an embodiment of a washing machine having the present hyperspin feature. The two-speed motor 26a includes a start winding 194 that is connected in series with a centrifugal switch 192. The start winding 194 and the centrifugal switch 192 are coupled between terminals P10 and P12. The terminals P10 and P12 are coupled to or in communication with respective relays 196 and 197. The relays 196 and 198 are adapted to couple the start winding 194 and the centrifugal switch 192 to line electricity (via the door switch 28 when closed) and neutral. The relays 192 and 194 are actuated via a transistor Q10 (electronic switch) and associated control/conditioning circuitry/logic that receives an actuation signal from the processor 60. Control signals from the processor 60 provide actuation of the relays 196 and 198 through the transistor Q10. The start winding 194 is actuated when a main power relay 200, actuated via a transistor Q8 (electronic switch) and associated control/conditioning circuitry/logic, couples the line electricity from the door switch 28 into supply line 202. When the motor 26a reaches a running speed (less than or equal to the first motor speed), the centrifugal switch 192 open circuits the start winding 194 from the motor 26a.

At the same time the main relay 200 is providing line electricity to the start winding 194, line electricity is also provided to either of a first main winding 188 or a second main winding 190. Selection of which winding receives the line electricity is controlled via a relay 204 that receives an actuation signal via a transistor Q11 (electronic switch) and associated control/conditioning circuitry/logic. It should be appreciated that the various switching circuitry/relays of FIG. 17 receive actuation signals from the processor 60. The first winding 188 is adapted to allow the motor 26a to achieve a first speed, while the second winding 190 is adapted to allow the motor 26a to achieve a second speed. In accordance with the present principles, the second speed is greater than the first speed and is termed hyperspin speed. The main relay 200 thus controls the application of line electricity through the door switch 28 to either the first or second winding 188 or 190.

The door switch 28 is coupled at one electrical side or terminal to line electricity, while the other electrical side or terminal is coupled to terminal P6. The terminal P6 is in communication with the processor 60 via a monitoring line or conductor 202. The door switch 28 is positioned relative to the lid 34 of the washing machine (see FIG. 1) such that the door switch 28 provides a signal to the processor 60 so that the processor 60 can monitor whether the door switch 28 (i.e. the appliance door or lid) is open or closed (corresponding to the state of the lid 34 of the washing machine). The monitoring line 202 is also in communication with the main relay 200. In this manner, even if the main relay 200 is in an on state (supplying line electricity to the first or second motor winding 188, 190), when the door switch 28 is open (the door or lid of the appliance is open) the power to the motor 26a is shut off (i.e. the line electricity will not flow through the relay 616). This provides a safety switch to shut power to the motor 26a

Figure 19:
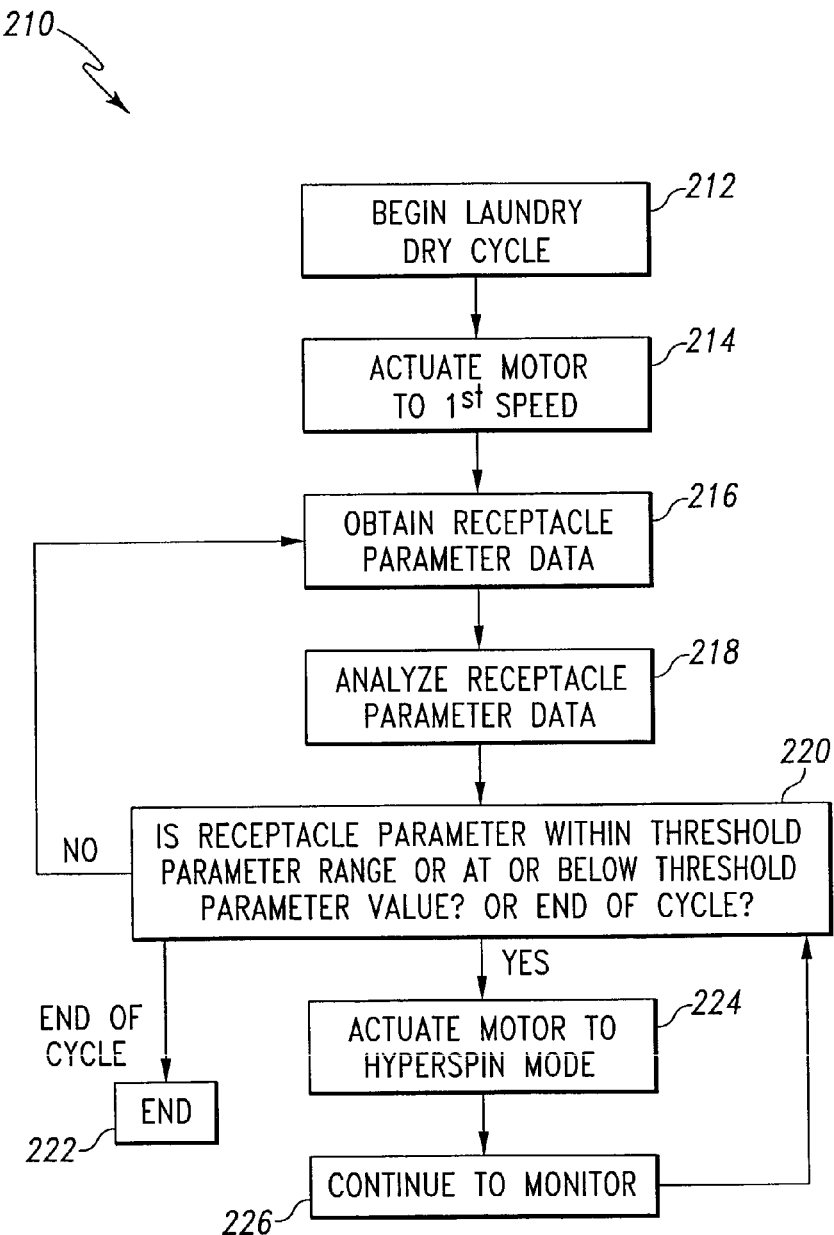
FIG. 19 is a flowchart of an exemplary manner of operation of the hyperspin feature in accordance with the principles of the present invention.

Referring to FIG. 19, there is depicted a flowchart, generally designated 210, of an exemplary manner of operation of the present hyperspin feature or function. In step 212 the washing machine is put into or reaches a laundry drying cycle, stage, or mode. In step 214, the motor or motive power producer is actuated into a first speed to cause the laundry receptacle of the washing machine to spin or rotate up to the first speed. During rotation of the laundry receptacle up to the first speed, receptacle parameter data is obtained, step 216. The receptacle parameter data may be obtained from vibration sensors positioned to obtain vibration data from the receptacle and/or the washing machine in general, from rotation velocity detectors positioned to obtain rotational velocity data from the receptacle or as part of the receptacle or receptacle rotation shaft, or from other detectors, transducers, or the like that are operative to detect or measure other receptacle parameter data.

In step 218, the obtained receptacle parameter data is analyzed. Particularly, the processor analyzes the obtained receptacle parameter data under control of program instructions (software) stored in the memory. The processor analyzes the receptacle parameter data to determine if the receptacle is not balanced (i.e. the laundry load is not distributed well therein causing an imbalance). More particularly, in step 220, the receptacle parameter data is analyzed to determine if the particular parameter or parameters the washing machine/receptacle are below a predetermined parameter threshold level or value, are within a particular parameter threshold range, or are above a predetermined parameter threshold level or value, depending on the particular parameter. The predetermined threshold or level is selected such that if a higher speed is applied to the rotation of the receptacle, there will be little to no damage as a result of the second speed.

In step 220, if the receptacle parameter is outside the appropriate or predetermined threshold value or range, the motor 26 is caused to remain at the first speed (and thus the receptacle as well) and the flow goes back to step 216. There is also a check to see if the dry cycle is at or near the end, and if so, the flow ends, step 222. However, if the receptacle parameter is within the appropriate or predetermined threshold value or range, the motor is actuated into the second, hyperspin speed and the receptacle as well, step 224. Thereafter there is a continuation of monitoring, step 226. Periodically, the flow returns to step 220.

Wiper Assembly and Mode Control

Figure 53:
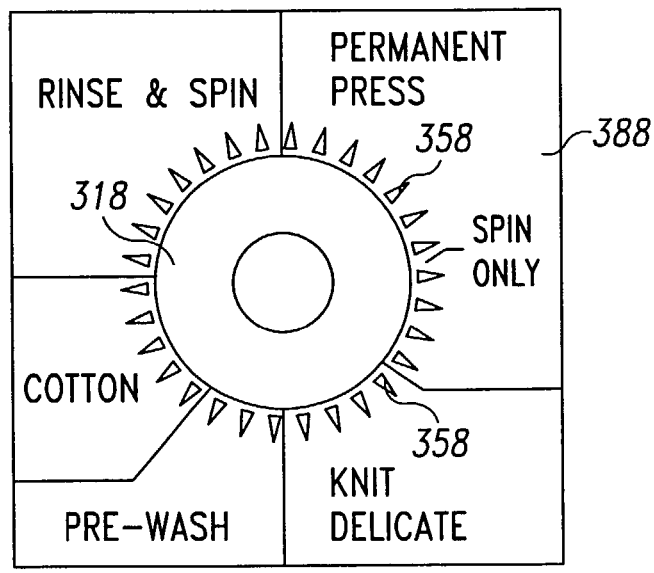
FIG. 53 is an elevational view of an informational overlay of the main controller module of FIG. 25.

The mode switch 378 has two positions that define two modes of operation of the main controller module 300 namely, a user cycle selection mode and a cycle operation mode. In the user cycle selection mode, the user cycle selector is rotated by the user in order to select a particular operating cycle of the washing machine 5 (i.e. a selected appliance cycle). Referring to FIG. 53, there is shown various exemplary operating cycles, such as permanent press, knit delicate, pre-wash, cotton, and rinse & spin printed on an overlay 388 adjacent the LEDs. Of course, other and/or different cycles may be provided as desired. During rotation of the user cycle selector, individual LEDs 307 (represented by the triangles) are alternately lit depending on and in accordance with the direction of rotation of the user cycle selector and the speed of rotation. The processor 60 generates position signals for the individual LEDs 307 depending on the direction of rotation of the user cycle selector and the rate of rotation. The position signals are used to light and turn off the appropriate LEDs. As the user cycle selector is rotated, the appropriate or next LED is lit while the previously lit LED is turned off. Once a desired cycle or position within a cycle is selected (i.e. the appropriate LED is lit), the user puts the washing machine 5 into the cycle operation mode by pushing the control knob inwardly toward the overlay 388.

Figure 47:
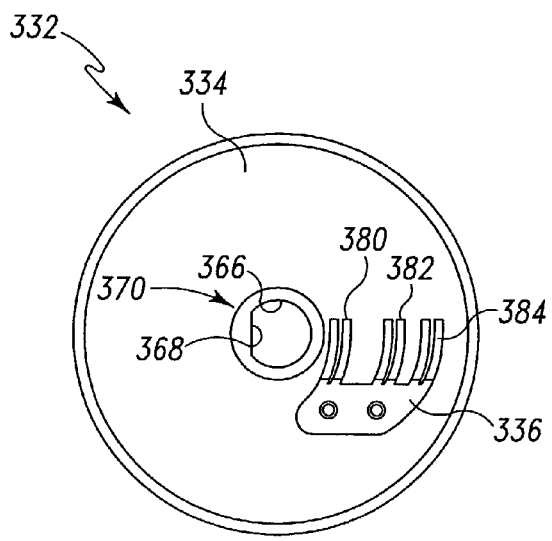
FIG. 47 is a front elevational view of the wiper assembly of the main controller module of FIG. 25.
Figure 49:
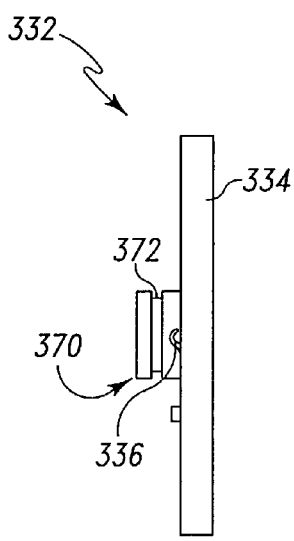
FIG. 49 is a side elevational view of the wiper assembly of the main controller module of FIG. 25.
Figure 48:
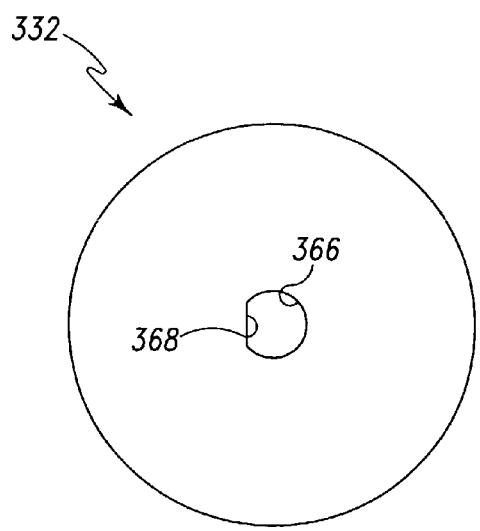
FIG. 48 is a rear elevational view of the wiper assembly of the main controller module of FIG. 25.
Figure 50:
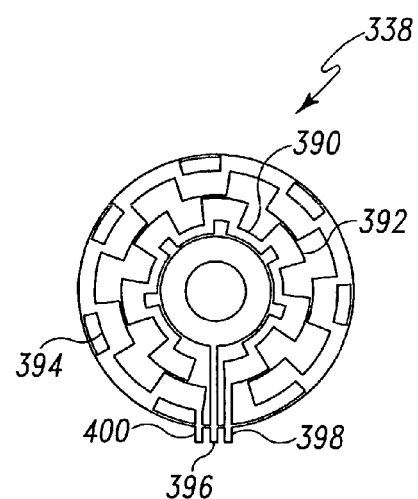
FIG. 50 is an elevational view of the circuit pattern assembly of the main controller module of FIG. 25.

Referring to FIGS. 47 and 50, the translation of the rotation of the user cycle selector and/or generation of the position signals when the main controller module 300 is in the user cycle selection mode will be discussed. The wiper 336 and the circuit pattern assembly 338 cooperate during rotation of the carrier member 334 (which is part of user cycle selector assembly) to provide user cycle selection signals and/or position signals (for lighting the appropriate LEDs and to indicate to the processor the cycle and the particular position status within the cycle) to the processor 60 when the mode switch 378 is in a user cycle selection mode.

The wiper 336 includes three fingers 380, 382, and 384. The inner finger 380 is a voltage source terminal that receives a voltage from the circuit pattern assembly 338. The middle finger 382 is arbitrarily a first state terminal that conducts the voltage from the inner finger 380 to the processor 60 when appropriate. The outside finger 384 is arbitrarily a second state terminal that conducts the voltage from the inner finger 380 to the processor 60 when appropriate.

The circuit pattern assembly 338 includes a voltage trace or conductor 390 that terminates in a terminal 396 that is coupled to a voltage source. The circuit pattern assembly 338 also includes a first state trace or conductor 392 of a zigzag pattern that terminates in a terminal 398 which is coupled to the processor 60. The circuit pattern assembly 338 further includes a second state trace or conductor 394 of a zigzag pattern that terminates in a terminal 400 which is coupled to the processor 60. The processor 60 monitors the first and second traces 392, 294 via the terminals 398, 400 to obtain signals thereon as provided by the wiper 336.

The voltage trace 390 provides continuous voltage to the finger 380 as the wiper assembly 332 is rotated. During rotation of the wiper assembly 332, the middle finger 382 rotates in a circle that alternately makes and breaks contact with the first state trace 392 due to the zigzag pattern. At the same time, the outer finger 384 rotates in a circle that alternately makes and breaks contact with the second state trace 394 due to the zigzag pattern. It can be seen in FIG. 50 that the zigzag patterns of the first and second traces 392, 394 provide areas where only the middle finger 382 provides a voltage (signal) from the inner finger 380 to the processor 60, where only the outer finger 384 provides a voltage (signal) from the inner finger 380 to the processor, where neither the middle or out finger 382, 384 provide a voltage (signal) to the processor, and where both the middle and outer fingers 382, 384 provide a voltage (signal) to the processor 60 during rotation of the wiper assembly 332.

A voltage may be considered a logic "1" while no voltage may be considered a logic "0". Thus the wiper assembly 332 provides a "00" state (neither the middle finger 382 nor the outer finger 384 conducts a voltage), a "01" state (the middle finger 382 does not conduct a voltage while the outer finger 384 conducts a voltage), a "10" state (the middle finger 382 conducts a voltage while the outer finger 384 does not conduct a voltage), and a "11" state (both the middle and outer fingers 382, 384 conduct a voltage). The four states are not necessary in any particular order but do not repeat until all four states have been used. The processor 60 thus detects the state changes (by counting or otherwise). Also direction of rotation may be determined by knowing the state changes and their sequence. The processor can thus produce position signals for lighting the LEDs, keeping track of the position of the user cycle selector, and knowing the user selected operation cycle. Of course, its should be appreciated that variations of the above may be used, such as the number of fingers, trace patterns, and/or the like.

In the cycle operation mode, the washing machine 5 is operative to run the particular selected cycle and rotation of the user cycle selector has no effect since the mode switch 328 is, during this time, in a deactivated state. The LEDs 307 of the particular selected cycle, however, alternatively light in sequence to show operating cycle progression. The processor 60 provides cycle progression signals to the transistor Q1, Q2, Q3, Q4, and Q5 (FIGS. 23 and 24) of the appropriate bank of LEDs 270, 272, 274, 276 and 278 (corresponding to the user-selected cycle) to actuate that bank of LEDs 307, and to the driver/buffer 238 as appropriate to light a particular LED 307 of the LED bank.

Figure 54:
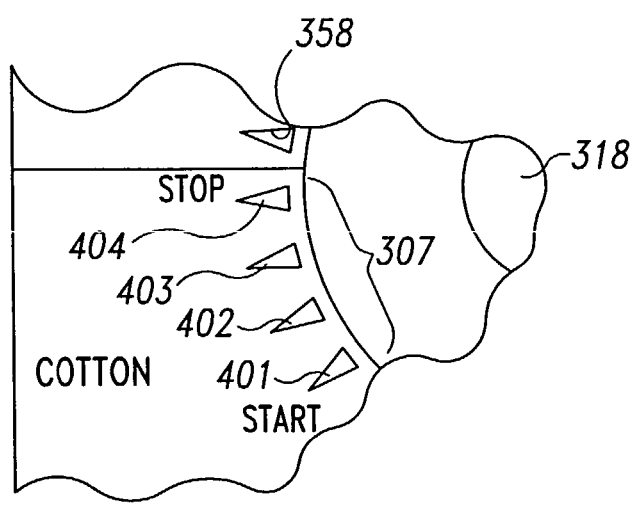
FIG. 54 is an enlarged fragmentary view of the informational overlay of FIG. 53.

As an example, in FIG. 54, assume that the Cotton operating cycle has been selected by the user during the user selection mode. This has been initially been indicated by lighting the start LED 401 (of the LEDs 307) as the user rotates the user knob 318. At the next stage of the cycle, defined by the program instructions in the memory 116 and executed by the processor 60, the start LED 401 goes off and the next LED 402 goes on. At the next stage of the cycle, the LED 402 goes off and the next LED 403 goes on. Finally, at the end of the cotton cycle, the last LED 404 goes on and the previous LED 403 goes out. In this manner cycle progression is indicated. The processor 60 provides cycle progression signals as appropriate.

Figure 22:
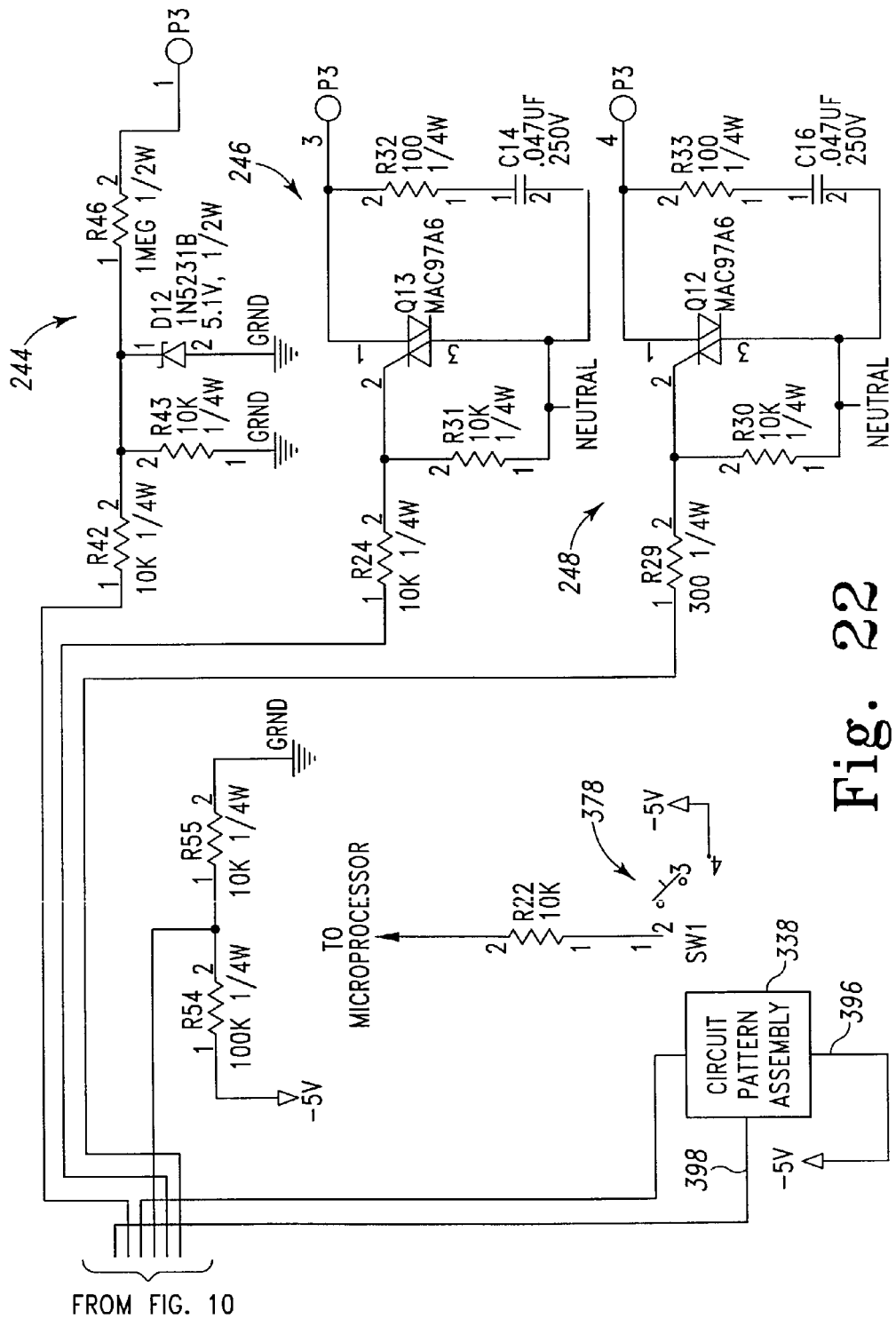
FIG. 22 is a partial electrical schematic of the appliance control system showing the water control features and the user cycle selection input.

FIG. 22 depicts the electrical diagram for the circuit pattern assembly. The terminal 396 receives a voltage for the conducting trace 390. The first state output terminal 398 for the first state conducting trace 392 is coupled to the processor 60 as an input thereto. Likewise, the second state output terminal 400 for the second state conducting trace 394 is coupled to the processor 60 as an input thereto.

Operation Mode/Cycle Selector Shaft Detection and LED Indication of Operation of Appliance and Control Knob Position In accordance with another aspect of the present invention the appliance control system 10 includes a main controller module 300 (FIG. 1) composed of various mechanical and electrical components that are configured to detect the position of the knob/dial assembly and produce a position signal indicative of knob assembly position.

Figure 55:
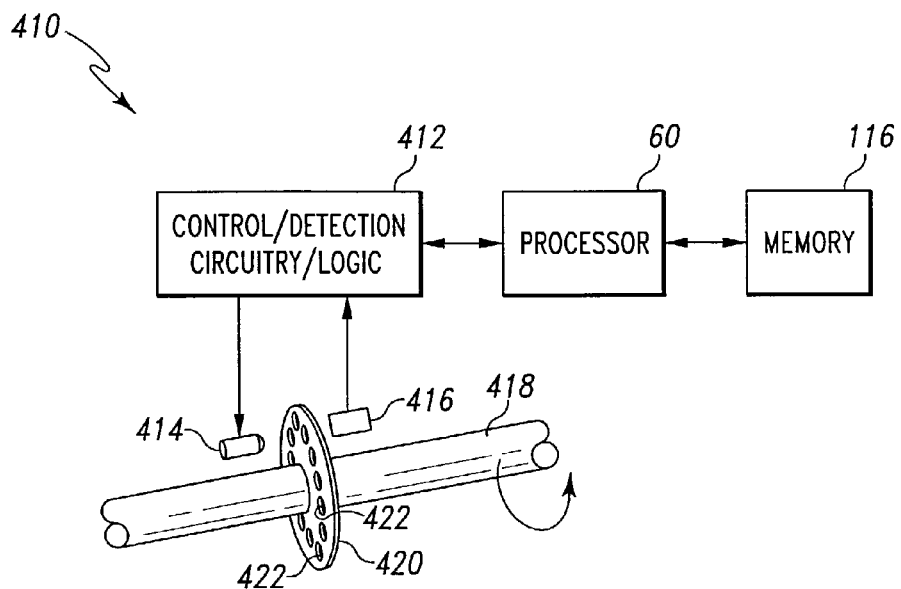
FIG. 55 is a schematic diagram of a first alternative shaft position detection mechanism which can be used in the main controller module and/or any of the auxiliary input units of the appliance control system of the present invention.

Referring to FIG. 55, there is depicted an exemplary shaft position/rotation detection system generally designated 410 that may be utilized in either or both the user cycle selector 314 or any one or all of the auxiliary input units 44. In particular the shaft position/rotation detection system (system) 410 is operative to detect rotational position and/or rotation speed of a shaft 418. The system 410 includes a light transmitter or emitter 414 and associated light detector 416 each of which is under control via control/detection circuitry/logic 412. The control/detection circuitry/logic 412 is, in turn, under control via the processor 60 with the processor 60 under control via program instructions stored in the memory 116.

The shaft 418 includes a disk 420 or other similar device that includes a plurality of apertures 422 spaced thereabout. The disk 420 is fixed in relation to the shaft 418 such that the disk 420 rotates with the shaft 418. The light transmitter 414 and the light detector 416 are positioned on either side of the disk 420 such that light from the light transmitter 414 can shine through the apertures 422 and be collected or detected by the light receiver 416 as the disk 420 rotates (along with the shaft 418). As the disk 420 rotates, the light from the light transmitter 414 alternately shines through an aperture to be detected or collected by the light detector 416 and is blocked between adjacent apertures 422. This creates pulses of light that are received by the light detector 416.

The pulses of light received by the light detector 416 are received by the control/detection circuitry/logic 412 which are forwarded to the processor 60 for processing in accordance with program instructions stored in the memory 116. The number of light pulses and the rate of reception of the light pulses received or detected by the light receiver provides shaft 418 position and velocity of rotation. It should be appreciated that the number of apertures 422 thus defines the resolution of the rotational position of the shaft 418. Hence the more apertures, the more fine the determination of the angular or rotational position of the shaft 418.

Figure 56:
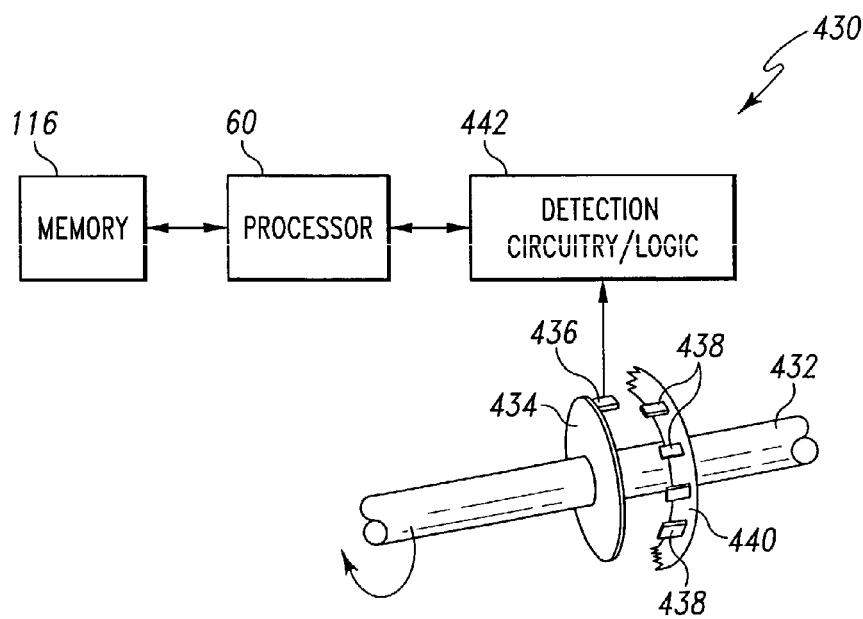
FIG. 56 is a schematic diagram of a second alternative shaft position detection mechanism which can be used in the main controller module and/or any of the auxiliary input units of the appliacne control system of the present invention.

Referring to FIG. 56, there is depicted another exemplary shaft position/rotation detection system generally designated 430 that may be utilized in either or both the user cycle selector 314 or any one or all of the auxiliary input units 44. In particular the shaft position/rotation detection system (system) 430 is operative to detect rotational position and/or rotation speed of a shaft 432. The system 430 includes a system of either a hall effect sensor 436 and a plurality of magnets 428 or, in the alternative, a magnet 436 and a plurality of hall effect sensors. Since only the hall effect sensor(s) need to be coupled to detector circuitry/logic 442, it is preferable that there is only one hall effect sensor. In either case the principle and/or operation is the same. The following will assume that the hall effect sensor is 436 and the magnets are 438. Further, either the disk 434 on which the hall effect sensor 436 or the disk 440 having the plurality of magnets 438 may rotate with the shaft 432 while the other of the respective disks 440 and 434 is fixed with respect to the shaft 432.

As the magnets rotate relative the hall effect sensor, the hall effect sensor produces a signal. The signal is received by the detection circuitry/logic 442 which forward the signals to the processor 60. The processor 60 under control of program instructions stored in the memory 116 determines the angular or rotational position of the shaft 432 and/or the rotational velocity of the shaft 432.

Figure 23:
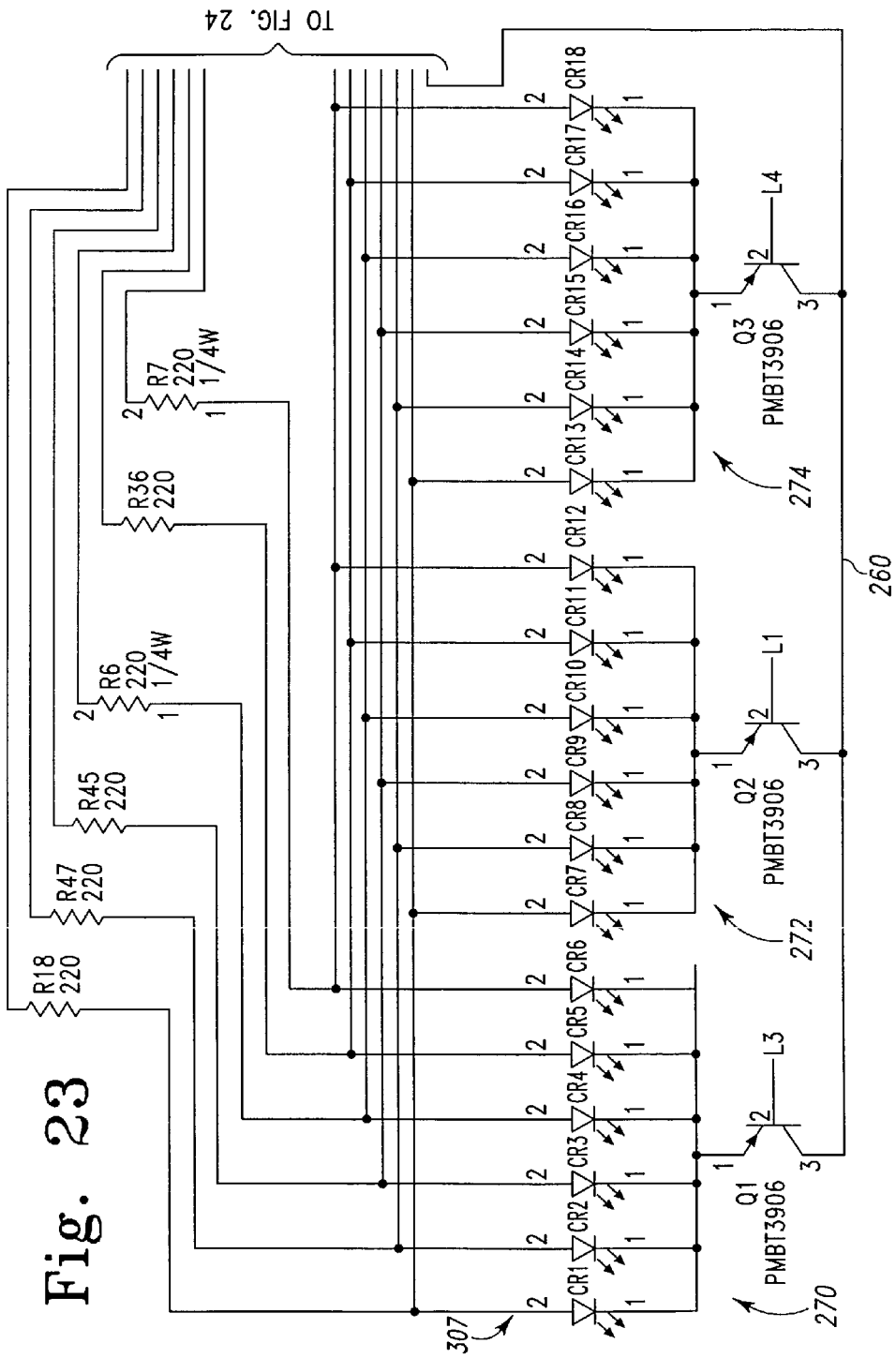
FIG. 23 is one part of a partial electrical schematic of the appliance control system showing the LEDs.
Figure 24:
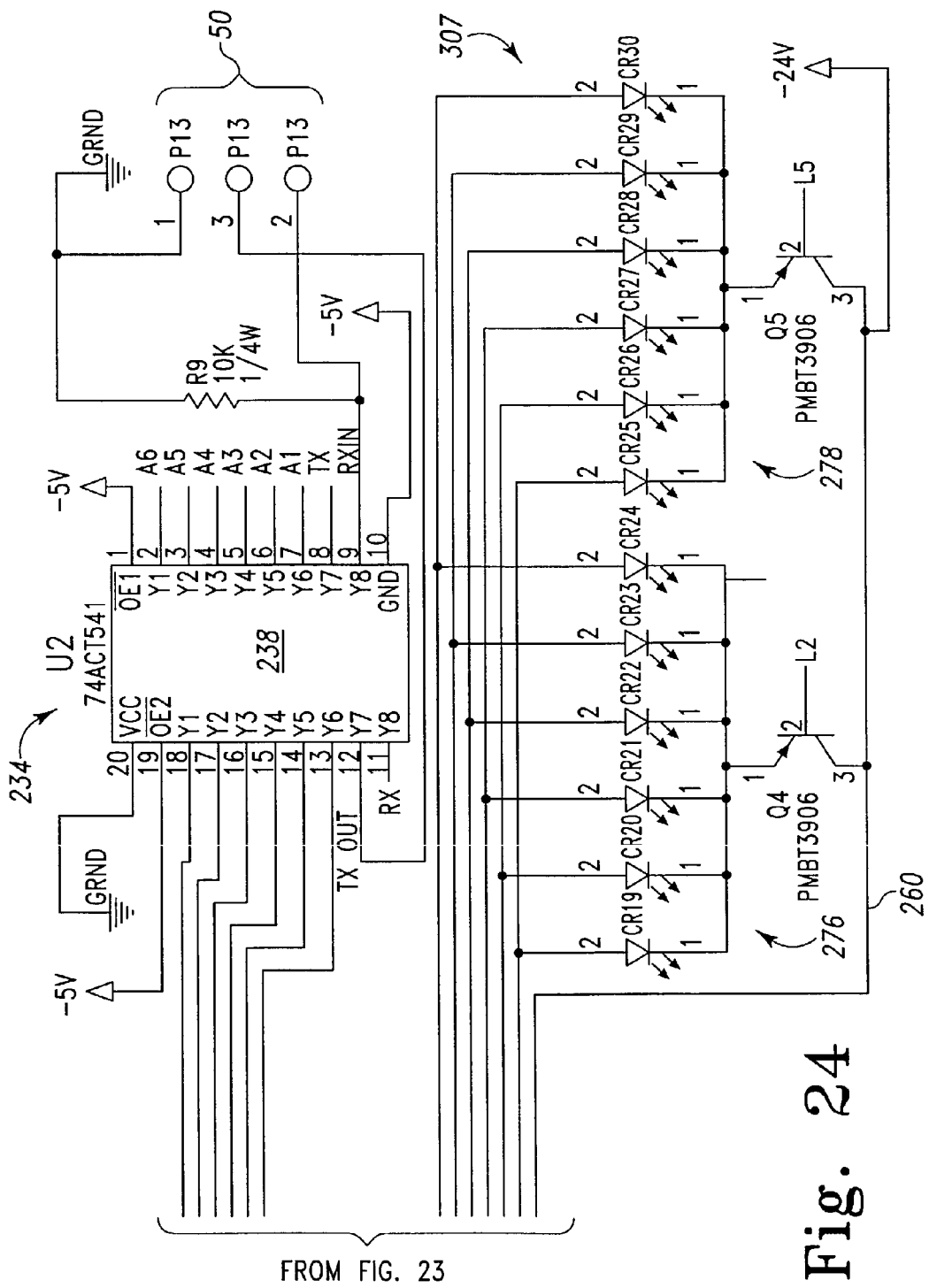
FIG. 24 is another part of the partial electrical schematic of the appliance control system of FIG. 23.

Referring to FIGS. 23 and 24, an electrical schematic of the LEDs 307 and their control circuitry/logic are shown. While the LEDs 307 are mounted onto the circuit board so as to form a continuous circle, the LEDs 307 are divided into LED banks 270, 272, 274, 276, and 278. Each LED bank is then separately controlled as well as each particular LED in each bank. The number of LED banks preferably corresponds to the number of cycles or modes of operation of the washing machine 5. Each LED 307 within an LED bank indicates and corresponds to a particular demarcation in the cycle. Depending on the particular cycle or mode, an LED may indicate a different parameter, such as time remaining or mode within the cycle. Each LED bank 270, 272, 274, 276, and 278 is separately actuated as well as each LED within an actuated LED bank. Preferably, only one LED bank is actuated at a time (switched in). As well, preferably only one LED within an LED bank is caused to light at a time (actuated). Thus, a particular LED bank may be in an active mode (i.e. its LEDs can be caused to light) while the other LED banks are not in an active mode (i.e. the LEDs cannot be lit) depending on the particular cycle selected by the user.

Each LED bank 270, 272, 274, 276, and 278 is in communication with a respective transistor Q1, Q2, Q3, Q4, and Q5 (electronic switches). The base of each transistor Q1, Q2, Q3, Q4, and Q5, is coupled to an output of the processor 60. Particularly, the base (pin 2) of transistor Q1 is coupled to output L3 of the processor 60. The base (pin 2) of transistor Q2 is coupled to output L1 of the processor 60. The base (pin 2) of the transistor Q3 is coupled to output L4 of the processor 60. The base (pin 2) of the transistor Q4 is coupled to output L2 of the processor 60. The base (pin 2) of the transistor Q5 is coupled to output L5 of the processor 60. It should be appreciated that this is arbitrary. Each transistor Q1, Q2, Q3, Q4, and Q5 thus actuates a particular LED bank, with each transistor Q1, Q2, Q3, Q4, and Q5 controlled by the processor 60.

Each particular LED within an LED bank 270, 272, 274, 276, and 278 is connected to one of only a number of actuation lines, the number of actuation lines corresponding to the LED bank having the most number of individual LEDs. In FIGS. 23 and 24, the number of actuation lines is six (each LED bank 270, 272, 274, 276, and 278 has the same number of LEDs). Each actuation line is coupled to an output of the driver/buffer IC 238. Thus each actuation line (IC output) actuates a particular LED. Particularly, the actuation lines are respectively connected to outputs Y1, Y2, Y3, Y4, Y5, and Y6. This reduces the number of actuation lines and thus outputs of the driver/buffer IC 238. A particular LED cannot light until its LED bank switch (transistor) is actuated and a signal is received on its actuation line. Each bank of LEDs as well as particular LEDs in the LED bank is separately controlled. The driver/buffer IC 238 receives signals from the processor 60.

In summation, the driver/buffer IC 238 only has to provide an LED actuation signal to a particular output (actuation line), while the processor 60 provides an LED bank actuation signal to a particular LED bank, with the processor 60 providing the control signals to the driver/buffer IC 238. In this manner, the processor 60 (under control of the program instructions) controls the lighting of the LEDs.

It should be appreciated that the number of LED banks are arbitrary, as well as the number of LEDs in a particular LED bank. As well, even though each LED bank is shown having the same number of LEDs, this is not necessary, as each bank of LEDs may have any number of LEDs. For example, one bank of LEDs may have only one LED while another bank of LEDs may have fifteen LEDs. Various combinations are thus possible.

Network Accessible, Programmable Memory

Figure 20:
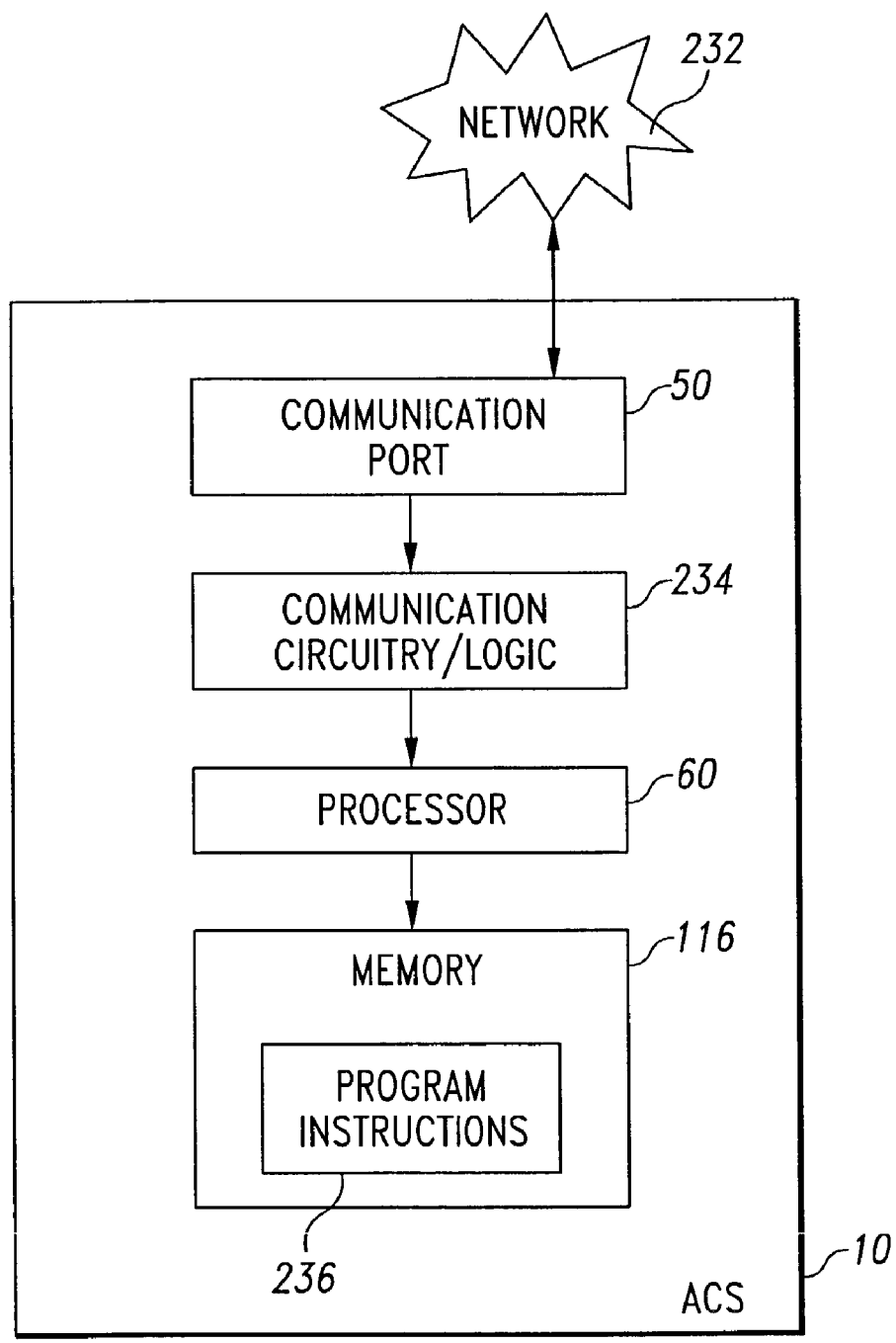
FIG. 20 is a block representation of a communication feature in accordance with the principles of the present invention.

In accordance with another aspect of the present invention, the washing machine 5 (FIG. 1) is operative/adapted to be coupled to or in communication with an external, public or private network such as the Internet via an integral interface. Referring to FIG. 20, the ACS 10 also includes a communication port 50 (see FIG. 1) that is in communication with the processor 60 via communication circuitry/logic 234. The communication port 50 may be an RS-232 interface or the like that is operative to allow the connection of the communication port 50 to an external network 232. The external network 232 may be a public network such as the Internet, a private network such as a LAN, or the like. The network 232 may also represent an external device that may be temporarily coupled to the communication port 50 so as to be in communication with the ACS 10. The communication circuitry/logic 234 may be an appropriate integrated circuit (IC), a modem, or the like. The communication port 50 and the communication circuitry/logic 234 are operative to allow connection to the network 232 and provided two-way communication between the processor 60 of the ACS 10 and the network 232.

As indicated above, the ACS 10 includes memory 116 that stores program instructions 236. The program instructions 236 provide operating instructions for the various operating characteristics/modes of the washing machine as well as specific instructions for components thereof, diagnostics for the various components, and/or communication protocols and the like. As well, the program instructions 236 encompass look-up tables, data, and the like, all of which are necessary as part of the operation of the washing machine 5. In accordance with an aspect of the subject invention, the program instructions 236 are modifiable and/or alterable by erasure and/or replacement theref. Thus, the memory 116 is accessible via the processor 60. The communication port 50 and the communication circuitry/logic 234 permit the introduction of new program instructions into the memory 116 via the network 232 and the erasure of old or unwanted program instructions.

Referring to FIG. 24, an electrical schematic form of the communication port 505 and at least a portion of the communication circuitry/logic 234 are shown. The communication port 5 is formed at connections P13, terminals 1, 2, and 3. The communication port 5 is in communication with a driver/buffer IC 238 as part of the communication circuitry/logic 234. Particularly, the communication port 5 is coupled to the RXIN or transmit in (pin 9) of the IC 238 and a TXOUT or transmit out (pin 12) of the IC 238. This allows the communication port 5 to serially receive and send data.

The IC 238 is in communication with the processor 60 (see FIG. 10) via I/Os A1, A2, A3, A4, A5, and A6 on respective pins 7, 6, 5, 4, 3, and 2 of the IC 238 and the respective pins 13, 14, 19, 20, 21, and 22 of the processor 60. The processor is in communication with the memory 116. In this manner, any external device may be in communication with the ACS 10 via the network 232. Of course, the program instructions 236 may include a communications protocol as well as necessary firewall software, encryption software, and/or the like for secure communication over the network 232. The communication port 50 also allows the remote troubleshooting of problems with the washing machine 5 over the network 232. Other functions include technical support of washing machine problems.

Mechanics of the Appliance Control System

Figure 25:
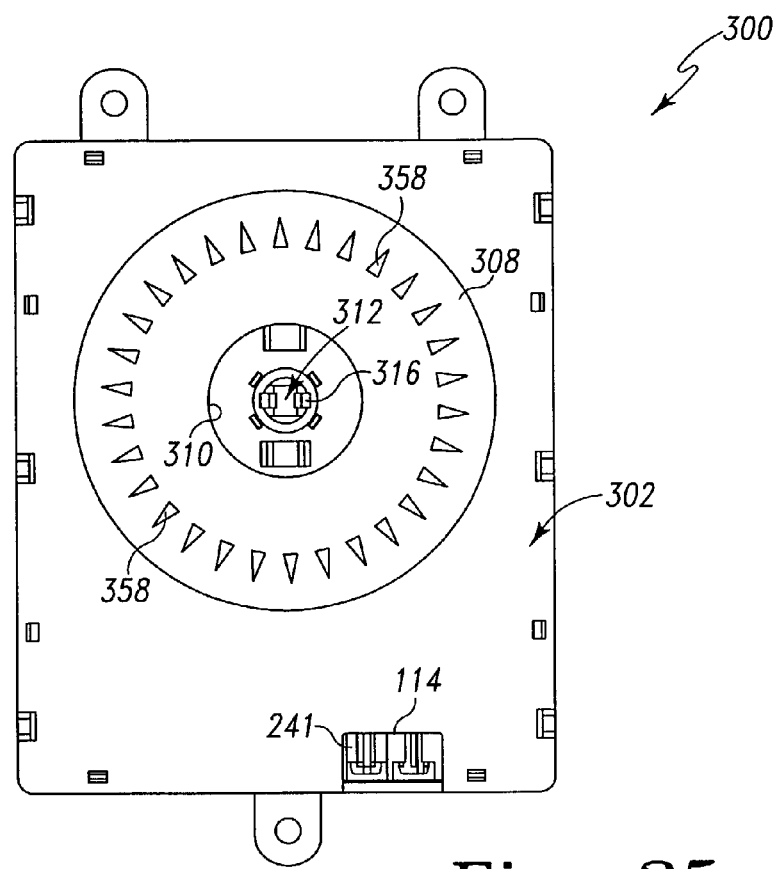
FIG. 25 is a front elevational view of the main controller module that is used in the washing machine of FIG. 1.

As mentioned above, the appliance control system 10 includes the main controller module 300. The main controller module 300 will be described with reference to FIGS. 25-52. Note that FIGS. 25-27 show the main controller module 300 substantially assembled, while FIGS. 28-52 shown various components, subassemblies, or exploded views of the main controller module.

Figure 26:
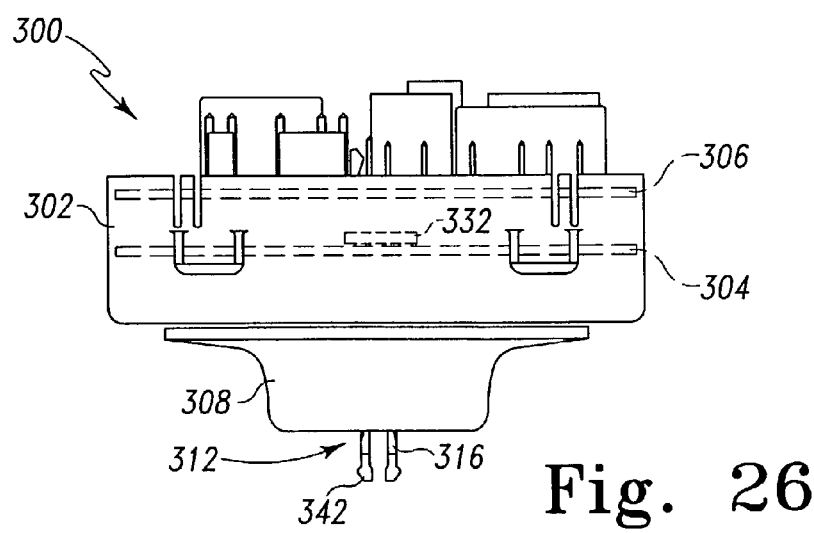
FIG. 26 is a bottom elevational view of the main controller module of FIG. 25.
Figure 27:
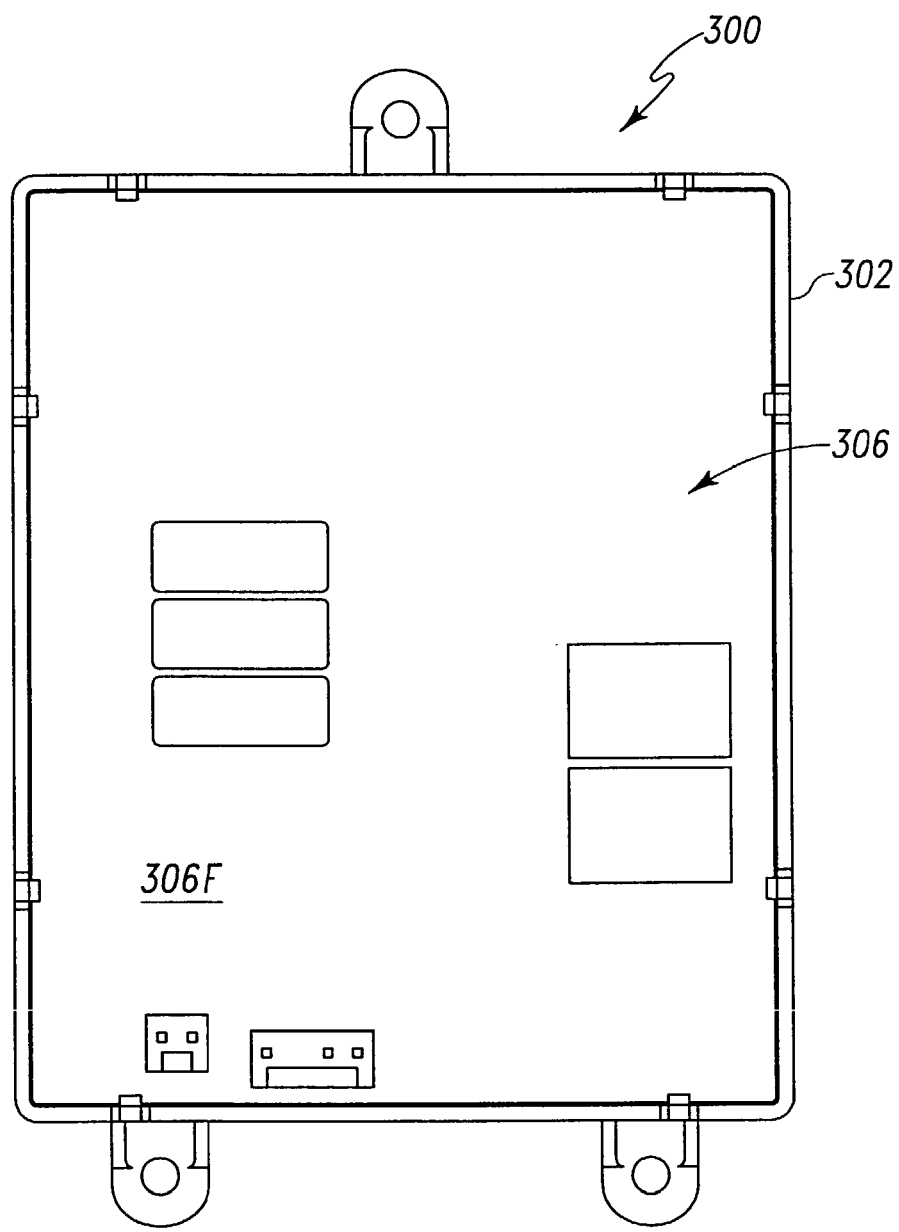
FIG. 27 is a rear elevational view of the main controller module of FIG. 25.
Figure 51:
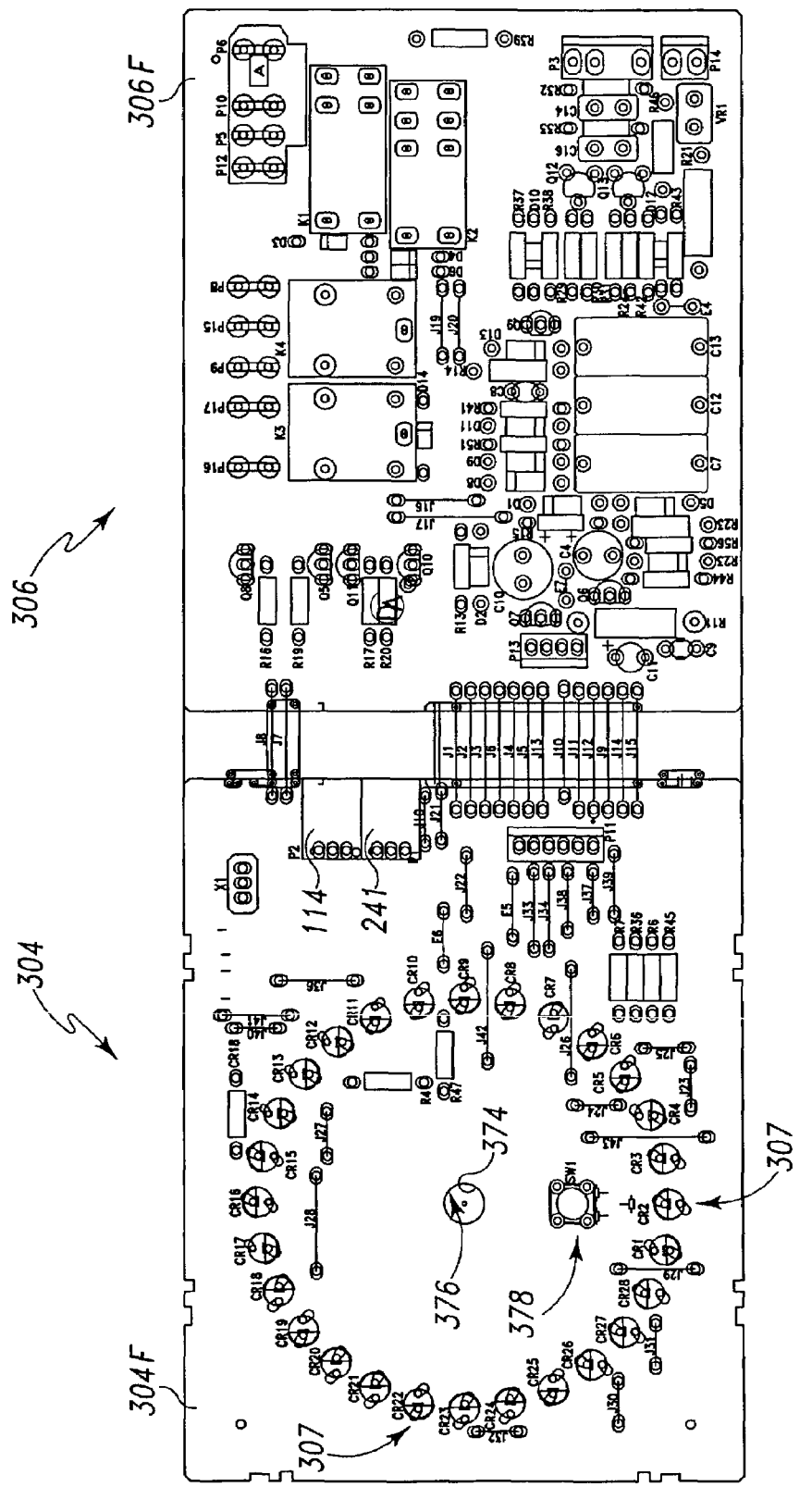
FIG. 51 is an elevational view of the front side of the first printed circuit board and the front side of the second printed circuit board of the main controller module of FIG. 25 (note that after assembly of the main controller module, the second printed circuit board is positioned under the first printed circuit board, however for clarity of viewing, FIG. 51 shows the second printed circuit board pivoted to a location adjacent to the first printed circuit board)
Figure 52:
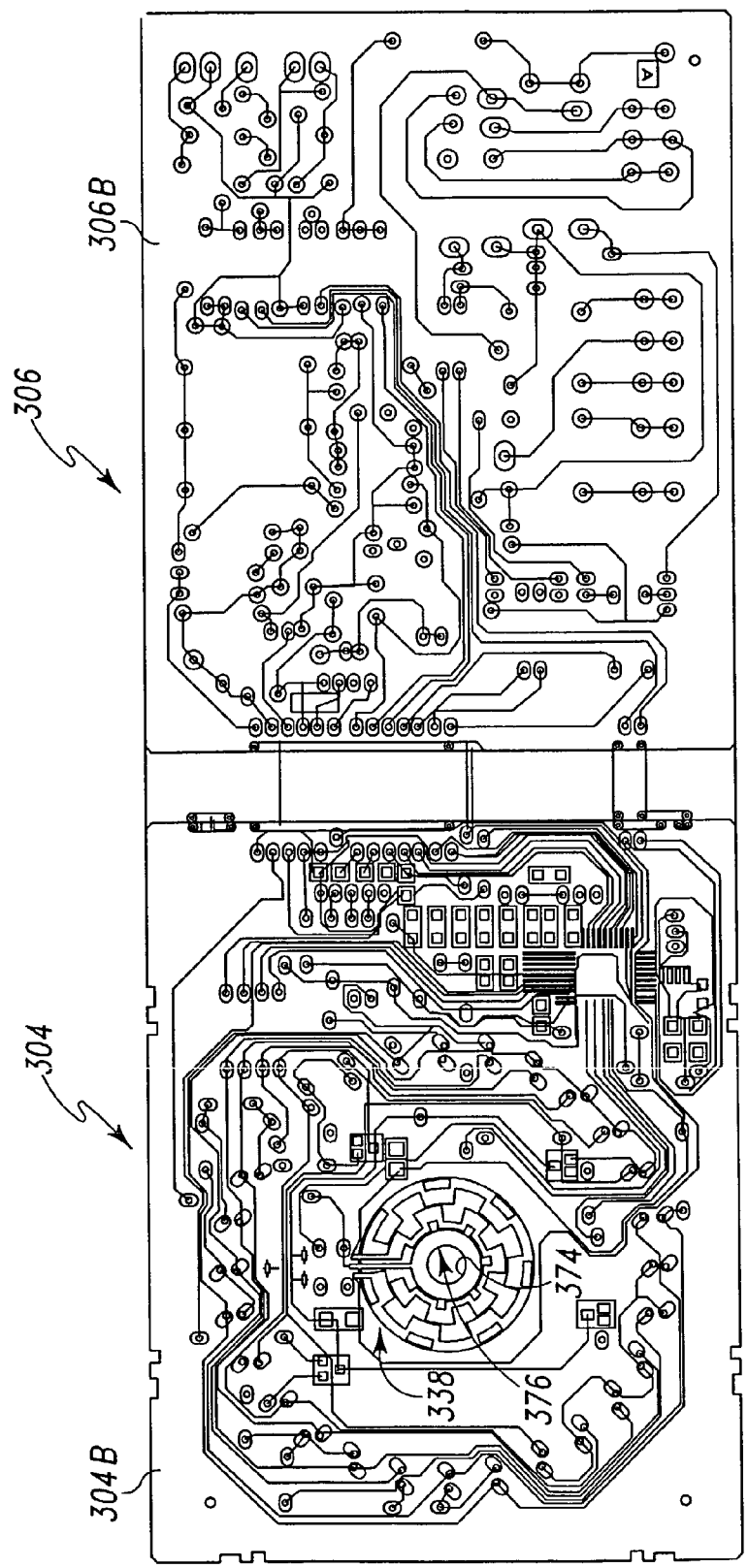
FIG. 52 is an elevational view of the back side of the first printed circuit board and the back side of the second printed circuit board of the main controller module of FIG. 25 (note that for clarity of viewing, FIG. 52 shows the second printed circuit board pivoted in a manner similar to that shown in FIG. 51)

The main controller module 300 includes a housing 302 that contains a first printed circuit board 304 and a second printed circuit board 306 (see e.g. FIGS. 26, 51, and 52). Each of the printed circuit boards 304, 306 support various electronic, mechanical, and electromechanical components thereon whose operation will discussed in more detail in other parts of this disclosure.

Figure 28:
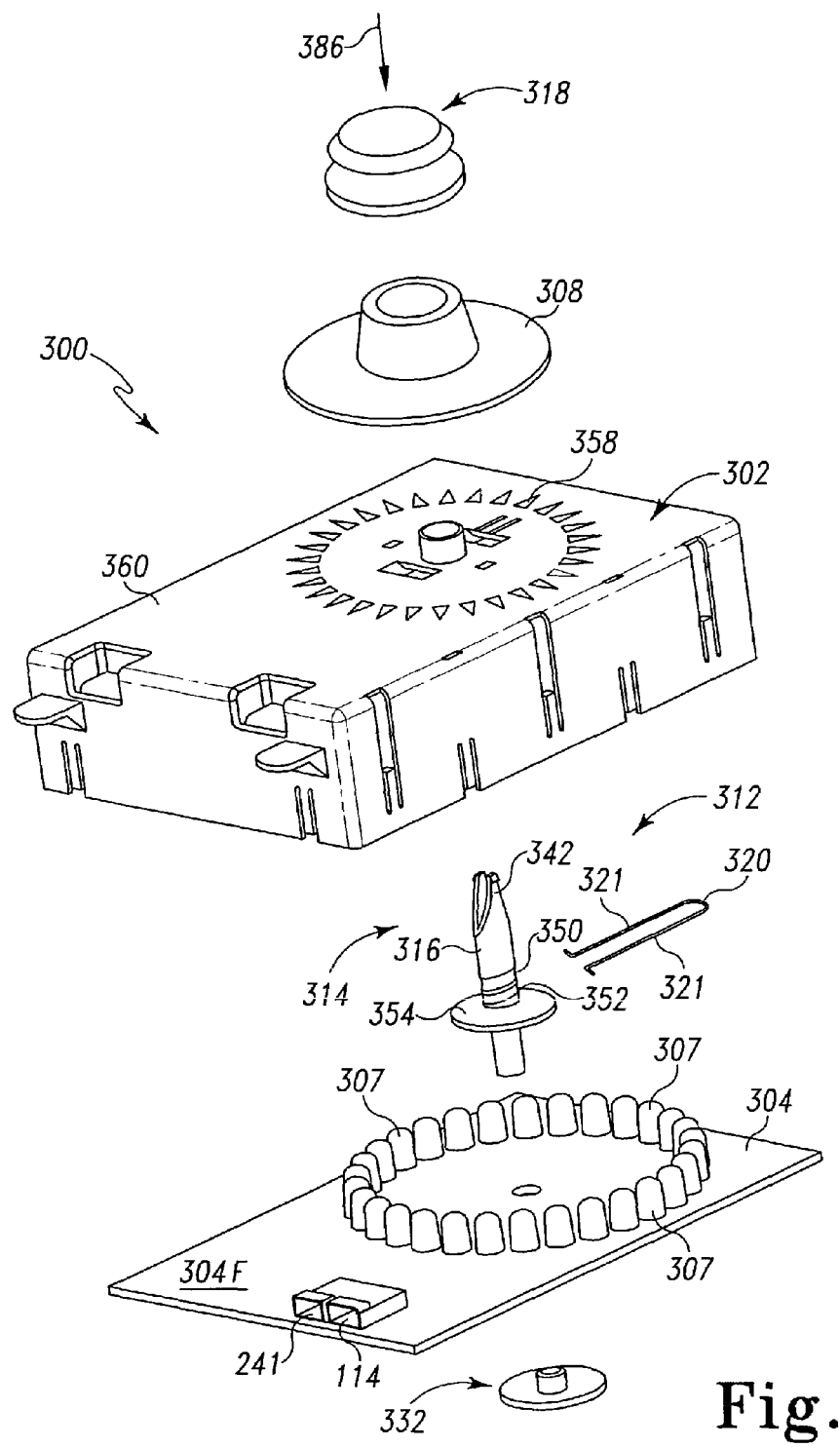
FIG. 28 is an exploded perspective view of the main controller module of FIG. 25.
Figure 29:
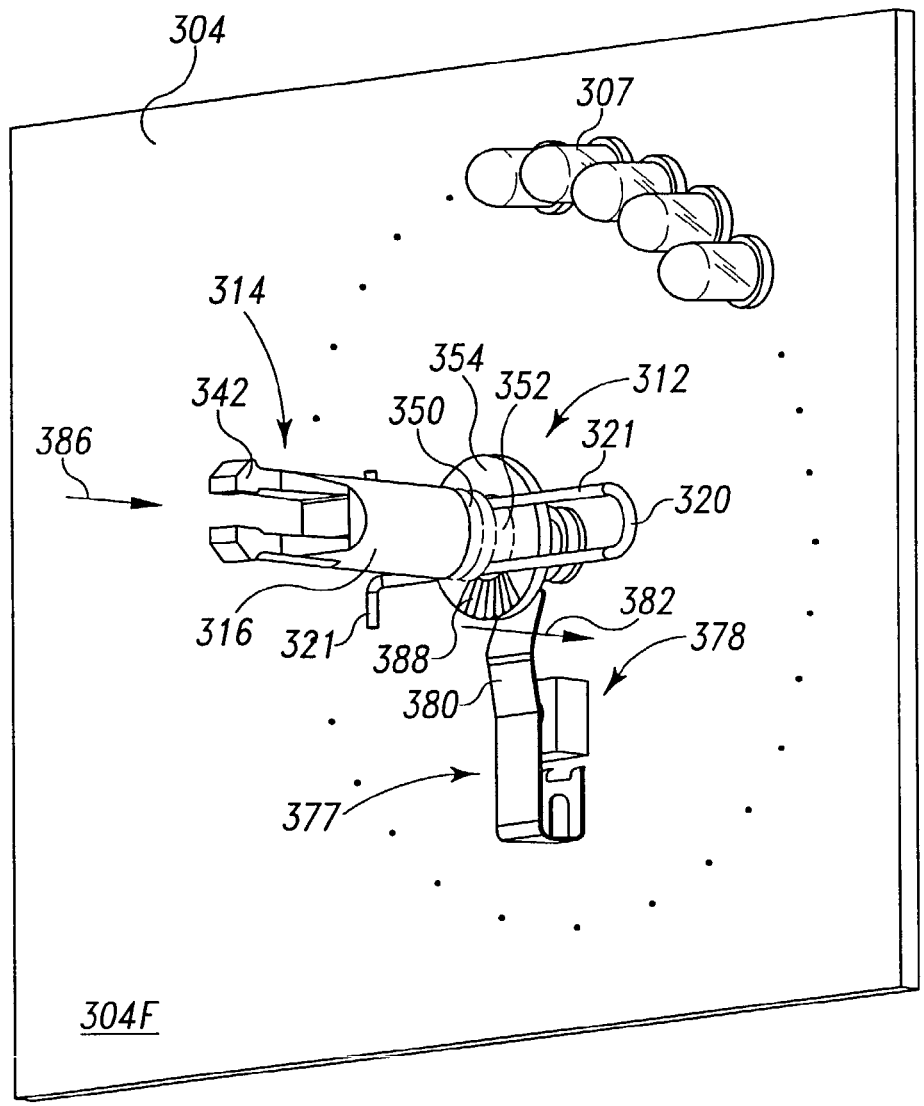
FIG. 29 is an assembled perspective view of part of the user selector assembly of the main controller module of FIG. 25.
Figure 30:
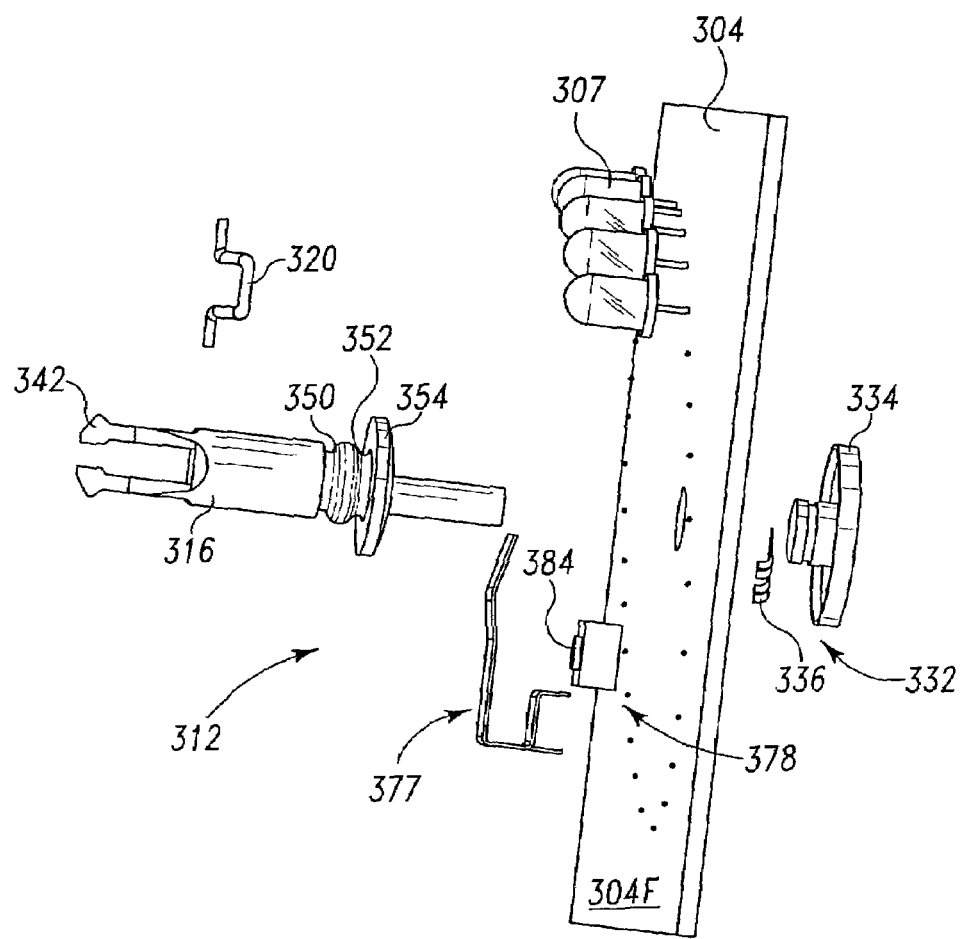
FIG. 30 is an exploded perspective view of various parts of the user selector assembly of the main controller module of FIG. 25.
Figures 31, 32:
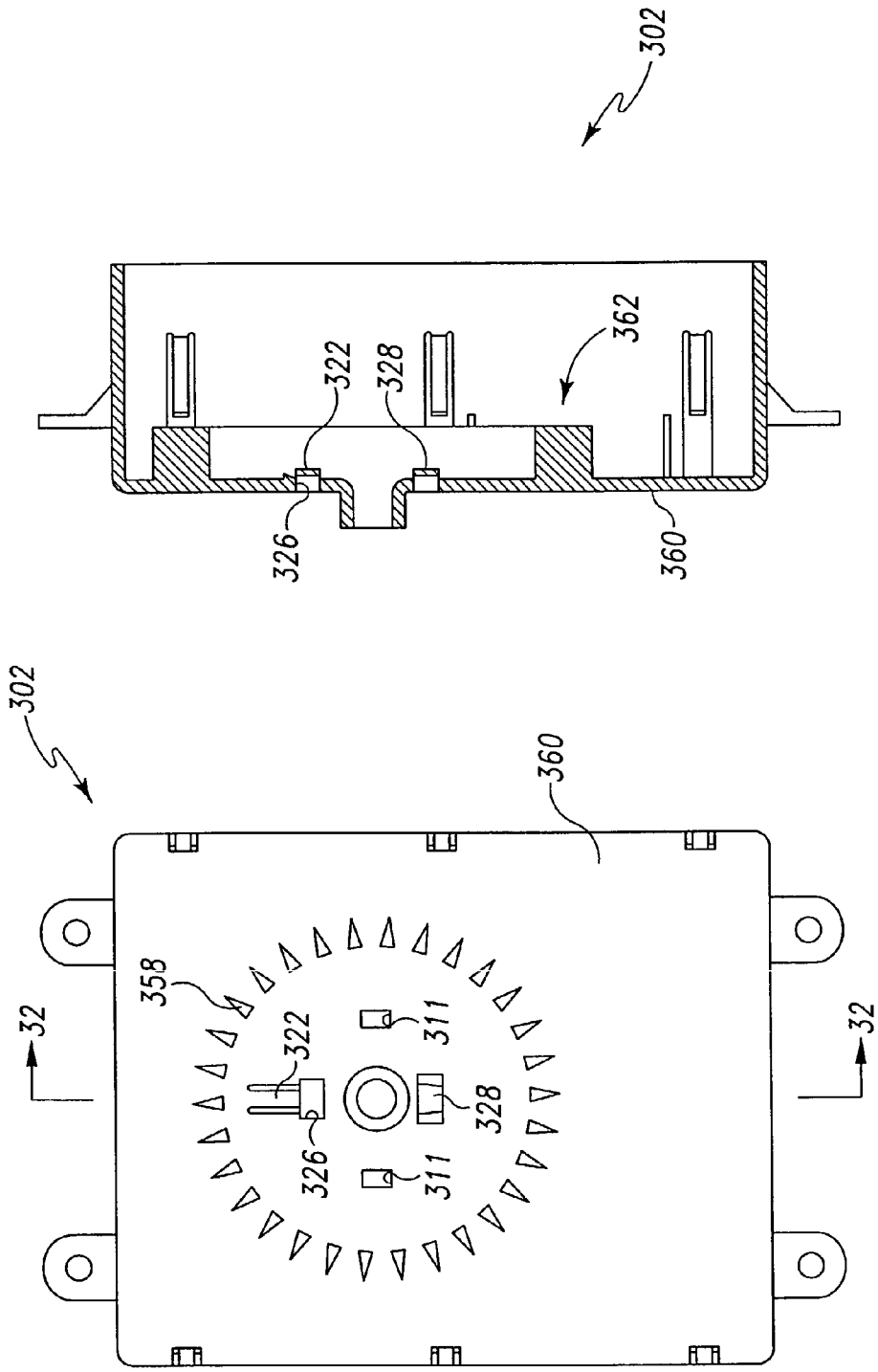
FIG. 31 is a front elevational view of the housing of the main controller module of FIG. 25.
FIG. 32 is a cross sectional view taken along the line 32-32 of FIG. 31 of the housing of the main controller module of FIG. 25.

Supported on the printed circuit board 304 is the auxiliary input port 114 and the water temperature sensor port 241. Also supported on the first printed circuit board 304 is the plurality of light emitting devices 307. (See e.g. FIGS. 28-29.) The light emitting devices 307 are Light Emitting Diodes (i.e. LEDs). The LEDs 307 form the display device 20 for the main controller module 300 which operates to display information about the operation of the washing machine 5. The LEDs 307 are positioned relative to each other so as to form a ring as shown in FIGS. 28 and 51. FIGS. 29 and 30 show only some of the plurality of LEDs 307 for clarity of viewing. The first printed circuit board 304 includes a front side 304F and a back side 304B, while the second printed circuit board 306 includes a front side 306F and a back side 306B (see e.g. FIGS. 51-52). The LEDs 307 are mounted to the front side 304F of the first printed circuit board as shown in FIGS. 28-30 and 51.

The housing 302 includes a plurality of display apertures 358 defined in a front panel 360 thereof. The display apertures 358 are positioned relative to each other so as to form a ring (see e.g. FIG. 25). The housing 302 further includes a rib structure 362 that extends from the front panel 360 towards the interior of the housing 302 (see e.g. FIGS. 33 and 35). The rib structure 362 defines a plurality of receptacles 364 which are positioned relative to each other so as to form a ring. When the main controller module 300 is assembled, the LEDs 307 respectively extend into the plurality of receptacles 364. Accordingly, light generated by the LEDs 307 during operation of the appliance control system 10 is transmitted from within the interior of the housing 302 to a location outside of the housing 302 through the display apertures 358 for viewing by a user of the washing machine 5.

The main controller module 300 further includes an escutcheon 308 that is secured to the housing 302 as shown in FIGS. 25-26. In particular, the escutcheon 308 includes a pair of tabs 309 (see FIGS. 36-38) that are respectively received in a pair of apertures 311 defined in the housing 302 (see FIGS. 33-35) so as to secure the escutcheon 308 to the housing 302. The escutcheon 308 has a passageway 310 that extends therethrough (see FIG. 38). The escutcheon 308 is made of a material that allows light to pass through it. For example, the escutcheon 308 can be made of a translucent material that diffuses light as it passes through the escutcheon. Thus, a user viewing a completely assembled main controller module 300 may view light being generated by the LEDs 307 through the display apertures 358 and escutcheon 308.

The main controller module 300 further includes a user cycle selector assembly 312 that extends through the passageway 310 of the escutcheon 308 when the main controller module 300 is assembled as shown in FIGS. 25-26. The selector assembly 312 includes a user cycle selector 314. The user cycle selector 314 includes a control shaft 316 and a user knob 318. The knob 318 is secured to an end of the control shaft 316 so that rotation of the knob 318 causes rotation of the control shaft 316.

As shown in FIGS. 41 and 42, the control shaft 316 has a central axis 340. The control shaft also has a pair of legs 342 which are configured to connect to the knob 318. The control shaft 316 further has an increased diameter portion 344, an intermediate portion 346, and a reduced diameter portion 348. The intermediate portion 346 has a first groove 350 and a second groove 352 defined therein. The intermediate portion 346 further has defined therein a contact member 354 in the form of a ring-shaped flange. The reduced diameter portion 348 possesses a substantially D-shaped cross-section as shown in FIG. 44. Moreover, the reduced diameter portion 348 has a keyed surface 356 which extends along its length as shown in FIG. 41.

Figure 33:
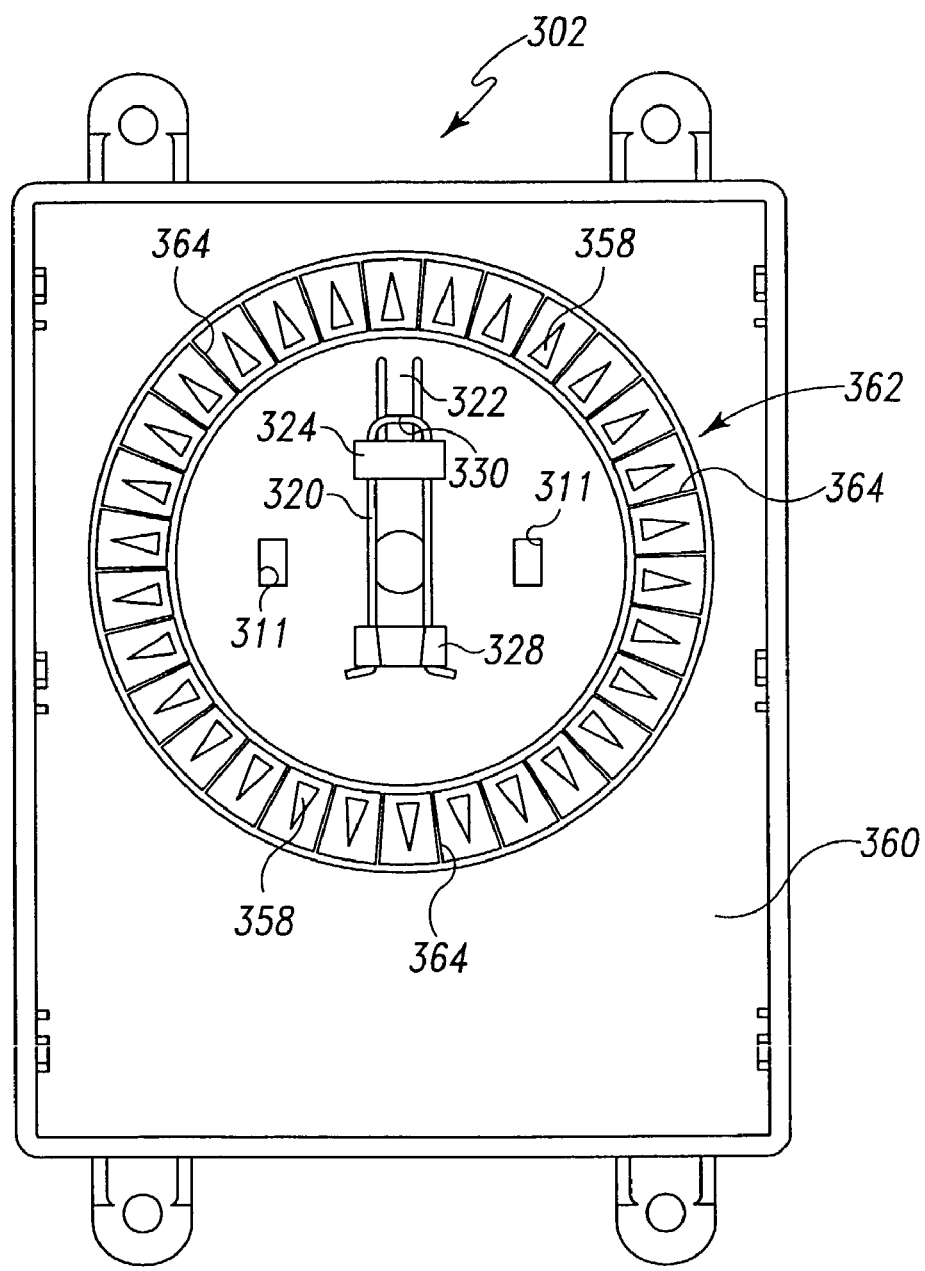
FIG. 33 is a rear elevational view of the housing of the main controller module of FIG. 25.
Figure 34:
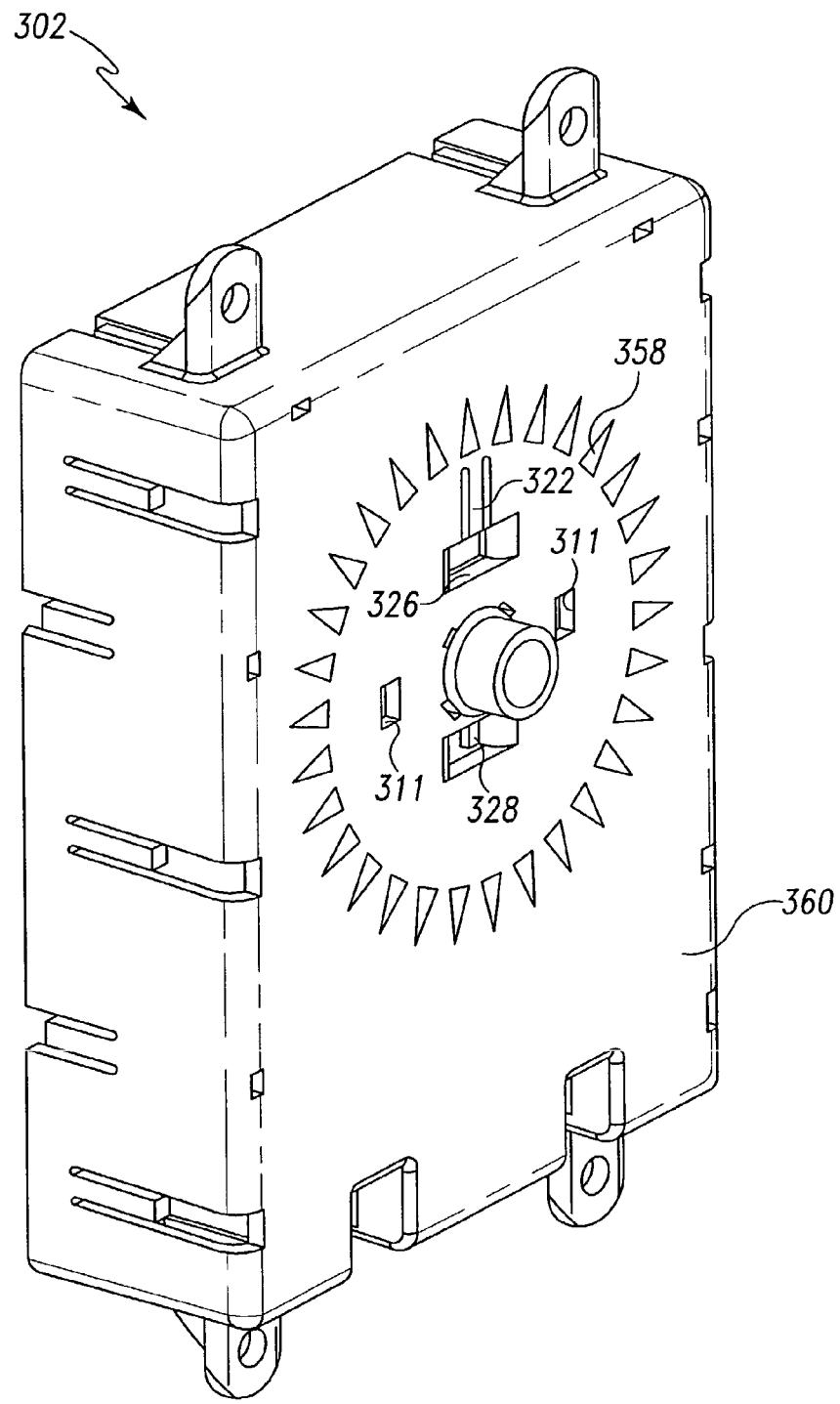
FIG. 34 is a front perspective view of the housing of the main controller module of FIG. 25.

The selector assembly 312 further includes a first spring 320 that is secured to the housing 302 (see e.g. FIGS. 33 and 45-46). The first spring has a pair of spring arms 321. In order to secure the first spring 320 to the housing 302, the housing includes a moveable clip 322, a retaining structure 324 that defines a slot 326, and a pair of spaced apart retaining arms 328 (see e.g. FIGS. 33-35). In particular, the first spring 320 is retained in fixed relation to the housing 302 as a result of being advanced between the pair of retaining arms 328, and through the slot 326 of the retaining structure 324, and then adjacent to the clip 322 as shown in FIG. 33. The clip 322 includes a lip 330 configured to retain the first spring 320 in position after the spring 320 is advanced to its position shown in FIG. 33.

The selector assembly 312 further includes a wiper assembly 332 as shown in FIGS. 28, 30 and 47-49. (Note that FIG. 28 only schematically shows the wiper assembly 332.) The wiper assembly 312 includes a carrier member 334 and an electrically conductive wiper 336 that is secured thereto. The wiper 336 may be secured to the carrier member 334 by a riveting process. After assembly of the main controller module 300, the wiper assembly is positioned into contact with a circuit pattern assembly 338 that is supported on the backside 304B of the first printed circuit board 304 (see e.g. FIG. 52).

The carrier member 334 includes a shaft hole 366 defined therein. The shaft hole defines a keyed surface 368. After assembly of the main controller module 300, the reduced diameter portion 348 of the control shaft 316 extends through the shaft hole 366 so that the keyed surface 356 aligns with the keyed surface 368. Accordingly, rotation of the control shaft 316 causes a corresponding rotation of the wiper assembly 332.

The carrier member 334 further includes a hub 370. The hub 370 has a hub groove 372 defined therein preferably for an O-ring or the like (not shown). Note also that the first printed circuit board 304 has a shaft passage 374 defined therein (see e.g. FIG. 51). The shaft passage 374 defines an interior peripheral edge portion 376. After assembly of the main controller module 300, the interior peripheral edge portion 376 is located circumferentially adjacent the O-ring and/or the hub groove 372. Note that the outer diameter of the hub groove 376 and the inner diameter of the shaft passage 374 are configured so that the hub 370 is attached to the first printed circuit board 304, yet the hub 370 may freely rotate relative to the first printed circuit board 304. Accordingly, the carrier member 334 is rotatably secured to the first printed circuit board 304. When the carrier member is rotatably secured to the first printed circuit board 304 in the above-described manner, the wiper 336 contacts the circuit pattern assembly 338 during rotation of the wiper assembly 332.

The selector assembly 312 further includes a second spring 377 and a mode switch 378 (see e.g. FIGS. 29-30 and 39-40). Both the second spring 377 and the mode switch 378 (see SW1 of FIG. 22) are secured to the first printed circuit board 304 as shown in FIG. 29. The second spring 377 includes a spring arm 380 that is movable in the direction 382 toward the mode switch as shown in FIG. 29. The mode switch 378 includes a plunger 384 that is movable between a raised position and a depressed position. The plunger 384 is spring biased into its raised position. When force is applied to the second spring 377 in the direction of arrow 382 as shown in FIG. 29, the spring arm 380 moves downwardly and contacts the plunger 384 so as to depress the plunger 384 and move it from its raised position to its depressed position. When the plunger 384 is in its raised position, the mode switch 378 is in a deactuated state. However, when the plunger 384 is in its depressed positioned, the mode switch 378 is in an actuated state.

The mechanical operation of the main controller module 300 is as follows. A user grasps the knob 318 and pushes it inward in the direction of arrow 386. As a result, the control shaft 316 is also pushed inward in the direction of arrow 386 from a first axial position to a second axial position. In response to the inward movement of control shaft 316, the spring 320 is forced to move out of the groove 352 and into the groove 350 (see e.g. FIG. 29). In particular, with movement of the control shaft 316, the surface of the control shaft that defines the groove 352 moves in a corresponding manner.

With such movement of the surface that defines the groove 352, such surface contacts and urges the spring arms 321 outwardly relative to each other thereby allowing the control shaft 316 to move in an axial direction from its first axial position to its second axial position. When the control shaft is in its second axial position, the first spring 320 is located in the groove 350 thereby retaining the control shaft in the second axial position.

As the control shaft is moving in the direction of arrow 386, the contact member 354 forces the spring arm 380 downwardly in the direction of arrow 382. As the spring arm 380 is forced downwardly, the spring arm 380 contacts the plunger 384 of the mode switch 378 and moves the plunger downwardly from its raised position to its depressed position thereby causing the mode switch 378 to be switch out of its deactuated state and into its actuated state.

It should be noted that when the mode switch 378 is in its deactuated state, the appliance control system 10 is caused to operate in its cycle operation mode. Further, when the mode switch 378 is placed in its actuated state, the appliance control system 10 is caused to operate in its user cycle selection mode. The details of operation of the appliance control system 10 in its cycle operation mode and its user cycle selection mode are discussed in more detail in other parts of this disclosure.

It should be appreciated that the contact member 354 will be able to contact the spring arm 380 irrespective of the rotational position of the user cycle selector 314. This feature results from the shape of the contact member 354. In particular, the contact member 354 is configured to be a ring-shaped flange thereby extending outwardly around the entire 3600 periphery of the control shaft 316.

Figure 35:
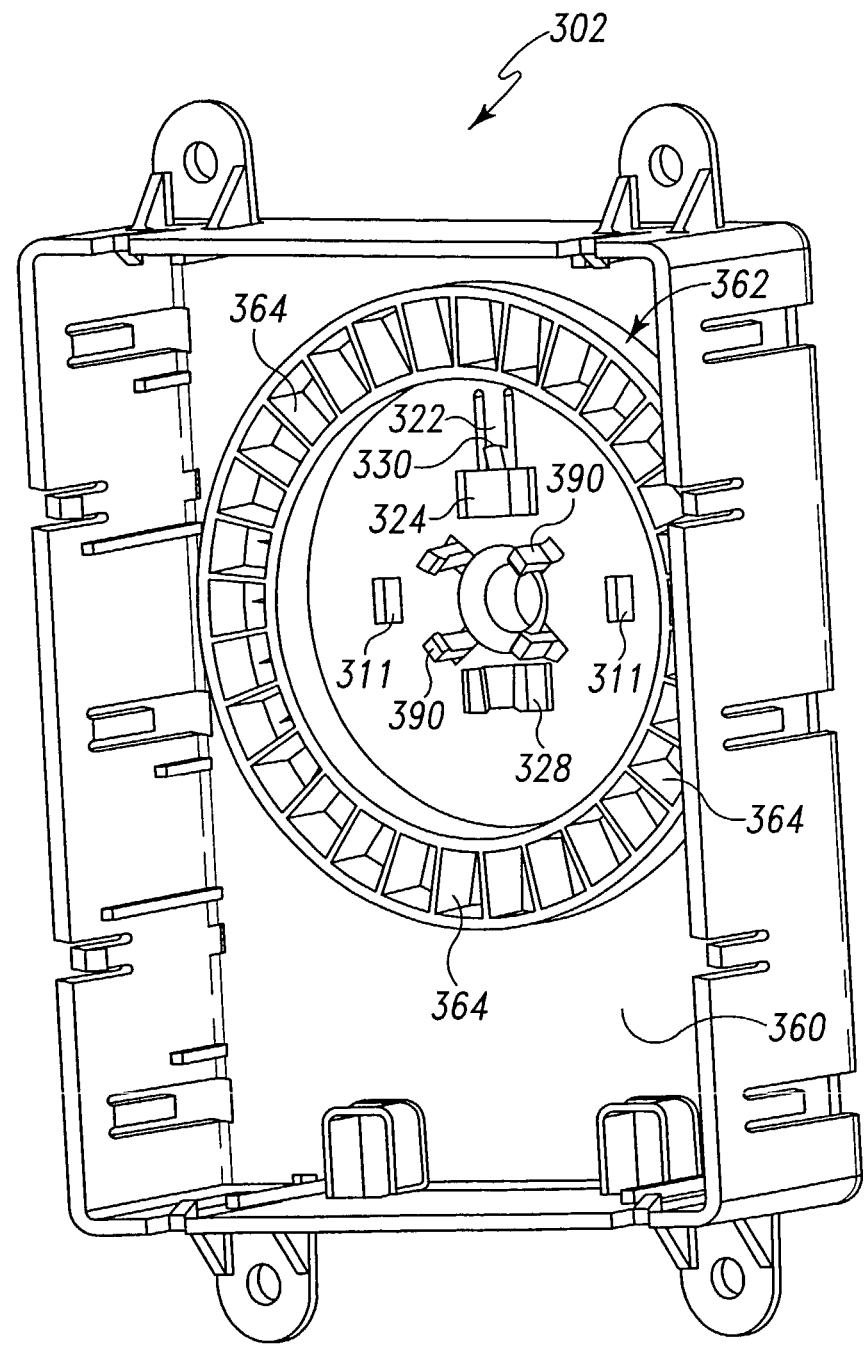
FIG. 35 is a rear perspective view of the housing of the main controller module of FIG. 25.
Figure 36:
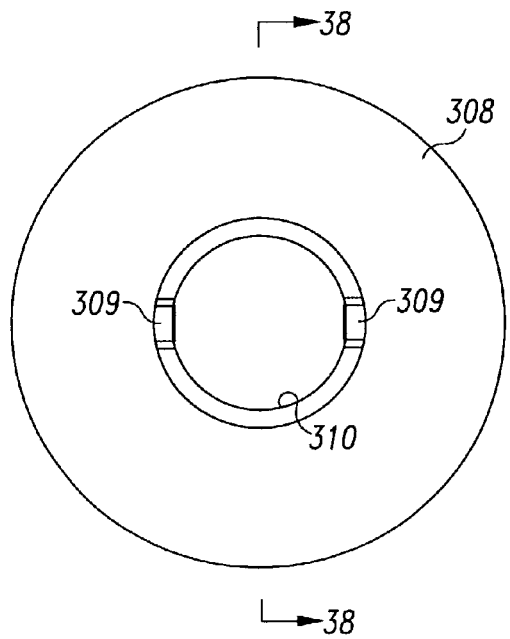
FIG. 36 is a rear elevational view of the escutcheon of the main controller module of FIG. 25.
Figure 37:
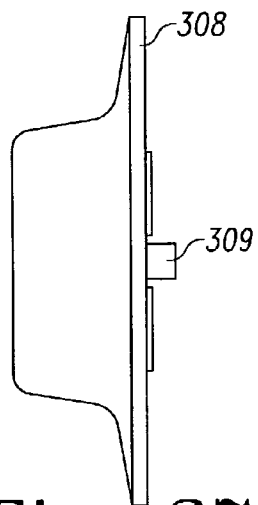
FIG. 37 is a side elevational view of the escutcheon of the main controller module of FIG. 25.
Figure 39:
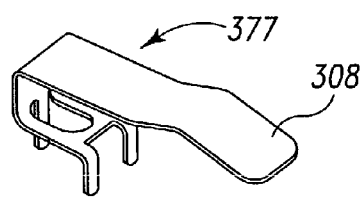
FIG. 39 is a perspective view of the second spring of the main controller module of FIG. 25.
Figure 38:
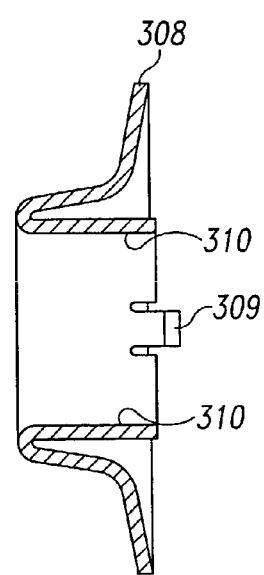
FIG. 38 is a cross sectional view of the escutcheon of the main controller module of FIG. 25 taken along the line 38-38 of FIG. 36.
Figure 40:
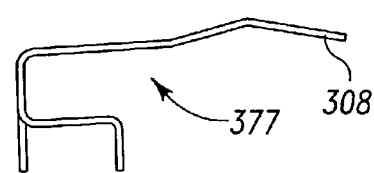
FIG. 40 is a side elevational view of the second spring of the main controller module of FIG. 25.

As an alternative embodiment, a plurality of detent grooves 388 may be defined in the contact member 354 as shown in FIG. 29. The detent grooves 388 would extend around the entire 3600 periphery of a top surface and/or of an edge of the contact member 354. For clarity of viewing, FIG. 29 only shows the detent grooves 388 defined in part of the top surface of the contact member 354. The housing 302 may include a number of detent arms 390 which extend inwardly from the front panel 360 of the housing 302 as shown in FIG. 35. When the main controller module 300 is assembled, the detent arms 390 would cooperate with the detent grooves 388 to provide tactile feedback to a user when the user rotates the user cycle selector 314 about its central axis 340. Of course, as an alternative, the detent arms may be provided on the contact member 354 and the detent grooves may be defined in the housing 302. In such an alternative arrangement, tactile feedback would also be provided to a user when the user rotates the user cycle selector 314 about its central axis 340.

Other Features

Figure 21:
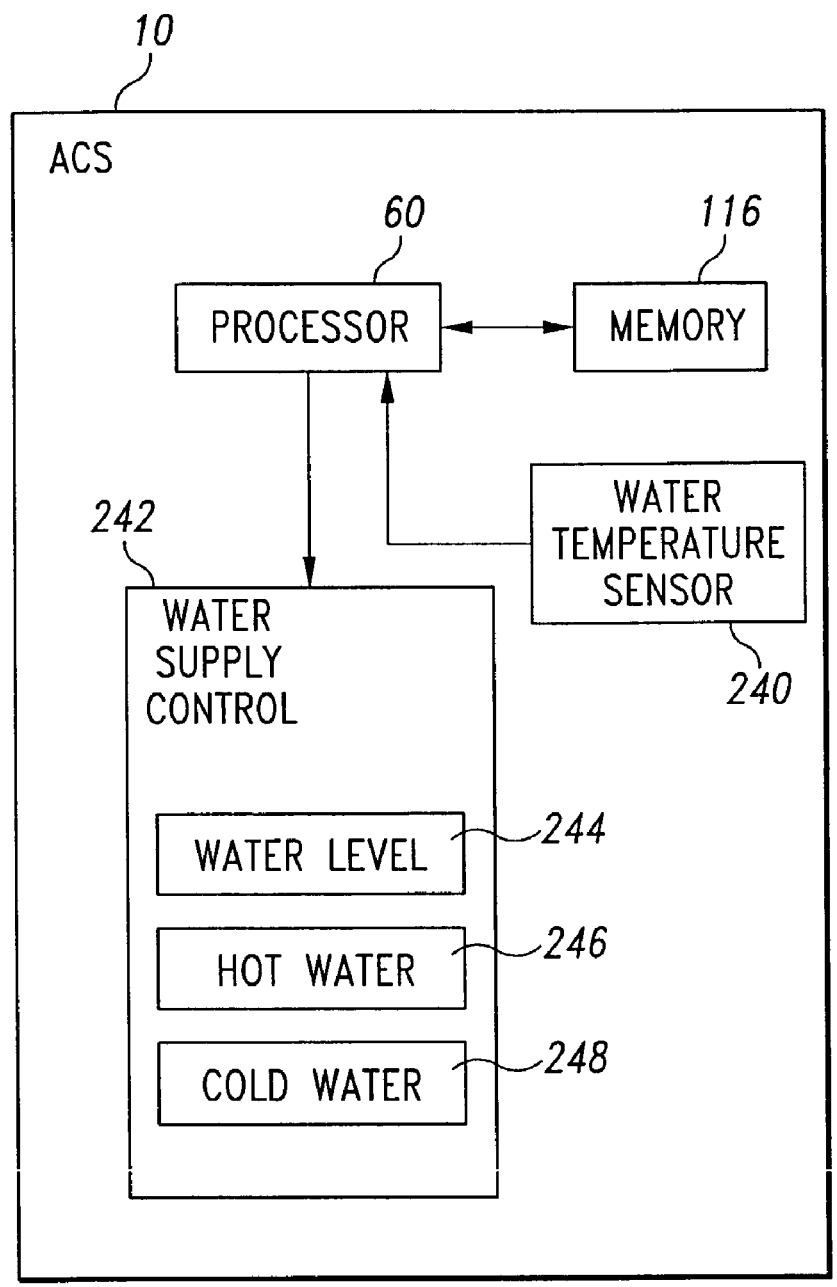
FIG. 21 is a block representation of water control features of the present invention.

Referring to FIG. 21, the ACS 10 includes other various features and/or functions. One such feature is a water temperature sensor 240. The water temperature sensor 240 is operative to provide water temperature measurement data of the water for the water receptacle 32. The water temperature data is used by the processor 60 to control the input of water to the receptacle 32 for the various washing modes of the washing machine 5. The water temperature sensor 240 is thus associated with the receptacle 32. The water temperature measurement data from the water temperature sensor 240 is provided to the processor 60.

The ACS 10 utilizes program instructions stored in the memory 116 to control the application of hot and cold water into the receptacle 32. In this regard, the ACS 10 further includes a water supply control 242 that includes a water level sensor 244, a hot water control 246, and a cold water control 248. The water level sensor 244 is operative to measure, detect, and/or monitor the water level in the receptacle 32. The hot water control 246 is operative to control the application of hot water into the receptacle 32. The cold water control 248 is operative to control the application of cold water into the receptacle 32. Controlled mixtures of hot and cold water result in various temperature of water for the washing of laundry, typically as set by the user via the auxiliary input units, in the receptacle 32.

In FIG. 22, there is shown a schematic diagram of at least a portion of an implementation of the water supply control 242. Water level sensor circuitry/logic 244 includes a terminal P3, pin 1, to which a water level sensor is coupled. Water level data or signals are received via the terminal P3, pin 1, and, after signal conditioning, is forwarded to the processor 60. The hot water control circuitry/logic 246 includes a triac Q13 that is actuated by the processor 60. Once actuated, the triac Q13 applies power to a solenoid (not shown) that is coupled to P3, pin 3. The solenoid opens and closes a hot water valve. In the same manner, the cold water control circuitry/logic 248 includes a triac Q12 that is actuated by the processor 60. Once actuated, the triac Q12 applies power to a solenoid (not shown) that is coupled to P3, pin 4. The solenoid opens and closed a cold water valve. It should be appreciated that the hot and cold water circuitry/logic 246, 248 are interchangeable.

Referring to FIG. 11, the water temperature sensor 240 is input at terminal P1, pins 1 and 3. The processor 60 receives water temperature data/signals. The processor 60 uses the water temperature data/signals to control the hot and cold water controls 246 and 248.

Referring to FIG. 12, terminals P11 pins 1, 2, 3, 4, and 5 form an input 250 to the processor 60. The input 250 is used for flash programming the processor 60. As well, the input 250 may be used for emulating various functions of the ACS 10 for testing and/or diagnostic purposes. The input 250 is typically not necessary and may be eliminated if desired.

Application to Other Laundry Appliances

Figure 57:
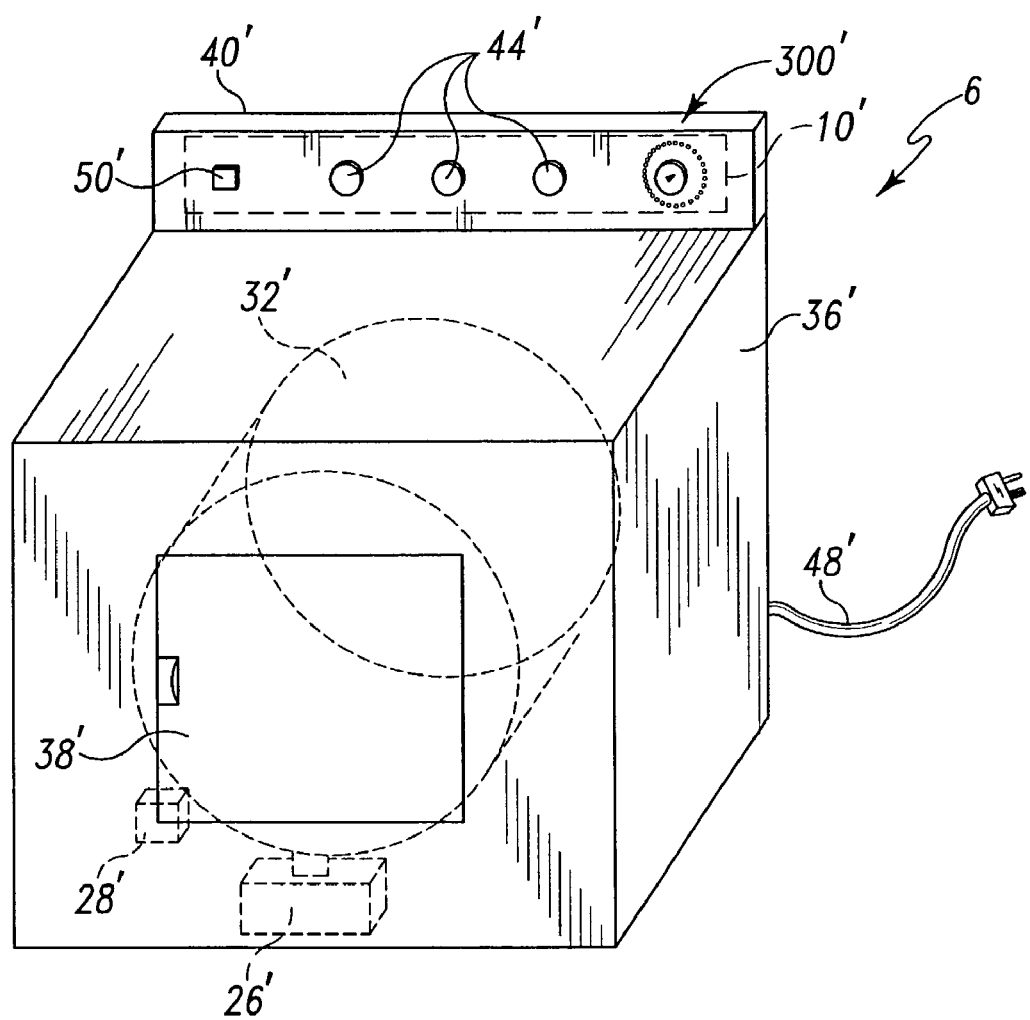
FIG. 57 is a perspective view of a dryer embodying the various aspects of the various inventions shown and described herein.

Referring to FIG. 57, there is depicted a dryer, generally designated 6, representing another form of a laundry appliance. The dryer 6 includes components that are the same as the washing machine 5 and are designated by the same reference numeral primed. The dryer 6 has a frame 36' that houses a receptacle or tub 32' that is configured to receive laundry therein. The tub 38' receives laundry for drying via a pivoting door 38' in the frame 36'. The tub 36' is mounted in the frame 32' so as to revolve or spin, typically around a horizontal axis. The tub 38' is in communication with a motor 26' that is likewise mounted in the frame 36', and which is operative to spin the tub 38' in a controlled manner. The motor 26' however, is a one-speed motor adapted/operative to rotate the tub 38' at one speed.

The dryer 6 also has a control panel frame 40' that houses an appliance control system 10'. External to the control panel frame 40' and part of the appliance control system 10' is a controller module 300 and a plurality of auxiliary inputs 44' (typically in the form of knob, switches, or the like). The controller module 300 provides operating mode/cycle indication and/or control of the operating mode/cycle for/of the dryer 6. Power for the dryer 6 is provided via a power cord 48' that is configured to be plugged into an appropriate source of electricity, typically a 120 volt AC source or a 240 volt AC source (not shown). The general operation of the dryer 6, with respect to the loading, drying, and unloading of laundry, is typical of dryers.

The appliance control system 10' also includes a communication port 50' that allows the dryer 6 to be coupled to an external device, network, or the like. The communication port 50' may take the form of an RS-232 port, a telephone-type port, or the like. Particularly, the communication port 50' allows the dryer 6 to be in communication with a test/diagnostic device, a public and/or private network such as the Internet, another laundry appliance, or other device.

It should thus be appreciated that the washing machine 5 and the dryer 6 are examples of laundry appliances which may incorporate the various aspects and principles of the invention therein. As such, the washing machine 5 and the dryer 6 share common characteristics such as the manner in which the laundry appliance is controlled including the appliance control system 10', the use and type (but typically not the function) of the auxiliary user interface system including the auxiliary inputs 44', and the selector display 20'. The term laundry appliance or appliance thus applies to washers, dryers, and the like, unless specifically mentioned otherwise. In the case or to the extent that a feature, function or manner of operation applies only to a washing machine but not a dryer, and vice versa, such has been indicated.

Application to Other Appliances/Devices

It should be further appreciated that the ACS 10 and/or other features shown and described herein may be used in appliances other than laundry appliances which require control and/or operation indication such as ovens, stoves, and the like (collectively kitchen appliances), as well as other appliances. Likewise, they may be used in other devices as appropriate.

It should be appreciated that the various aspects of the present invention have been described separately herein. These various aspects, however, may be utilized in any combination by any type of laundry appliance. Further, the various aspects may be utilized in devices other than laundry appliances.

While this invention has been described as having a preferred design and/or configuration, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the claims.

The invention claimed is:

1. A power controller for an appliance comprising:
   a first transformerless power circuit operative to produce a first power from the line power coupled to an appliance in which the first power circuit is housed;
   a second transformerless power circuit having a bank of capacitors, the second transformerless power circuit being operative to produce a second power from the line power;
   switching circuitry coupled to the bank of capacitors in the second transformerless power circuit, the switching circuitry being operative to discharge the bank of capacitors to supply said second power to power components in the appliance in accordance with a control signal.

2. The power controller of claim 1, wherein said control signal is produced when the appliance is in a run mode.

3. The power controller of claim 2, wherein said low power is less than one watt.

4. The power controller of claim 2, wherein said low power is less than 500 milliwatts.

5. The power controller of claim 1, wherein said first power comprises a low power.

6. The power controller of claim 1, wherein said switching circuitry comprises an SCR coupled to the bank of capacitors, the SCR enabling the bank of capacitors to be discharged in accordance with the control siqnal.

7. The power controller of claim 6, wherein said switching circuitry additionally comprises a transistor that is coupled to the SCR to selectively enable the SCR to discharge the bank of capacitors.

8. The power controller of claim 7, further comprising
a processor that provides said control signal to said transistor in response to a user-actuated appliance selection.

9. A method of operating an appliance comprising the steps of:
producing low power via a first transformerless power circuit from an input line power; and
discharging a bank of capacitors coupled to the input line power in a second transformerless power circuit in accordance with a control signal to produce operating power for components in an appliance.

10. The method of claim 9, further comprising
generating the control signal for discharging the capacitor bank in response to a user actuating the appliance into a run mode.

11. A power controller for an appliance comprising:
a first transformerless power circuit operative to derive low power from an input line power and supply the low power to low power components of the appliance;
a second transformerless power circuit having a bank of capacitors, the second transformerless power circuit being operative to derive operating power from the input line power;
a switching circuit in communication with the bank of capacitors in said second transformerless power circuit and operative to discharge the bank of capacitors to supply said operating power to operating power components of the appliance in response to a control signal; and
a control signal generator in communication with said switching circuit and operative to generate a control signal in response to a run mode signal.

12. The power controller of claim 11, wherein said control signal generator comprises:
a processor; and
an input selector in communication with said processor.

13. The power controller of claim 11, wherein said switching circuit comprises:
an SCR in communication with said bank of capacitors in said second transformerless circuit; and
a transistor in communication with said SCR and said control signal generator.

14. The power controller of claim 11, wherein said control signal generator is operative to supply an intermittent control signal to said switching circuit.

15. The power controller of claim 11, wherein said low power is less than one watt.

16. The power controller of claim 11, wherein said low power is less than 500 milliwatts.

* * * * *